United States Patent
Orr et al.

(10) Patent No.: US 7,300,285 B2
(45) Date of Patent: Nov. 27, 2007

(54) METHOD AND SYSTEM FOR SKILLS-BASED TESTING AND TRAINING

(75) Inventors: Glenn D. Orr, Sheridan, IN (US); Gregory L. Kaufman, West Toluca Lake, CA (US); Gary G. Cope, Longmont, CO (US)

(73) Assignee: SMTM Technologies LLC, Las Vegas, NV (US)

( * ) Notice: Subject to any disclaimer, the term of this patent is extended or adjusted under 35 U.S.C. 154(b) by 606 days.

(21) Appl. No.: 10/447,323

(22) Filed: May 27, 2003

(65) Prior Publication Data

US 2004/0029092 A1 Feb. 12, 2004

Related U.S. Application Data

(60) Provisional application No. 60/383,402, filed on May 24, 2002.

(51) Int. Cl.
G09B 19/00 (2006.01)
(52) U.S. Cl. .................................. 434/118; 715/709
(58) Field of Classification Search ................ 434/323, 434/118, 307 R; 715/709
See application file for complete search history.

(56) References Cited

U.S. PATENT DOCUMENTS 4,637,797 A * 1/1987 Whitney et al. ............ 434/118

(Continued)

FOREIGN PATENT DOCUMENTS

EP 0 322 333 A2 6/1989

(Continued)

OTHER PUBLICATIONS

Business Editors/High-Tech Writers. "Online Training Available With Launch of www.eLearningToday.com; Features Self-Paced Online Tutorials for Leading Computer Applications." Busines Wire. New York: May 22, 2001. p. 1.*

(Continued)

*Primary Examiner*—Robert E. Pezzuto
*Assistant Examiner*—Cameron Saadat
(74) *Attorney, Agent, or Firm*—Seed IP Law Group PLLC

(57) ABSTRACT

Methods and systems for skills-based testing and training of an application are provided. Example embodiments provide a Skills-Based Simulation and Measurement System "SBSMS", which enables publishers and authors of tests and training programs to provide simulated application environments for testing and training students. In one embodiment, the SBSMS comprises a client portion and a server portion. The client portion includes a simulation engine that is run by a student and tracks the student's responses. The server portion comprises the components and data that are used to implement the client-side simulation engine and includes a skills-based testing and training engine, simulation components, non-simulation components, and a tests and training scenarios and student data repository. The server portion receives and satisfies requests for portions of a scenario with the simulation and non-simulation components. The server portion engine receives from the client portion student responses and scores and stores them on a per user, per scenario basis in the data repository. The client and server portions cooperate to provide skills-based simulation and measurement in testing and training scenarios.

210 Claims, 36 Drawing Sheets

U.S. PATENT DOCUMENTS

| | | | | |
|---|---|---|---|---|
| 4,772,206 A * | 9/1988 | Kerr et al. | | 434/118 |
| 5,395,243 A * | 3/1995 | Lubin et al. | | 434/118 |
| 5,481,667 A * | 1/1996 | Bieniek et al. | | 715/709 |
| 5,493,658 A * | 2/1996 | Chiang et al. | | 715/709 |
| 5,577,186 A * | 11/1996 | Mann et al. | | 715/500.1 |
| 5,597,312 A * | 1/1997 | Bloom et al. | | 434/362 |
| 5,602,982 A * | 2/1997 | Judd et al. | | 715/709 |
| 5,816,820 A * | 10/1998 | Heinz et al. | | 434/118 |
| 5,823,781 A * | 10/1998 | Hitchcock et al. | | 434/118 |
| 6,219,047 B1 * | 4/2001 | Bell | | 715/705 |
| 6,308,042 B1 * | 10/2001 | Marsh et al. | | 434/307 R |
| 6,341,960 B1 * | 1/2002 | Frasson et al. | | 434/322 |
| 6,347,943 B1 | 2/2002 | Fields et al. | | 434/118 |
| 6,438,353 B1 * | 8/2002 | Casey-Cholakis et al. | | 434/350 |
| 6,692,256 B2 * | 2/2004 | Chan et al. | | 434/118 |
| 6,907,569 B1 * | 6/2005 | Craft | | 715/708 |
| 7,047,498 B2 * | 5/2006 | Lui et al. | | 715/762 |
| 2002/0031751 A1 * | 3/2002 | Wen et al. | | 434/118 |

FOREIGN PATENT DOCUMENTS

| | | |
|---|---|---|
| IE | 20000975 | 12/2001 |
| WO | WO 01/73725 A2 | 10/2001 |

OTHER PUBLICATIONS

SkillCheck Incorporated, accessed Jul. 18, 2002, URL=http://www.skillcheck.com, 13 pages.

* cited by examiner

METHOD AND SYSTEM FOR SKILLS-BASED TESTING AND TRAINING

BACKGROUND OF THE INVENTION

1. Field of the Invention

The present invention relates to methods and systems in a computer system for skills-based testing and training and, in particular, to methods and systems for simulating an application such that an operator's skills can be tested or trained by interaction with the simulated application.

2. Background Information

As organizations become more global and physically distributed in their function and expertise and are searching for ways to improve processes or performance of personnel, the need for efficient training and testing tools increases. With technology in a constant state of flux, it becomes harder to measure the status of current skill level in an organization and harder to train personnel on new, ever-changing applications. Some organizations are striving to differentiate themselves by increasing the distribution of knowledge in an organization. Computer-assisted testing and training is one means to accomplish this task.

However, computer-assisted testing and training today is limited. Two approaches are currently utilized. The first approach involves testing and training with respect to an application by launching the application itself. There are multiple disadvantages to this approach including that the application must be appropriately licensed, and the testing or training is tied to a specific release of the product. Thus, the test or training scenario needs to be revised with each revision of an application. The second approach involves testing/training using "canned" (e.g., captured) images from the application. This allows tests and training situations to be developed that require a user to answer questions about what they are observing or what they already know. However, the results, especially as to training, are limited, because the user doesn't interact with the application.

In addition, the type of information gleaned with test takers and trainees using both of these approaches is typically limited to what is termed "knowledge-based" testing/training or "performance-based" testing/training. Specifically, a user (test taker or trainee) is typically judged on whether a question was answered right or wrong—that is, does the user have knowledge of a particular subject area. Similarly, if a user is compared with a predetermined set of answers (constituting, for example, a "level" of performance) or compared with other users, then the testing/training is considered "performance" based. In either case, performance or knowledge is based upon right or wrong answers.

BRIEF SUMMARY OF THE INVENTION

Embodiments of the present invention provide enhanced computer- and network-based methods and systems for skills-based testing and training of an application by simulating aspects of the application's user interface. Example embodiments provide a Skills-Based Simulation and Measurement System ("SBSMS"), which enables publishers and authors of tests and training programs to provide simulated application environments for testing and training students (users of the simulated environments). The SBSMS also provides sophisticated tracking and measurement capabilities that provide "skills-based" testing and learning in addition to any knowledge-based or performance-based testing and learning.

The Skills-Based Simulation and Measurement System provides a set of tools for generating simulated application environments that include questions for testing and training; a process for publishing new scenarios (tests or training narratives) and questions; a process for authoring new scenarios and questions using an existing data repository of questions; a process for administering scenarios to students, and an environment for running tests and training scenarios and for automatically capturing, measuring, and scoring student responses.

In one embodiment, the Skills-Based Simulation and Measurement System comprises one or more functional components/modules that work together to produce and administer skills-based measurement environments and to provide skills-based interactions with simulated aspects of applications. For example, a Skills-Based Simulation and Measurement System implemented as a client-server architecture may comprise a client portion and a server portion. In one example embodiment, the client portion includes a simulation engine that is run by a student and tracks the student's responses. The simulation engine may comprise, from a functional perspective, a testing or training interface and a response tracking and scoring mechanism. The server portion comprises all of the components and data that are used to implement the (client-side) simulation engine. Thus, from a functional perspective, the server portion may comprise a skills-based testing and training engine, simulation components, non-simulation components, and a test and training scenarios and student information data repository. The skills-based testing and training engine receives requests for portions of a particular testing or training scenario and forwards components from the simulation components and the non-simulation components as needed to implement the client-side simulation engine. It also receives student responses and scores from the client-side simulation engine and stores them on a per user, per test basis in the data repository.

According to one approach, a simulation engine is provided that displays a directive to obtain a result; receives an indication of a response to the displayed directive, the response indicating a simulated interaction; and automatically scores the indicated response. The simulation engine simulates aspects of the application without executing the application while a student interacts with the scenario and without using plug-in or other executable modules of the application. In one aspect, the simulation engine provides a testing scenario. In another aspect, the simulation engine provides a training scenario. In yet another aspect, the scenarios are provided in multiple languages yet handled using a homogeneous mechanism.

Other aspects of the Skills-Based Simulation and Measurement System are described in the other sections herein.

BRIEF DESCRIPTION OF THE DRAWINGS

FIGS. 11-13 are display screens that illustrate recorded actions using an example recording and scoring mechanism of a Skills-Based Simulation and Measurement System.

DETAILED DESCRIPTION OF THE INVENTION

Embodiments of the present invention provide enhanced computer- and network-based methods and systems for skills-based testing and training of an application by simulating aspects of the application's user interface. Example embodiments provide a Skills-Based Simulation and Measurement System ("SBSMS"), which enables publishers and authors of tests and training programs to provide simulated application environments for testing and training students (users of the simulated environments). The SBSMS also provides sophisticated and automated tracking and measurement capabilities that measure how well the student is performing a given task by evaluating how the task was performed and not just whether the student performed the task correctly or incorrectly. Moreover, these measurement capabilities go beyond a determination of a predefined performance level or a determination of a student's performance relative to other students' correct or incorrect test scores. Thus, the SBSMS is able to provide "skills-based" testing and learning in addition to any knowledge-based or performance-based testing and learning.

For the purposes of describing an example Skills-Based Simulation and Measurement System, the following description makes no real distinction between the techniques used to create and maintain a skills-based testing environment and a skills-based training environment. One skilled in the art will recognize that in some situations, one difference between these two types of environments is potentially the type of feedback given to a student and the timing of the feedback. For example, it may be beneficial in a training scenario to give a student feedback as the response actions are being performed rather than only at the completion of a task. From the point of view of the SBSMS, however, these two types of scenarios are substantially the same—the same mechanisms are used in both environments. In addition, as used herein, the term "training" refers to any type of education or learning situation.

Figure 1:
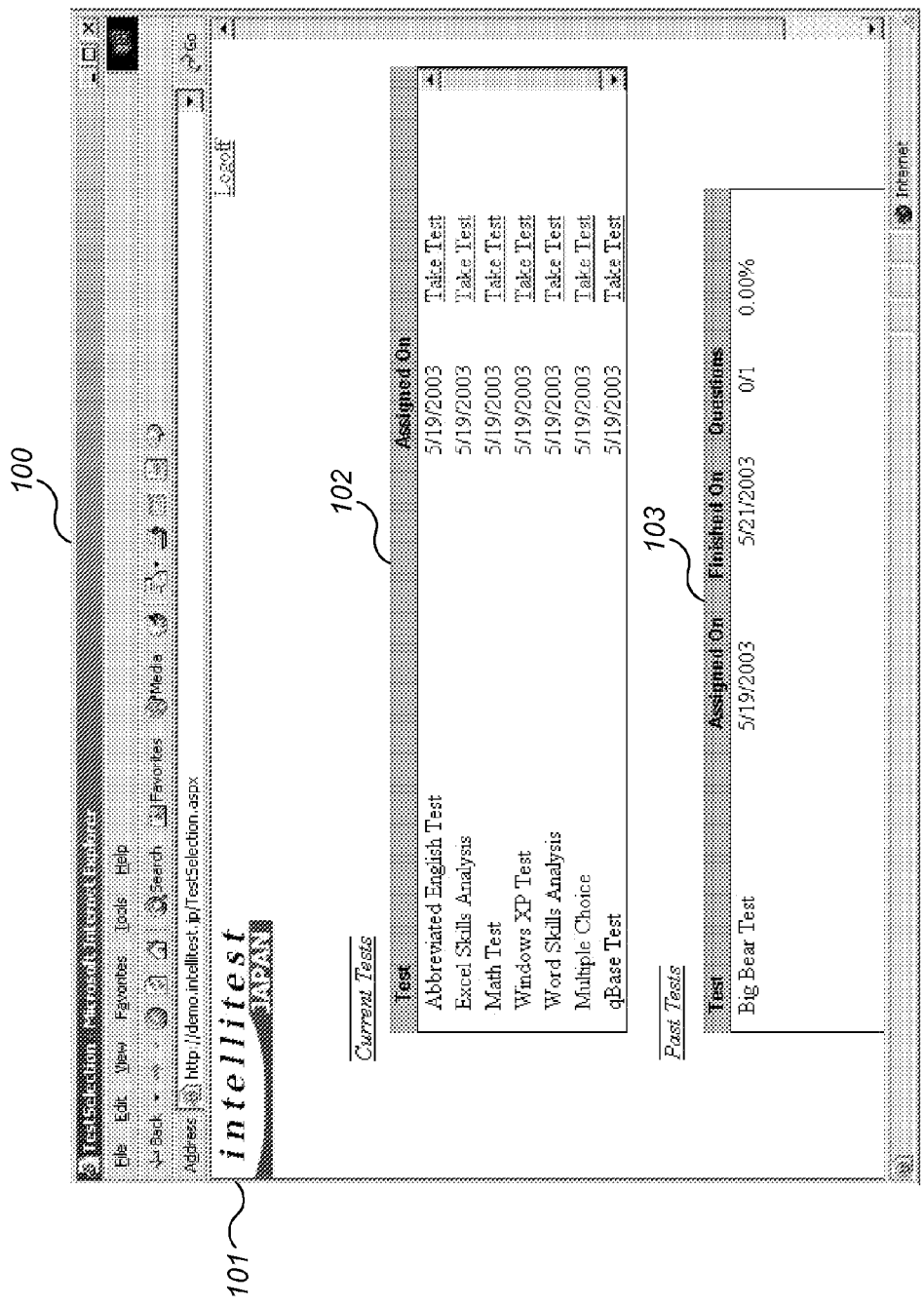
FIG. 1 is an example display screen of a testing environment presented by an example Skills-Based Simulation and Measurement System.

FIG. 1 is an example display screen of a testing environment presented by an example Skills-Based Simulation and Measurement System. The display screen 100 is presented after a student has logged into the testing environment in a designated language, such as English, Japanese, or Chinese. Display screen 100 shows a publisher's logo 101, a list of currently available tests 102 that have been associated with the student and are available for testing, and a list of past tests 103 that already have been taken by the student. The student can select a test from the currently available tests list 102, and, when the test is completed, the selected test is added to the past tests list 103. Information is presented regarding the completed test including the date the test was assigned, the date it was finished, how many questions were answered and an efficiency rating (or other skills-based score). Other types of information on completed tests can also be displayed.

Figure 2:
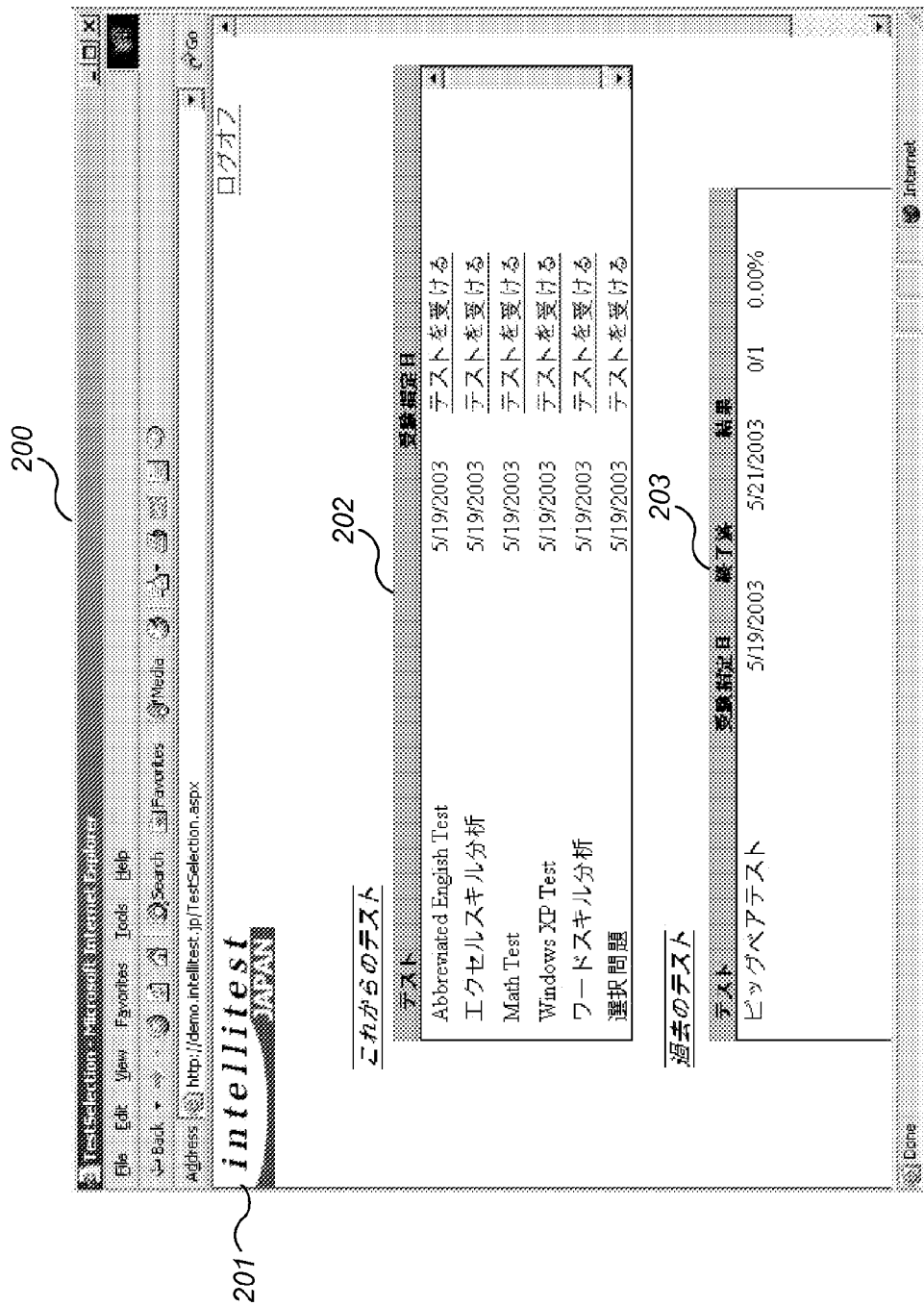
FIG. 2 is an example display screen of the same testing environment presented in Japanese.

FIG. 2 is an example display screen of the same testing environment presented in Japanese. Each component shown in display screen 200 is the same as that illustrated in FIG. 1 in English, except that the text for some of the test names and the labels on the buttons and other interfaces are in the designated language, here Japanese.

The Skills-Based Simulation and Measurement System provides a set of tools for generating simulated application environments that include questions for testing and training; a process for publishing new scenarios (tests or training narratives) and questions; a process for authoring new scenarios and questions using an existing data repository of questions; a process for administering scenarios to students, and an environment for running tests and training scenarios and for automatically capturing, measuring, and scoring student responses. In overview, a publisher creates a "simulation engine" (a simulated application execution environment) for the test or training scenario and makes the scenario available for association with students or organizations. A student then runs the published test or training scenario using the simulation engine and responds to the questions (or tasks) presented. The simulation engine captures the student's actions performed in response to the questions/tasks, measures them against predefined answers/responses, and scores the skill of the student accordingly. One way the SBSMS scores the student's skill is to evaluate how well the student's response matches the predefined response. When a new test/training scenario that uses existing questions is desired, an author runs a SBSMS tool to create a new scenario and associate existing questions-answer pairs with the scenario.

For the purposes of ease in description, several classifications of "users" are described, although it is to be understood that any user could perform any of these roles and the roles are interchangeable in many instances. A "publisher" is a user who uses the SBSMS tools to generate simulated environments, tests, and training scenarios, including new questions for a simulated application environment ("simulation questions") and possibly new knowledge-based questions ("non-simulation questions"). An "author" is a user who combines existing questions, whether simulation related or not, into a new scenario; adds questions to an existing scenario; or who modifies existing scenario properties and/or non-simulation questions, and the like. A "student" is a user who takes a test or runs a training scenario. An "administrator" is a user who administers a testing or training scenario by associating scenarios with students and by associating roles with different users.

The testing and training scenarios that can be generated using the Skills-Based Simulation and Measurement System can contain both questions (such as inquiries, tasks, or directives) requiring simulated aspects of the application and questions that do not. Questions that require simulated aspects for simulating interaction with an application are referred to as simulation questions. Examples of such questions are: "In the following spreadsheet, highlight all of the cells in row 10." To respond (answer) such a simulation question, the student uses the simulated application interface, for example the menus and buttons, as if the student were using the real application to respond to the question. Questions that do not require simulated aspects are referred to as non-simulation questions. Examples of such questions are multiple choice questions, in which a question has one right answer from multiple choices; story-grammar questions, in which a story is provided and a student selects from different answer choices the best answer; order sentence questions, in which a series of words or phrases appear and the student moves them (e.g., with a mouse) into correct positions to constitute a valid sentence. Other types of non-simulation questions also exist. Also, one skilled in the art will recognize that both simulation questions and non-simulation questions and their responses can be presented in many forms, including text, graphics, and audio.

Figure 3A:
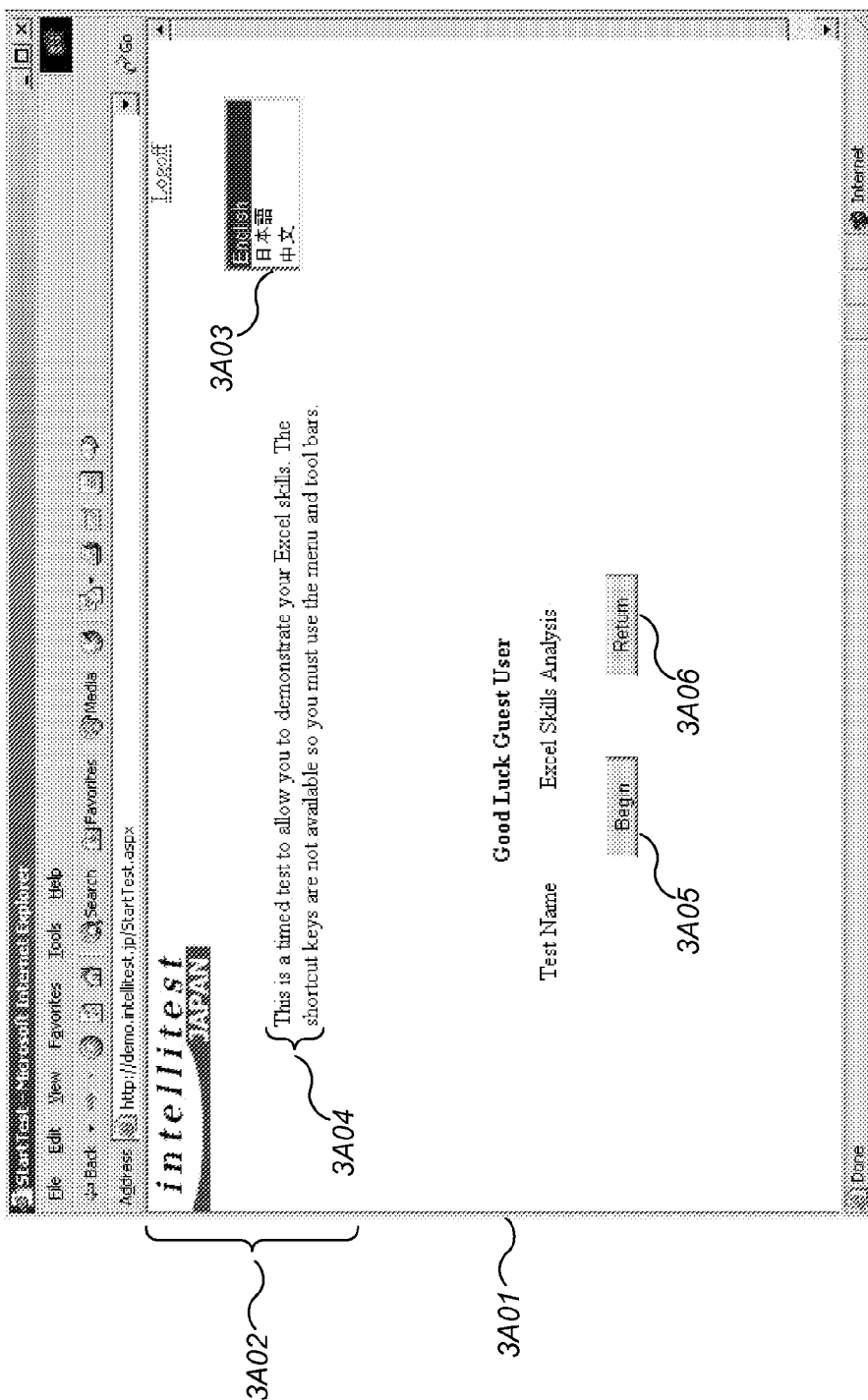
FIGS. 3A-3G are example screen displays of a test scenario for testing skills using simulated aspects of a spreadsheet application.

FIGS. 3A-3G are example screen displays of a test scenario for testing skills using simulated aspects of a spreadsheet application. The simulation engine simulates interface aspects of Microsoft Excel®, a spreadsheet application owned by Microsoft Corp. FIG. 3A is an example screen display of an opening screen for a skills-based test scenario. Display screen 3A01 contains a header area 3A02, instruction area 3A04, a language designator 3A03, a "Begin" button 3A05 for starting the test, and a "Return" button 3A06 for returning to the scenario selection screen, for example the screen displayed in FIGS. 1 and 2.

Figure 3B:
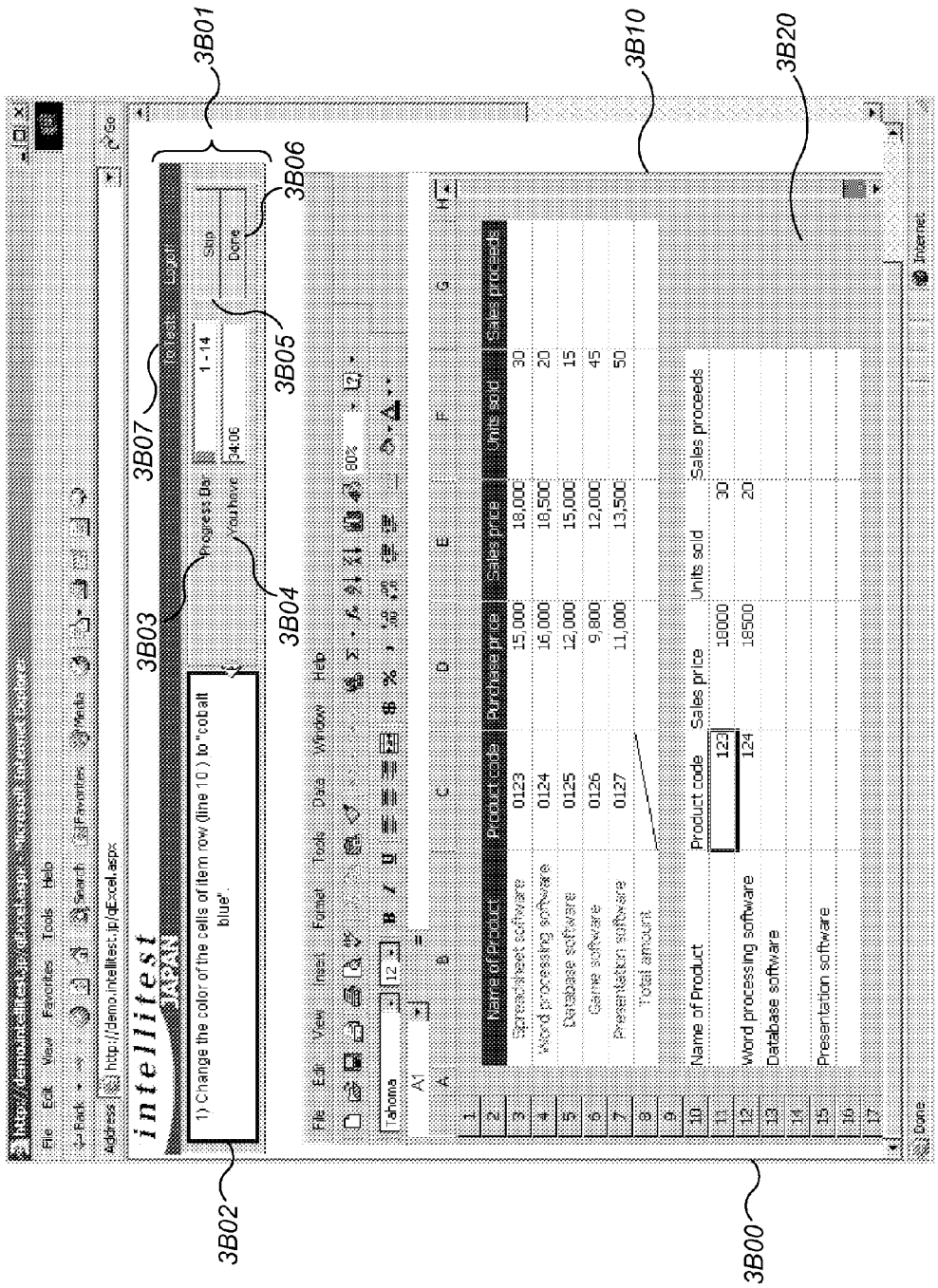
Figure 3C:
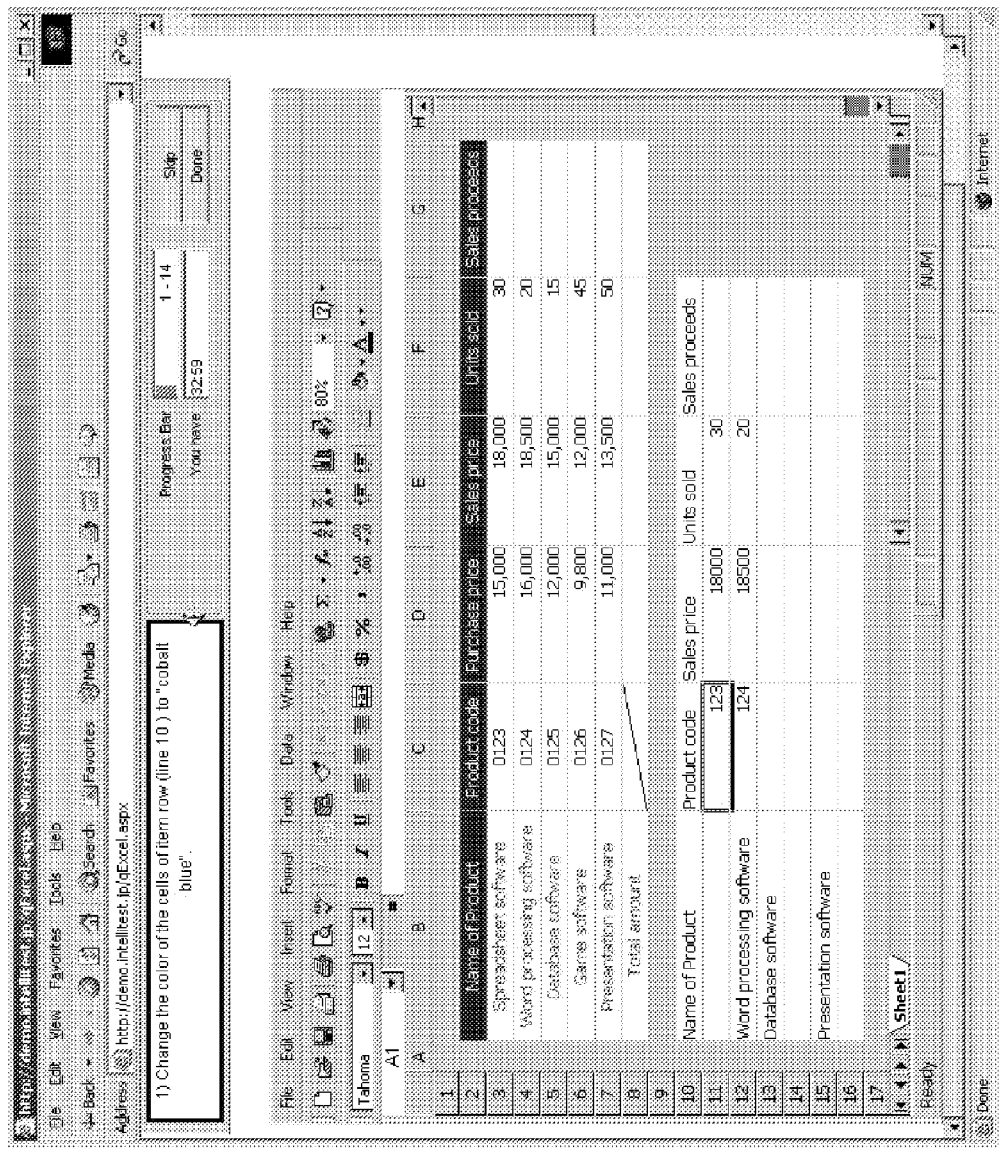

Once the student depresses the "Begin" button 3A05, the scenario begins execution. FIGS. 3B-3G show a progression of actions using an example simulated interface to respond to an example test question. FIG. 3B is an example screen display of the initial simulation environment of an example skills-based test scenario. FIG. 3C shows the bottom portion of the simulation environment display screen shown in FIG. 3B. The display window 3B00 contains a header area 3B01 and an application simulation area 3B10. The header area 3B01 contains several fields that are typically present for any scenario (that is a timed scenario), although their contents are updated to reflect the state of the simulation engine applicable at that time. Specifically, question area 3B02 presents the question/task text (if any) or other instructions associated with the task given to the student to be answered or responded to (for example, audio or graphical instructions). Progress bar 3B03 indicates the number of questions completed out of a total number of questions. Time indicator 3B04 indicates the time remaining if the scenario has associated time constraints. The "Skip" button BG05 when pressed causes the simulation engine state to progress the next question. The "Done" button 3B06 when pressed indicates to the simulation engine that the student is done taking the test or done with the training exercise. The "To Tests" selection area 3B07 when pressed returns the student to the scenario selection screen, for example the screen displayed in FIGS. 1 and 2. The application simulation area 3B10 contains the user interface components of the application that are being simulated along with resulting presentation. The student can interact with these components and any presentation of the application state related to the task at hand as if the student were interacting with the real application. In the spreadsheet environment illustrated there are display areas (and simulated aspects of the interface) that are shared between the simulation questions, for example, the row and column headers, menus, dialogs, etc, and display areas that will vary from question to question, for example, the current contents of the spreadsheet 3B20. In some embodiments of an SBSMS, the shared display areas do not change when the simulation engine advances to a next question. Instead, only the areas of the presentation and interface specific to the current question are modified.

Figure 3D:
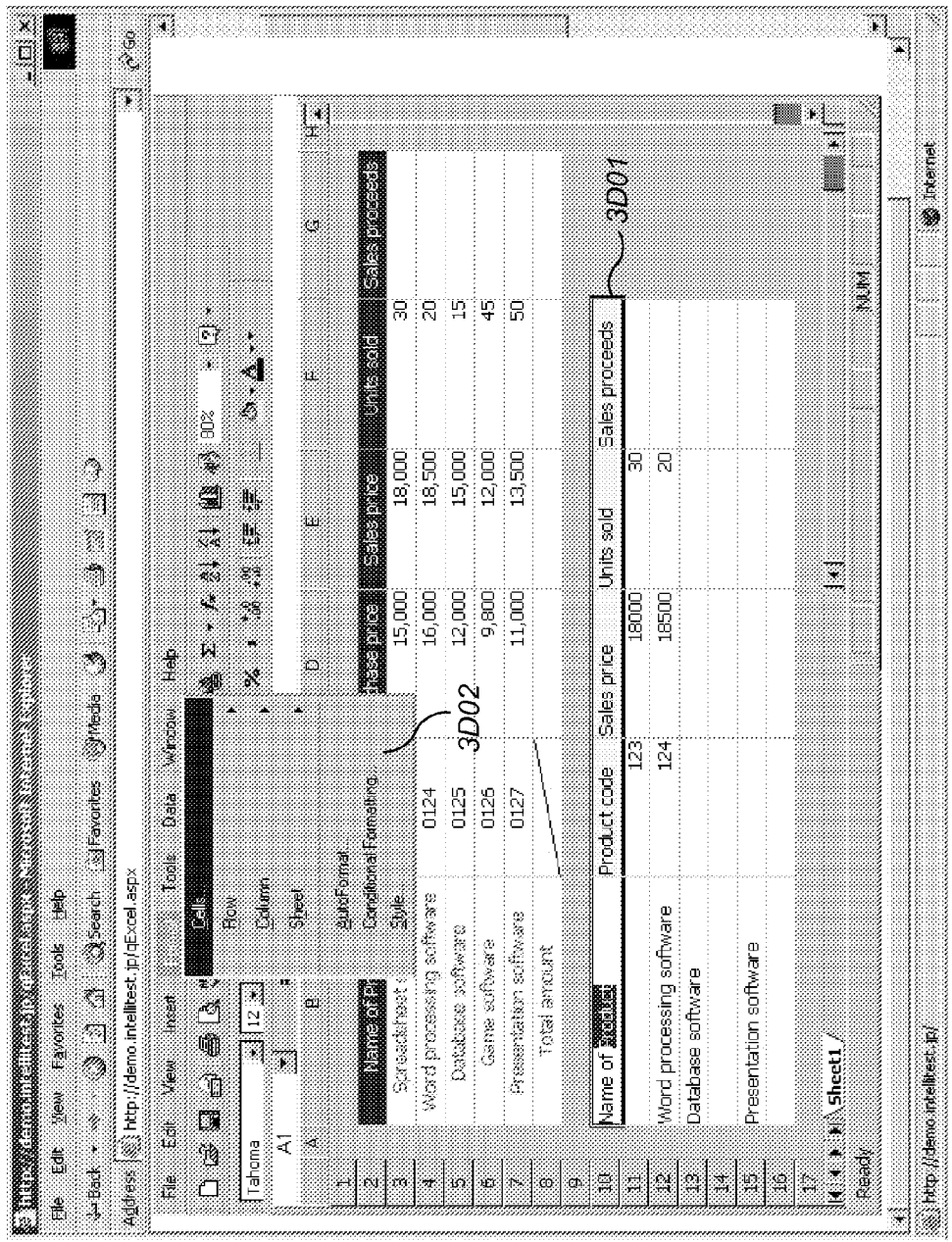

As currently illustrated, question area 3B02 is presenting an example directive to "Change the color of the cells of item row (line 10) to 'cobalt blue'." In correct response to the displayed directive in question area 3B02, the student would first need to select the cells of item row (line 10). FIG. 3D is an example display screen of the scenario after a student performs an action using a simulated interface. The screen displays the resulting spreadsheet after the student has selected the range of cells 3D01 in row 10 and has pulled down the format menu 3D02 to select the menu item, "Cells . . . " Both the cell selection mechanism and the menu presentation and implementation are simulated aspects of this skills-based scenario.

Figure 3E:
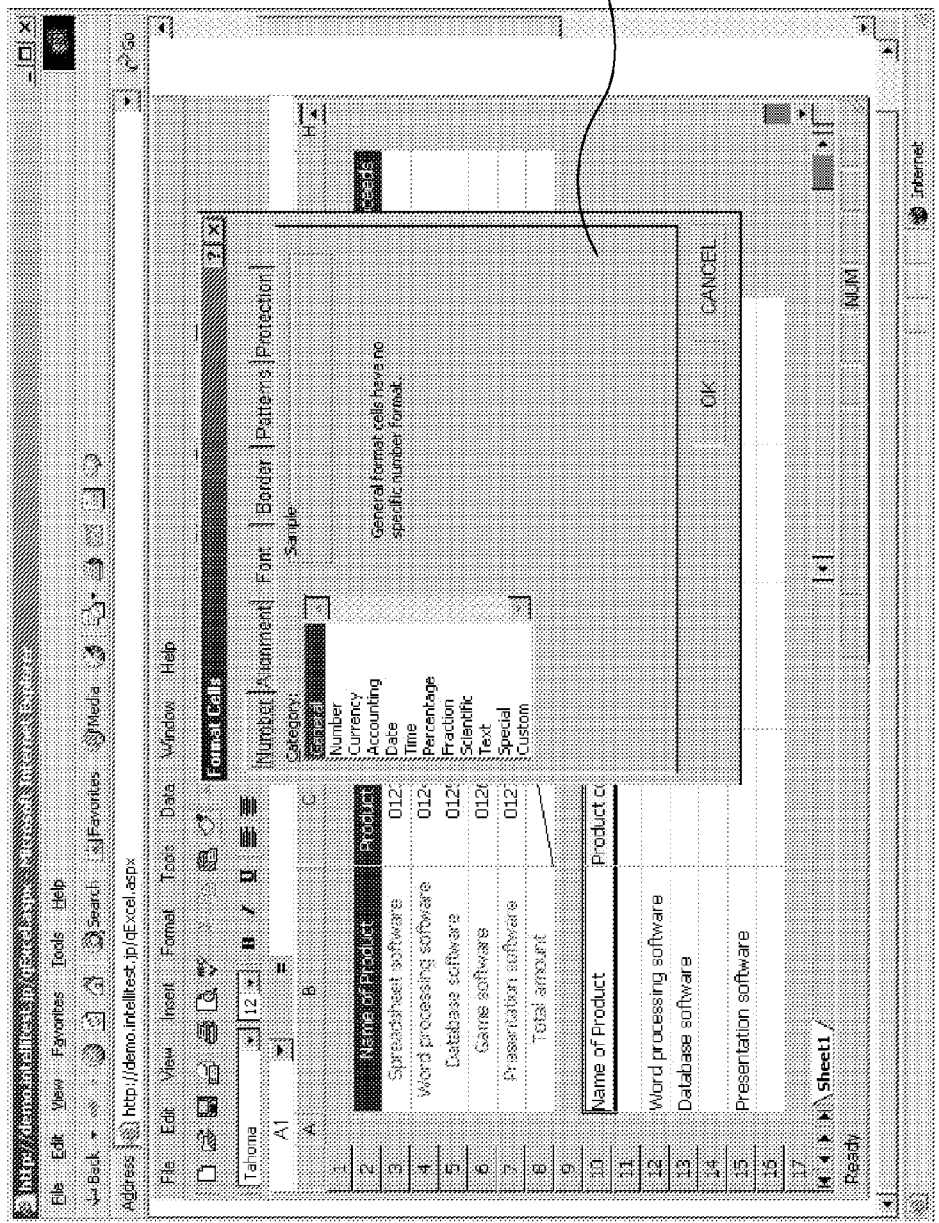

In response to selection of the "Cells . . . " menu item, the simulated interface displays a "Format Cells" dialog window. FIG. 3E is an example display screen of a Format Cells dialog produced by the simulated interface in response to selection of a "Cells . . . " menu item. Dialog window 3E01 is a simulated version of the "Format Cells" dialog that would normally be presented by the real application in response to a selection of the menu item "Cells . . . " This dialog, however, is a simulated dialog, so any behavior invoked by the student is programmed into the simulation engine. The simulated dialog (as well as the real dialog in the application) defaults to the "Number" property sheet.

Figure 3F:
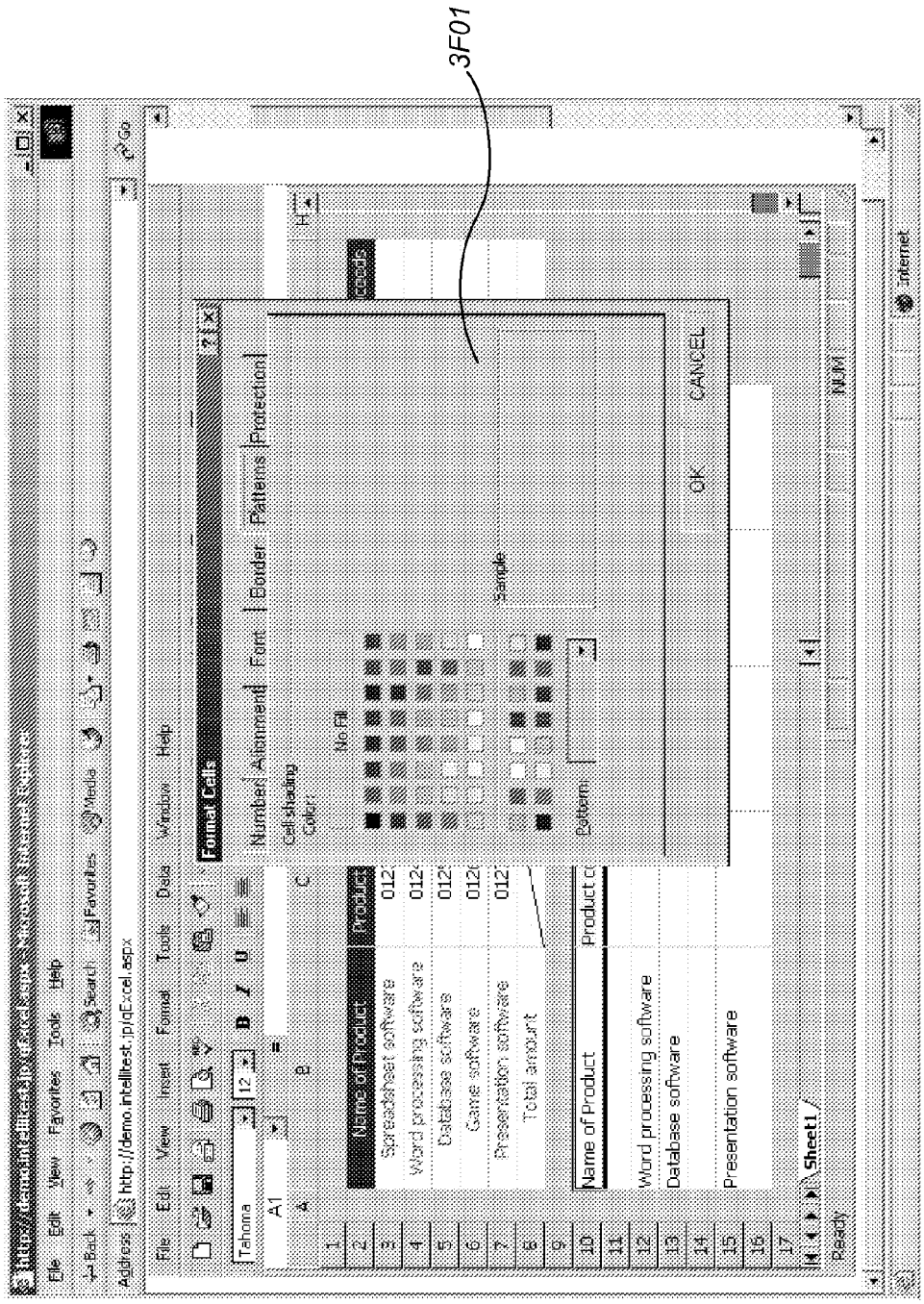

To correctly respond to the original task, the student needs to access the "Patterns" property sheet, which allows selection of a background (cell shading) color. FIG. 3F is an example screen display of a dialog window produced and displayed by the simulated interface in response to selection of the "Patterns" property sheet. The "Patterns" property sheet 3F01 (dialog window) is activated and displayed. The student then picks a color from the displayed dialog window 3F01 (preferably cobalt), and the shade of the range of cells previously selected is modified to the selected color.

Figure 3G:
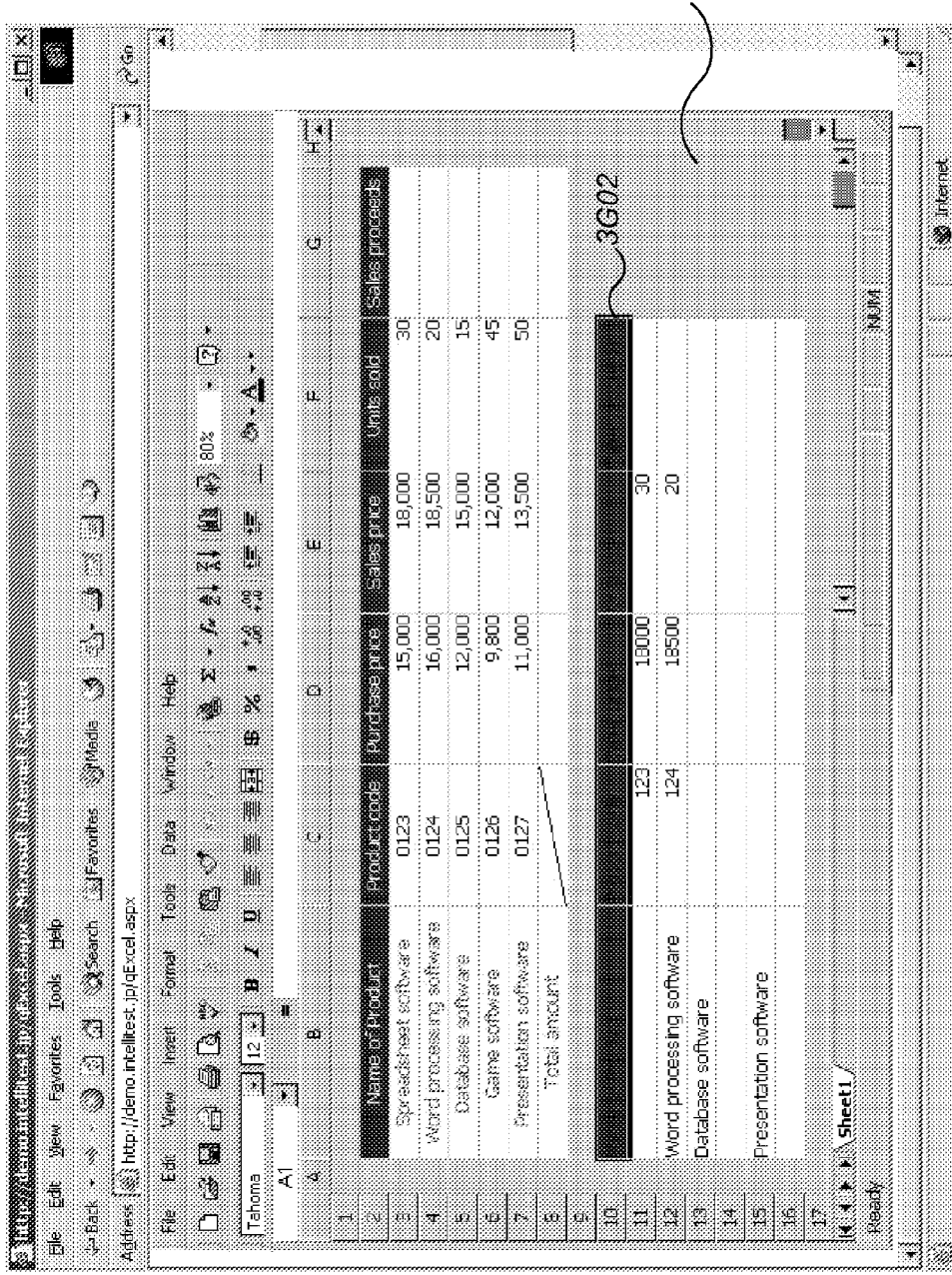

FIG. 3G is an example screen display of the resulting spreadsheet after color selection for shading the selected range of cells. In FIG. 3G, the spreadsheet 3G01 shows that the selected cells of Row 10 (cells 3G02) have changed color. (The black and white version doesn't show the cobalt and the text is unreadable, but the cells have been modified appropriately.) The progression of responding to the given task is now complete, and the student selects the "Done" button (not shown, but the same as 3B06 of FIG. 3B) to complete the test scenario. In response, the simulation engine then performs any necessary scoring (if done on the client system) and submits the test scenario results to the server to be stored.

Although applicable to both testing and training scenarios, many of the examples and descriptions used herein refer to "tests," "testing," and similar terms for convenience reasons only. Hence, the terms "question," "directive," and "task" are used interchangeably as well as the terms "answer" and "response." One skilled in the art will recognize that the examples and descriptions are equally applicable to training environments, whether mentioned explicitly or not, and that the methods and systems described are contemplated to be used with and in training environments. Thus, the phrases "testing scenario," "training scenario," "test," etc. are used generally to imply any type of test or training interface or environment. In addition, the concepts and techniques described are applicable more generally to skills-based measurement environments. Thus, one skilled in the art will recognize that the techniques of the SBSMS may be useful to create a variety of other training, education, or learning tools as well, including training students in the use of interfaces to physical apparatuses. For example, an SBSMS may be used to present a simulated interface for configuring a copier machine, a printer, or other similar device. Other examples include using the SBSMS to teach a student using "how to" scenarios, for example, how to assemble something, how to complete forms, how to calculate formulas on different types of data, how to draw conclusions from a set of facts, etc. The SBSMS in these instances can present a task to be performed, capture and measure the response, and provide the student with feedback before embarking on the next task. The simulated interface may be completely pictorial (such as to replace an instructional manual), text-based, audio-based, or some combination of graphical, textual, and auditory.

Also, although certain terms are used primarily herein, one skilled in the art will recognize that other terms could be used interchangeably to yield equivalent embodiments and examples. For example, it is well-known that equivalent terms in the testing and training field and in other similar fields could be substituted for such terms as "question," "answer," "response," "directive," "task," "scoring," "measuring," etc. In addition, terms may have alternate spellings which may or may not be explicitly mentioned, and one skilled in the art will recognize that all such variations of terms are intended to be included.

In the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

Figure 4:
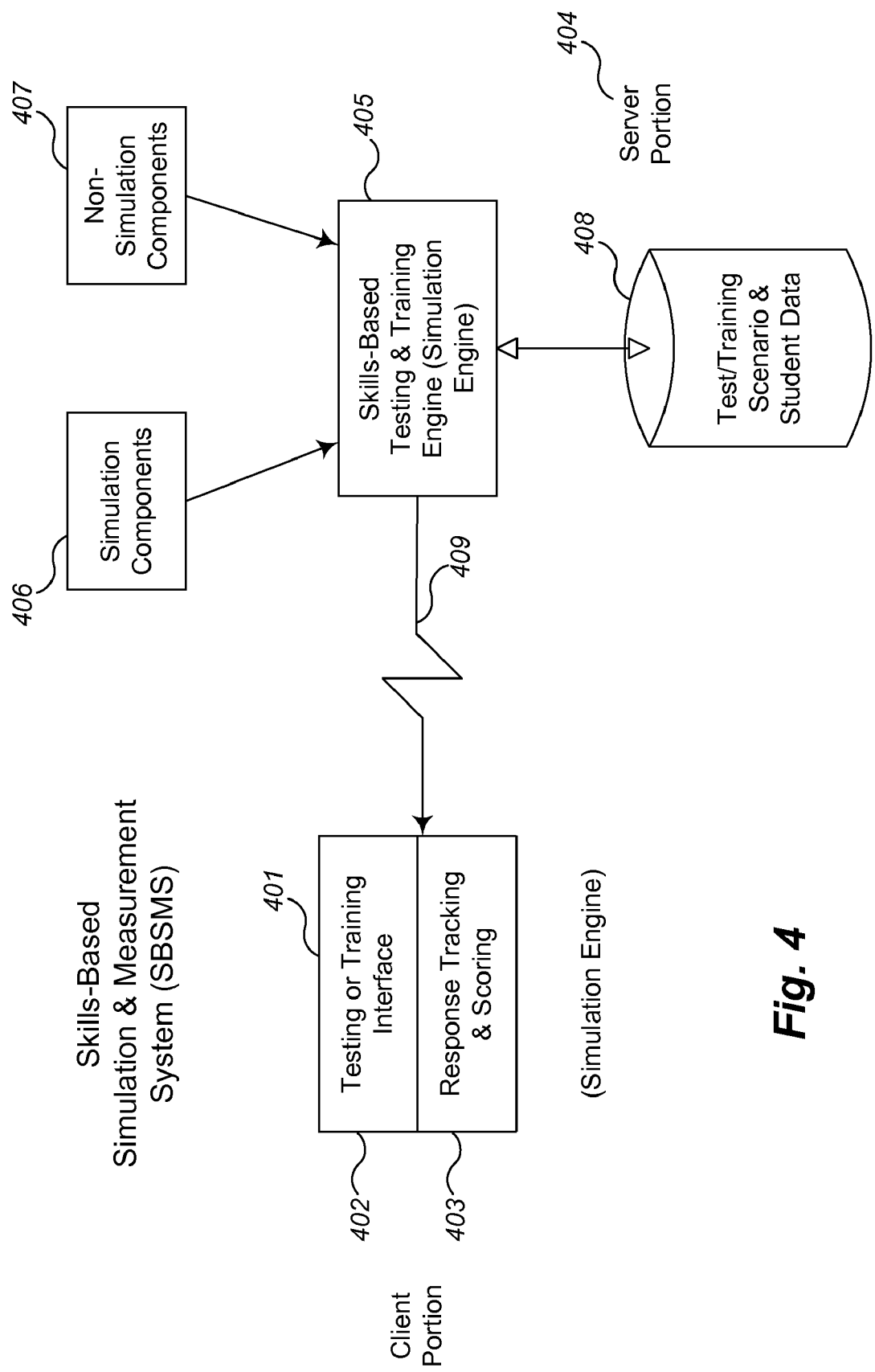
FIG. 4 is an example block diagram of components of an example Skills-Based Simulation and Measurement System.

FIG. 4 is an example block diagram of components of an example Skills-Based Simulation and Measurement System. In one embodiment, the Skills-Based Simulation and Measurement System comprises one or more functional components/modules that work together to produce and administer skills-based measurement environments and to provide skills-based interactions with simulated aspects of applications. One skilled in the art will recognize that these components may be implemented in software or hardware or a combination of both. In FIG. 4, a Skills-Based Simulation and Measurement System implemented as a client-server architecture comprises a client portion 401 and a server portion 404. One skilled in the art will recognize that the SBSMS need not be implemented according to a client-server architecture and may be implemented instead as a monolithic program. Alternatively, the SBSMS may have client and server portions, but they may execute on the same machine. One skilled in the art will recognize that any well-known implementation approach will work with the SBSMS techniques, whether explicitly mentioned or not.

In an example embodiment, the client portion 401 includes a simulation engine that is run by a student and tracks the student's responses. A simulation engine is a simulated application execution environment. It may be present in some form on both a client system and a server system. The simulation engine may be implemented as a physical component or may be an abstraction of a plurality of components. Typically, the client simulation engine 401 comprises, from a functional perspective, a testing or training interface 402 and a response tracking and scoring mechanism 403. The interface 402 is specific to the scenario being run by the student; that is, if the scenario is a simulated application (or aspects thereof), then the interface 402 includes the simulated aspects of the application. Alternatively (or additionally), if the scenario contains non-simulation questions, such as multiple choice questions or ordering words in a sentence, then the interface 402 includes the appropriate engine (e.g., code, logic, and presentation) to support the student to perform such actions. Once a student has completed the scenario, then the response tracking and storing mechanism 403 provides response data, including preferably a description of the actions (e.g., keystroke sequences, mouse movements, or interface command sequences) over a communications network 409 to the server portion 404.

The server portion 404 comprises all of the components and data that are used to implement the (client-side) simulation engine 401. Thus, from a functional perspective, the server portion 404 comprises a skills-based testing and training engine 405, simulation components 406, non-simulation components 407, and tests and training scenarios and student data, which are stored in data repository 408. The skills-based testing and training engine 405 functions as a server-side simulation engine. It receives requests for portions of a particular testing or training scenario and forwards components from the simulation components 406 and the non-simulation components 407 as needed to implement the client-side simulation engine 401. Components 406 and 407 are invoked to implement the testing or training interface 402 and the response tracking and scoring mechanism 403. The skills-based testing and training engine 405 also receives student responses and scores from the client-side simulation engine 401 and stores them on a per user, per test basis in the data repository of test/training scenarios and student data 408.

Figure 5:
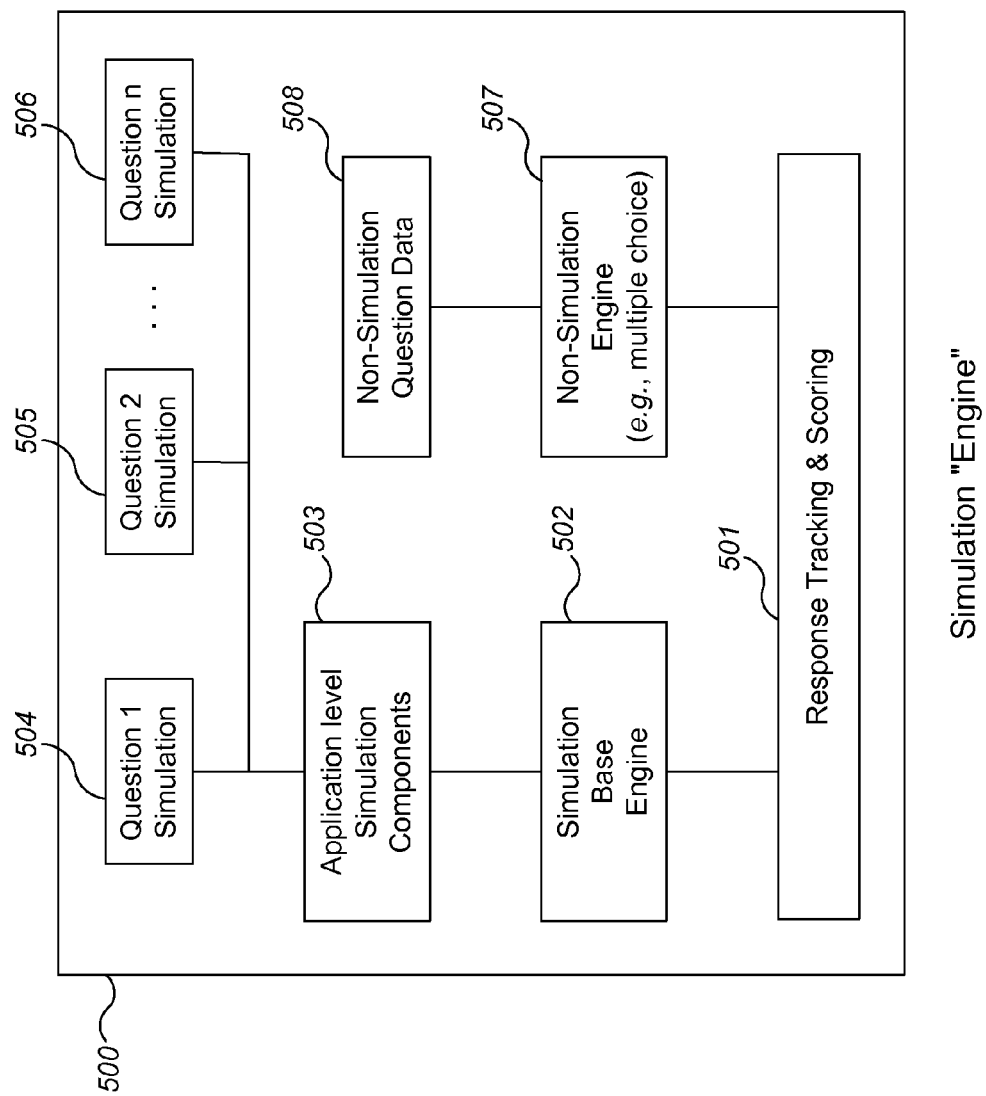
FIG. 5 is an example block diagram of a simulation engine of an example Skills-Based Simulation and Measurement System.

FIG. 5 is an example block diagram of a simulation engine of an example Skills-Based Simulation and Measurement System. In an example embodiment, simulation engine 500 is an abstraction in that the individual components 502-508 exist independently and are incorporated as needed to implement a particular testing or training scenario. One skilled in the art will recognize, however, that a physical component with the subcomponents shown could be constructed and managed in the computer system as an independent component. Simulation engine 500 is shown from a server system perspective and presumes that a particular scenario includes both simulation questions and non-simulation questions (which may not be the case). It contains a response tracking and scoring component 501, one or more non-simulation engines 507 for presenting and managing non-simulation questions using non-simulation question data 508, and simulation components 502-506 for presenting and managing simulation questions. Specifically, the simulation components comprise a simulation base engine 502, one or more application level simulation components 503, and one or more simulation question components 504-506. The simulation base engine 502 provides the basic level support for any simulated application environment, including the logic that controls the flow of a simulation, e.g., how the next question is found and presented regardless of the particular application being simulated, when a student's response is recorded, etc. Each scenario derived from an application to be simulated potentially has simulated aspects that are shared across questions. These simulated aspects are what comprise the application level simulation components 503. Such aspects as control of menus and menu items specific to the application may be implemented as components 503. (For example, the Excel menus and dialogs shown in FIGS. 3A-3G may be implemented as components 503.) Simulation engine 500 also contains a simulation component for each question to be presented, for example, question simulation components 504-506. Each simulated question component contains the specific interfaces and data to implement a question and its answer. One skilled in the art will recognize that other components may also be present, such as components that support generating menus and simulated interaction support for an application (e.g., generic menu and menu item handling code).

The simulation engine 500 illustrated in FIG. 5, is used to create the environment executed on a client system to run a simulated application scenario. Specifically, the components of FIG. 5 are used to generate and implement the testing or training interface 402 and the response tracking and scoring mechanism 403 that comprise the client-side simulation engine of, for example, FIG. 4. In one embodiment, however, instead of preloading each question simulation component to the client system at once, the individual question simulation support is downloaded to the client system on an "as-needed" basis. Such delayed loading is described further in detail with respect to FIGS. 28A-28C. In another embodiment, all of the simulation question information for the entire scenario is downloaded initially to the simulation engine on the client system.

Figure 6:
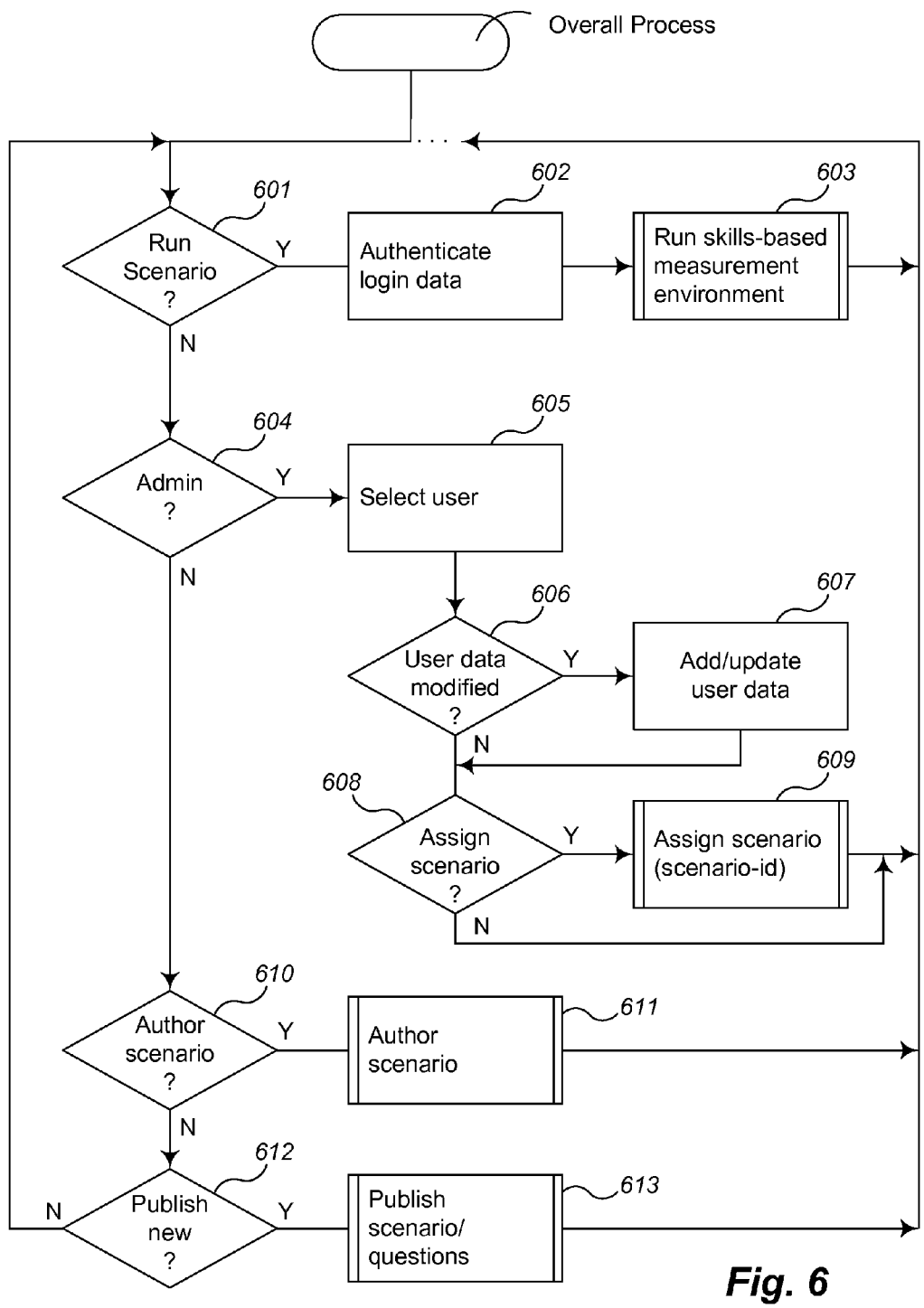
FIG. 6 is a flow diagram of the overall process of using an example Skills-Based Simulation and Measurement System to create, manage, and administer skills-based measurement scenarios.

FIG. 6 is a flow diagram of the overall process of using an example Skills-Based Simulation and Measurement System to create, manage, and administer skills-based measurement scenarios. An example SBSMS may present an initial interface to allow a user to select between these different functions (display screens not shown). Although these steps are shown as discrete steps in an overall process, one skilled in the art will recognize that the following functionality can be presented in different orders and at different times and combined in a different manner. A user interacts with an example SBSMS to (1) run a scenario; (2) administer roles and scenarios to users; (3) author a new scenario or modify an existing one; and (4) publish new scenarios and new simulation questions.

Specifically, in step 601, if a user indicates a desire to run a scenario, then the user continues in step 602, else continues in step 604. In step 602, the user as student provide login information to the SBSMS, and the login data is authenticated. In step 603, the SBSMS begins its basic skills-based testing and training execution environment and executes a scenario selected by the student. When the scenario finishes running, the student can continue to run another scenario, or continue on with the other capabilities of the Skills-Based Simulation and Measurement System. These steps are described further with reference to FIGS. 7-13.

In step 604, if the user indicates that administration is desired, then the user as administrator continues in steps 605-609 to modify user properties and assign various scenarios to them, else continues in step 610. Specifically, in step 605, the administrator selects a particular user for administration (or specifies a new user). In step 606, if the administrator modifies any user properties, then in step 607 the user data is updated or added to the appropriate data repository which stores that particular user's data. Otherwise, the administrator continues in step 608. In step 608, if the administrator desires to assign a scenario to the selected user, then the administrator continues in step 609, else either continues to apply administrative functions to another user or decides to do something else with the Skills-Based Simulation and Measurement System. In step 609, the administrator executes a series of steps to assign a scenario having scenario_ID to the selected student. These steps are described further with reference to FIGS. 14-15.

In step 610, if the user desires to act as an author and to author a new (or modified) scenario, then the user as author continues in step 611 to invoke other steps to author a scenario, else continues in step 612. The particular steps involved in authoring a scenario are described with reference to FIGS. 16-21. Once the author has finished, then the author can continue to author another scenario or execute any of the other functions of the Skills-Based Simulation and Measurement System.

In step 612, if the user desires to publish either a new simulation scenario or simulation questions for a scenario, then the user as publisher continues in step 613 to publish a new simulation scenario or modify an existing one with new simulation questions. The steps for publishing a new simulation scenario or new simulation questions are described with reference to FIGS. 22-23. Once the publisher has finished, then the publisher can continue to publish another scenario or execute any of the other functions of the Skills-Based Simulation and Measurement System.

Figure 7:
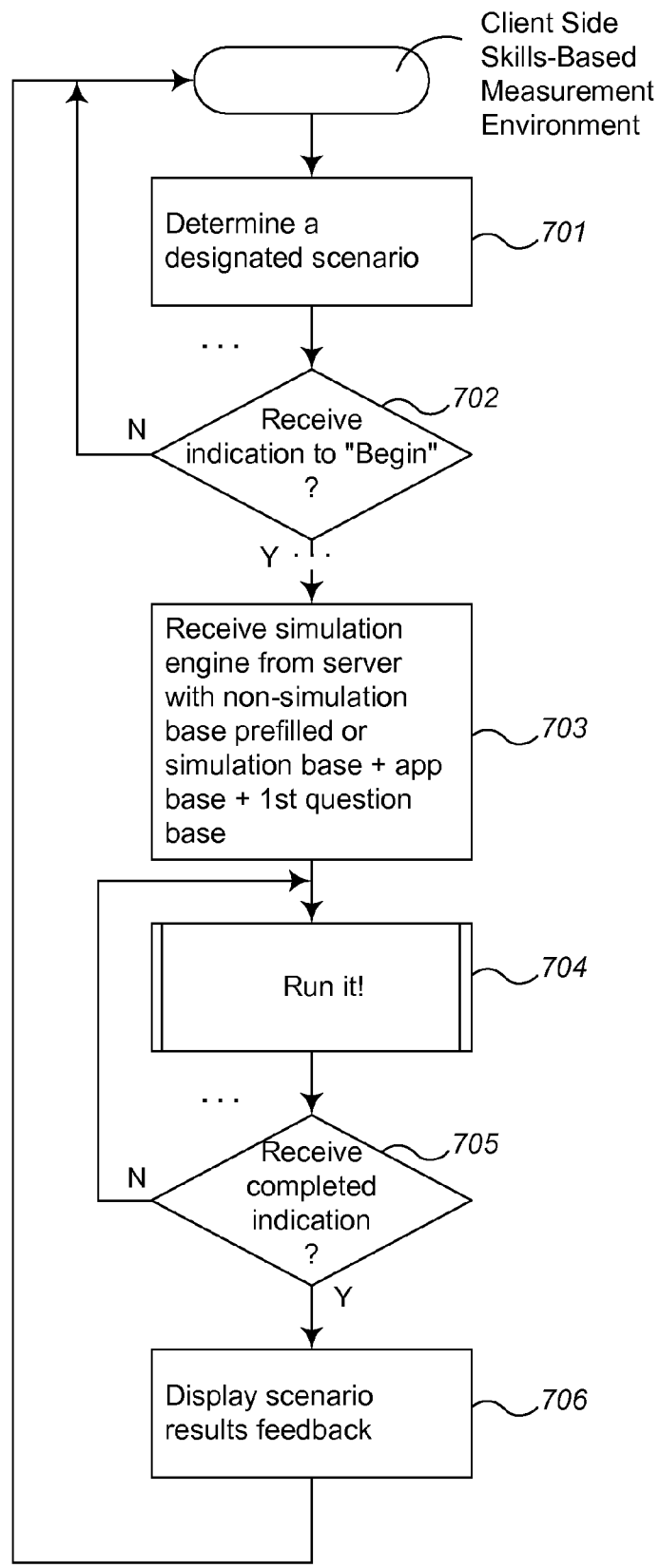
FIG. 7 is an example flow diagram of the steps performed by an example skill-based measurement environment to run a simulation on a client system.

FIG. 7 is an example flow diagram of the steps performed by an example skill-based measurement environment to run a simulation on a client system. Although the steps are shown as performed in a sequence, one skilled in the art will recognize that, especially in a web-based environment, the actions that are processed are data (or event) driven as opposed to flowing in a particular order driven by the code. Thus, the steps are presented as responsive to certain events (buttons in the interface being pressed, for example). The steps shown are exemplary of the process that occurs after a student has successfully logged onto the skills-based measurement environment to execute either a test or training scenario.

Specifically, in step 701, the system determines which scenario the student has designated. For example, a display screen such as that shown in FIG. 1 may be presented from which the user can designate a scenario. Using FIG. 1 as an example, once the student selects the "Take Test" indicator on a particular test, an introductory display screen for the selected test is displayed, for example, the display screen shown in FIG. 3A. Thereafter, in step 702, when the student selects the "Begin" button for the selected test (for example "Begin" button 3A05 in FIG. 3A), the environment begins the selected test by requesting and loading a series of files/pages from the server. (Until the student presses the "Begin" button, the interface may do other things, which are indicated by the ellipses and the return to the scenario selection screen.) Specifically, in step 703, which actually is representative of a multitude of smaller communications between the client and server, the client receives a simulation engine from the server. The server decides what components to send as the simulation engine based upon the first question. For example, if the first question is a simulation question, then the simulation engine will typically contain a simulation base engine (that is used for all simulations) with an application base simulation component and the simulation for the first question. Alternatively, if the first question is a non-simulation question, then the appropriate type of non-simulation engine will be pre-filled with the data for the questions that use that engine. (The questions that use that type of engine may be a subset of the total questions for the test scenario.) For example, if the first question is a multiple choice question, then a multiple choice engine is downloaded and pre-filled with non-simulation question data for that test. Additional examples of the components that are sent by the server are described further with reference to FIGS. 22 and 23. Once the simulation engine is received, then in step 704 the simulation is effectively "run" (executed, or whatever action is appropriate to the implementation). This means, for example, if the simulation engine is implemented as a series of web pages, then the first web page is processed and any subsequent data or web pages are requested by the web browser as appropriate from the server system. A typical flow of control of a running simulation engine is described further with reference to FIG. 8. In step 705, upon receiving an indication that the student has completed the test or training scenario (for example, by pressing a "Done" button on the last question), then the environment continues in step 706. Until then, as indicated, the simulation continues to run. In step 706, the system displays any results from the scenario to give feedback to the student and returns to the test selection component of the skills-based measurement environment.

Figure 8:
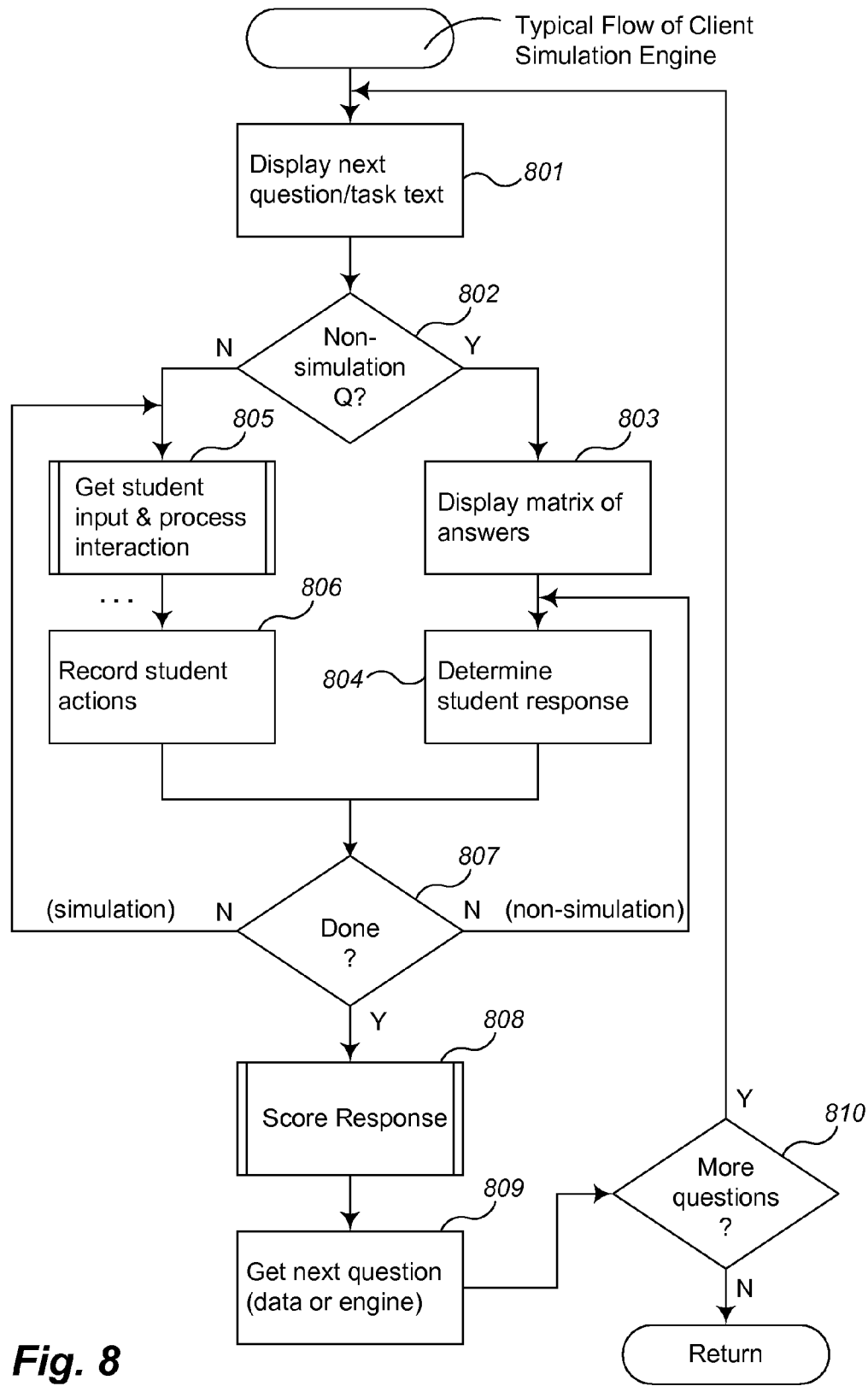
FIG. 8 is an example flow diagram of an example simulation engine run by a client system.

FIG. 8 is an example flow diagram of an example simulation engine run by a client system. One skilled in the art will recognize that there are any number of ways to both implement the simulation engine and to characterize its flow. In the example shown in FIG. 8, the test is presumed to comprise both simulation and non-simulation questions. In summary, each question is retrieved (if necessary), presented, and responses recorded, until no more questions remain in the test. Specifically, in step 801, the engine displays text of the next question or task to be performed, and continues in step 802. In step 802, if the question is a non-simulation question, such as a multiple choice question, then the engine continues down one path in step 803, else the engine continues down another path in step 805.

According to the non-simulated question path, in step 803, the engine displays the answer or potential set of answers as determined by the type of non-simulation question engine. For example, if the type of engine is a multiple choice engine, then in step 803 the matrix of answers (determined initially from the data repository) is presented. Alternatively, if the engine is a story grammar engine, then the engine displays the story and multiple choices of phrases or words from which the student needs to select a word/phrase for a location in the story. Also, alternatively, if the type of engine is an ordered sentence engine, then the engine displays a series of words, which the user needs to order to form a sentence. In step 804, the engine determines the student's response and continues in step 807.

Alternatively, if the question is a simulation question, then in step 805 the engine obtains or determines the student's input (actions) and processes any commands (the user interface) accordingly. For example, if a web-based environment is used to implement the simulation engine, then the appropriate code for processing the various simulated user interface components of the application is invoked as needed. Typically, invocation of simulated interface aspects will involve communication with and partial execution by the server system. However, one skilled in the art will recognize that, in some embodiments, the entire code to support the interface is downloaded to the client. Thus, step 805 for a simulation question could comprise many steps. In step 806, after each command, the engine records the student's actions. This recordation of actions of course can happen on the process of every command or some other combination of actions and is up to the implementation of the simulation engine. Once the student has indicated completion of the task or has appropriately responded to the question, then the engine continues in step 807.

In step 807, once the student has indicated that the response is complete, then in step 808, the engine invokes the scoring and calculation mechanism to score the student response to the question. Scoring is described further with reference to FIGS. 10-13. In step 809, the engine obtains the next question. If the next question is a simulation question, then, typically, the simulation engine will retrieve the simulation component for the next question from the server. Alternatively, if the next question is a non-simulation question, then appropriate data is filled into the presentation (form, web page, etc.) that is currently being processed in the simulation engine. In step 810, the simulation engine determines whether there are more question/tasks remaining in the scenario, and, if so, continues back to process the next question in step 801, else ends processing.

Figure 9:
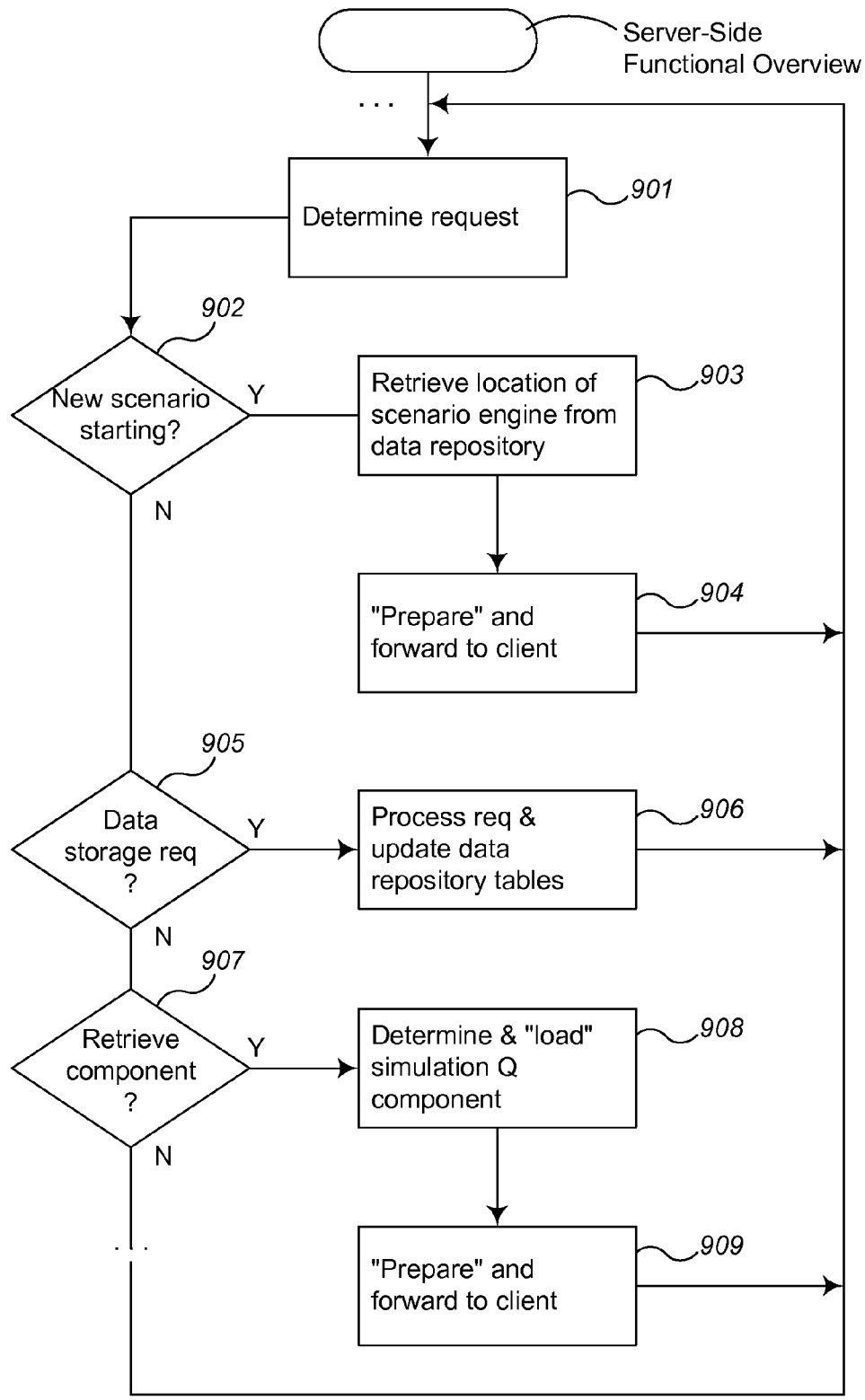
FIG. 9 is an example flow diagram of an overview of the steps performed by a server system to support the running of example simulation engines on a client system.

FIG. 9 is an example flow diagram of an overview of the steps performed by a server system to support the running of example simulation engines on a client system. Exemplary steps are shown, however one skilled in the art will recognize that lots of other processing or different processing may take place. In summary, the server is responsible for determining and retrieving the right components for the client-side simulation engine and persistently storing the students' responses to scenarios and scores, etc. Specifically, in step 901, the server interface (HTML page server, ASP.NET engine, or other similar server application) determines the request being processed. In step 902, if the request indicates that a new scenario is to be downloaded, then the server environment continues in step 903, else continues in step 905. In step 903, the server retrieves from the data repository a location of the appropriate scenario engine to download. For example, if the first question of the scenario is a simulation question, then the data repository tables typically contain a reference to the base simulation engine (that controls basic flow and interfaces for all simulations). In step 904, the server prepares the rest of the simulation engine for the client and forwards it to the client. For example, in a web-based environment such as ASP.NET, the preparation process could involve loading web pages on the server, compiling them, causing the XML controls to render themselves to create an HTML file to send to a client system (along with potentially javascript code files). One skilled in the art will recognize that this step is implementation dependent. The server then continues to determine another request or to wait until the server interface is invoked again (as indicated by an ellipses or a return to step 901).

In step 905, if the request is to process some type of data storage information, then the server continues in step 906, else continues in step 907. In step 906, the server processes the request and updates the data repository tables as appropriate to the request, and then continues to step 901 to wait for the next request or perform other processing. For example, one such data storage request might be to store the score information and the answers (and recorded actions) for a particular student for a particular test.

In step 907, if the request is to retrieve another component from the server environment, then the server continues in step 908, else continues other processing to be performed by the server. In step 908, if the request is to retrieve, for example, a simulation component for a next question, then the server determines which component to access, retrieves it, and loads the simulation component appropriately for that question. In step 909, the server prepares the component as appropriate (for example, rendering HTML as described earlier) and forwards the simulation engine component to the client system. One skilled in the art will recognize that this step is highly implementation dependent. The server then continues with other processing or waits for the next request.

Figure 10:
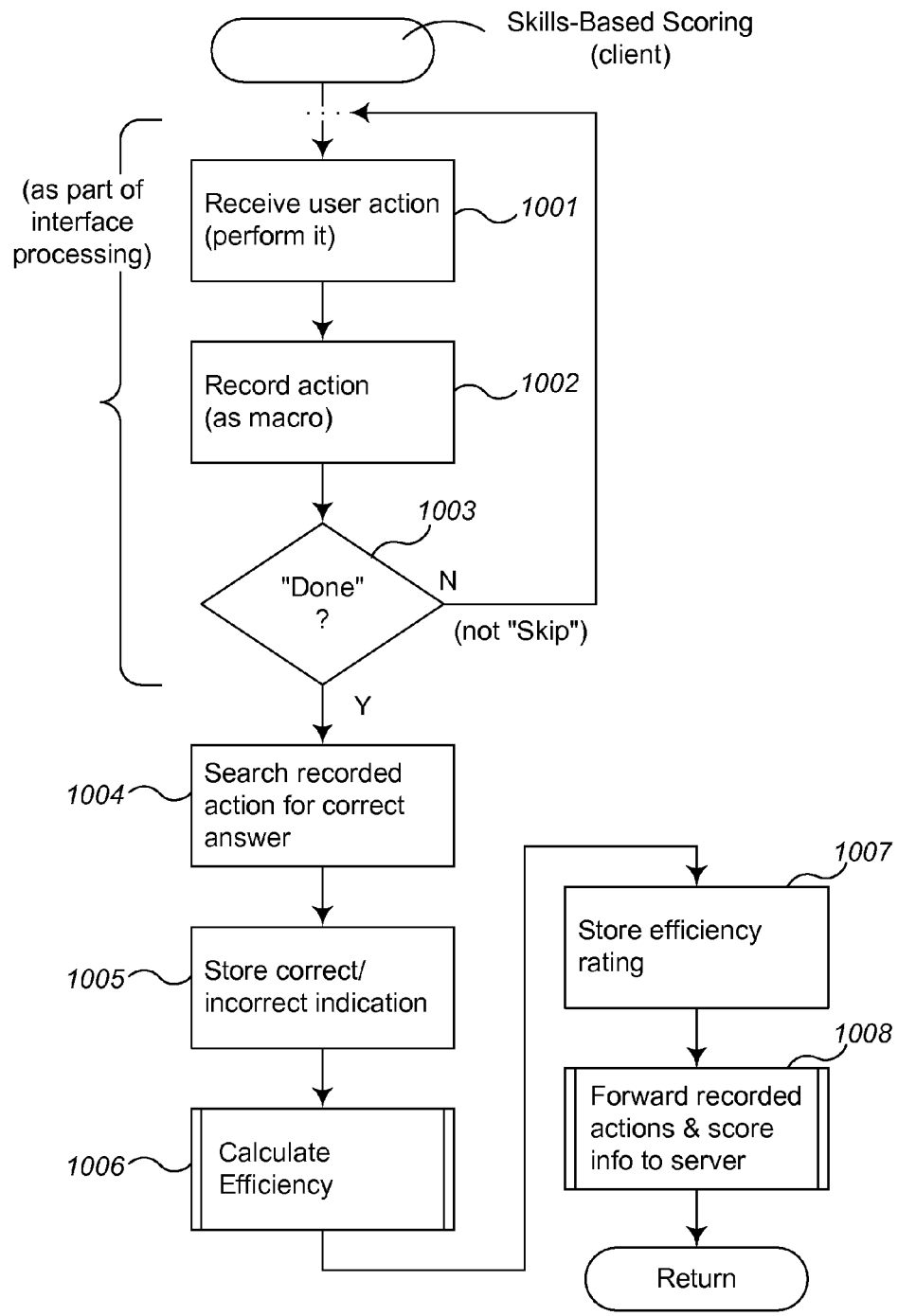
FIG. 10 is an example flow diagram of the skills-based recording and scoring process of a Skills-Based Simulation and Measurement System from a client system perspective.

FIG. 10 is an example flow diagram of the skills-based recording and scoring process of a Skills-Based Simulation and Measurement System from a client system perspective. Steps 1001-1003 record the student's actions until the student indicates completion a the response. These steps are shown as part of FIG. 10 to emphasize that the student's actions are typically recorded by the simulation as they are performed. However, steps 1001-1003 were described with reference to FIG. 8 as part of the overall process of running a simulation on the client system. Specifically, in step 1001, the simulation engine receives an indication of a student action and performs it accordingly. In step 1002, the simulation engine records the student's action. For example, in one embodiment, the simulation engine records all of the user's keyboard actions in terms of commands like a recorded macro. In step 1003, when the student presses the "Done" button, then the simulation engine continues in step 1004, otherwise continues back to step 1001 and continues to perform actions in response to the question.

In step 1004, once the student has indicated completion of a response, the simulation engine searches the recorded actions that were recorded over the entire response for the correct answer. For example, in one embodiment of simulation questions, the correct answers for a particular question are stored in the corresponding question simulation component. The simulation engine then searches the recorded actions for any instance of the correct answer (correct command) in order to determine whether the answer at some level is correct. One skilled in the art will recognize, however, that depending upon the question, this technique may not always be viable. Also, one skilled in the art will recognize that there are other ways to determine whether the recorded action is a correct answer to that question. For example, in response to certain questions, the simulation may require an exact set of actions being present even if they are in the wrong sequence. Alternatively, the answer may only being designated as correct if the sequence is also correct. Other combinations are also possible, In step 1005, the simulation engine stores an indication of whether the recorded actions (the response) was correct or incorrect. Then in step 1006, the simulation engine performs some kind of calculation as to the efficiency of the response. In one embodiment, efficiency is calculated by the following formula:

$$(\text{\# target answer actions}/\text{\# actual actions}) \times 100 = \text{Efficiency \%} \quad (1)$$

One skilled in the art will recognize that there are a number of ways to calculate efficiency using similar formulas. For example, a number of actions in a response can be compared with an optimal number of actions or a component also taking into account the sequence of the actions and how many times the actions are out of sequence, etc. One skilled in the art will recognize that this calculation can get as complex as desired. In step 1007, the simulation engine stores the calculated efficiency rating, and then in step 1008 forwards the score information including the recorded actions, efficiency rating, and the correctness indicator to the server, and then returns.

Figure 11:
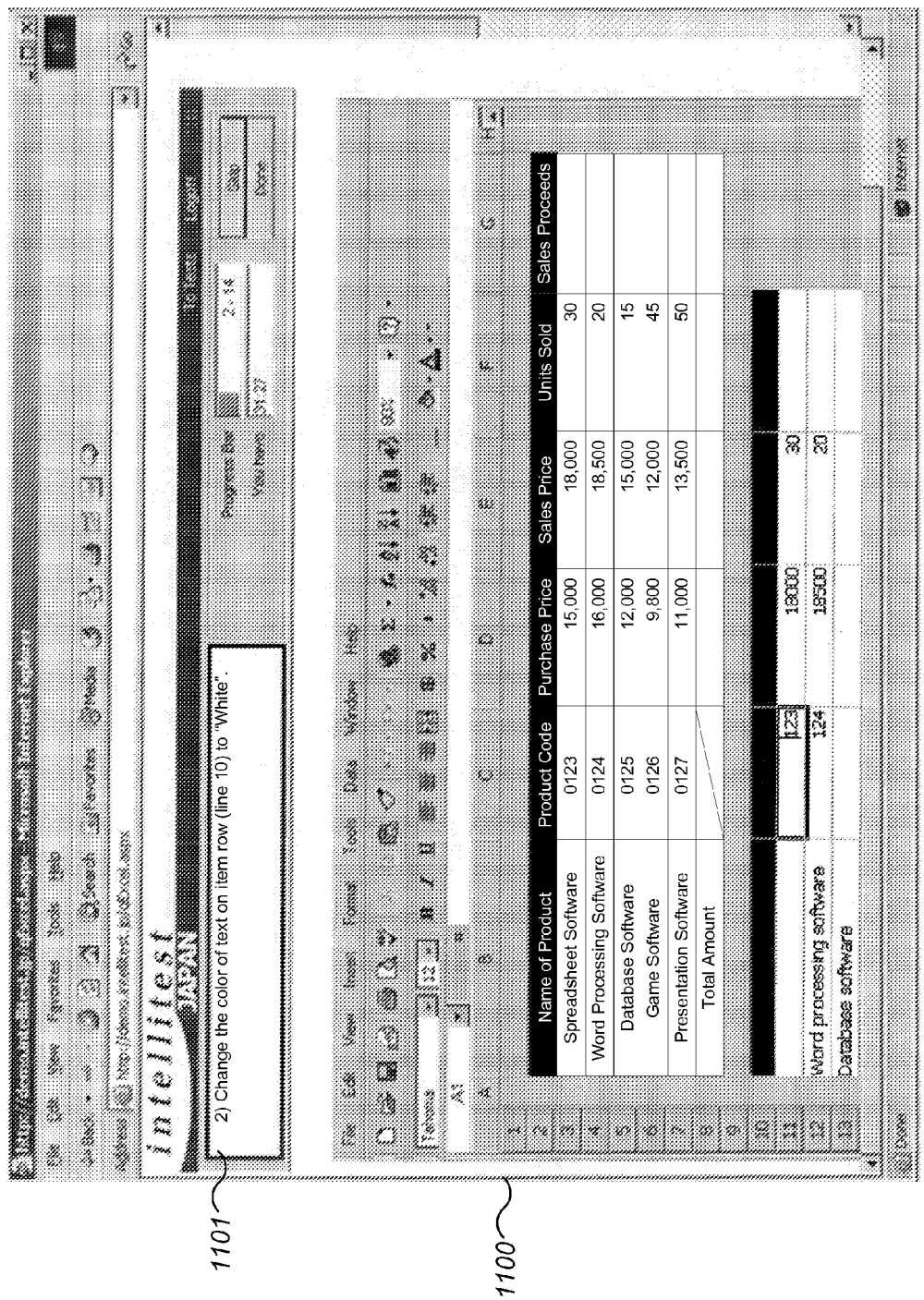
Figure 12:
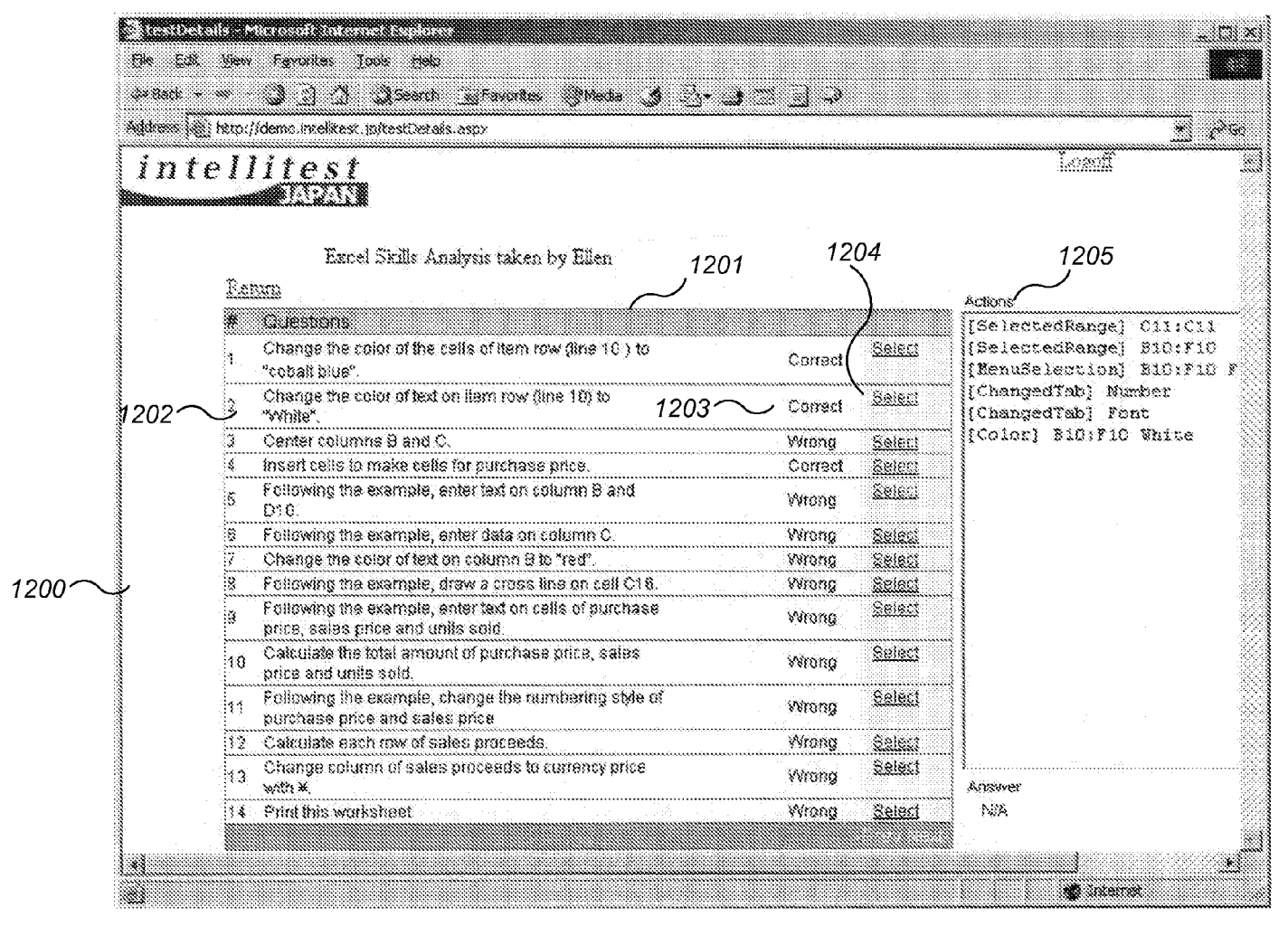
Figure 13:
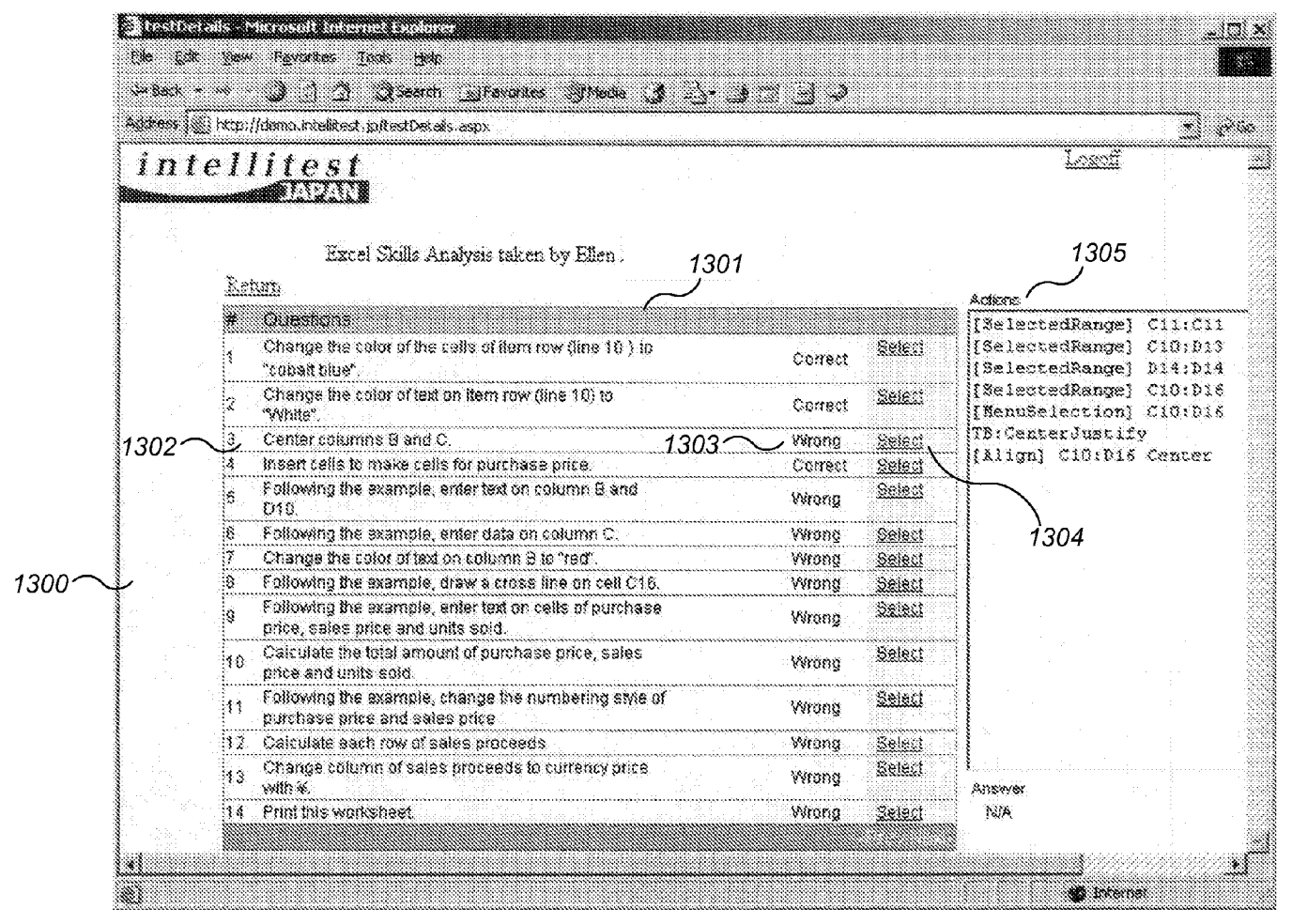

FIGS. 11-13 are display screens that illustrate recorded actions using an example recording and scoring mechanism of a Skills-Based Simulation and Measurement System. FIG. 11 is an example display screen of an example test used for showing recorded actions. In display screen 1100, the text of question area 1101 presents the task to be performed: "2) Change the color of text on item row (line 10) to 'White'." The student then performs actions to respond to the given task.

Figure 15:
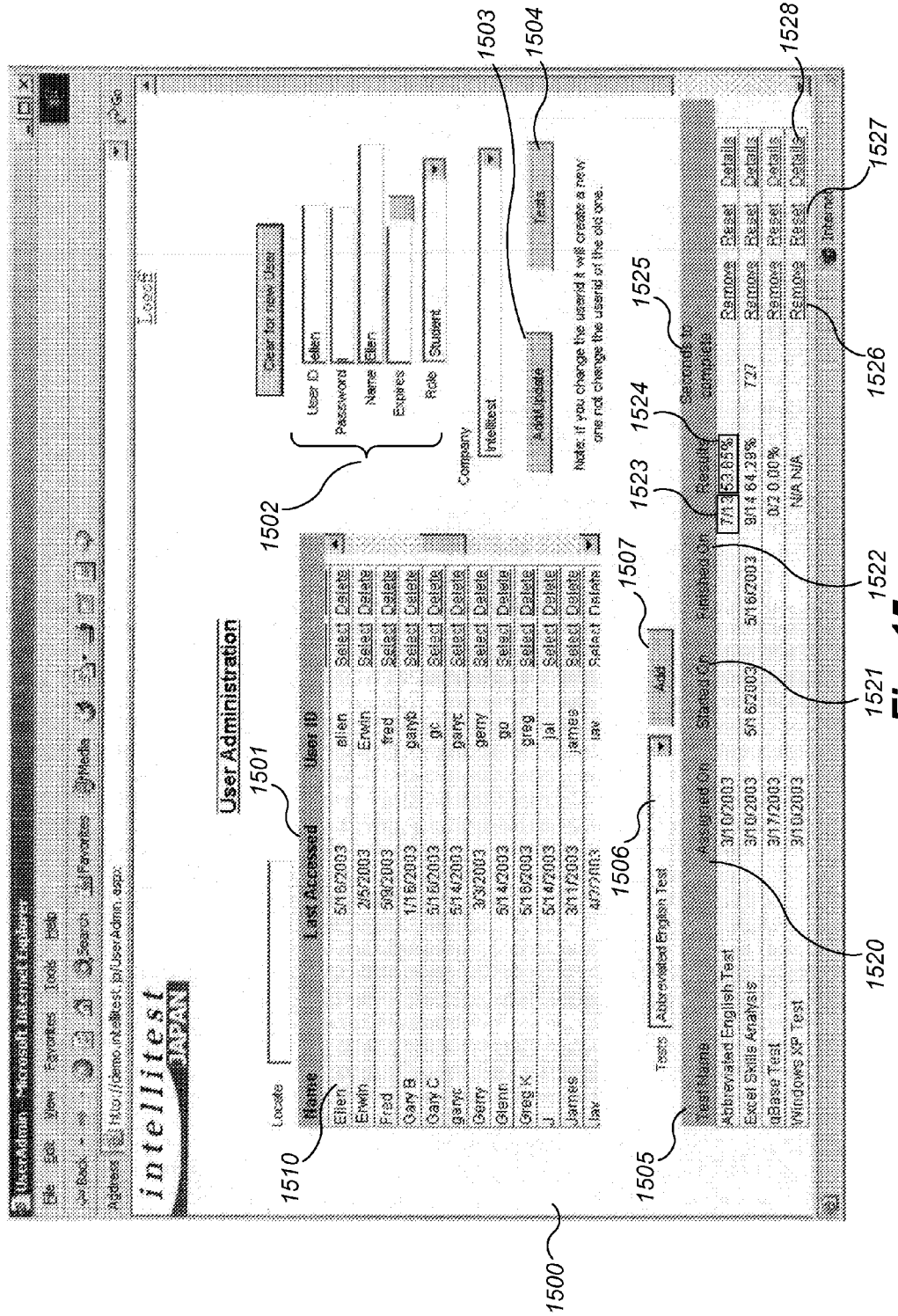
FIG. 15 is an example display screen of an administration interface of an example Skills-Based Simulation and Measurement System.

FIG. 12 is an example display screen of recorded actions stored by an example simulation engine for a correctly answered question. In display screen 1200, a list of questions 1201 contained in the test is displayed along with an indication, for example, "Correct" indicator 1203, of whether the question was answered correctly or incorrectly. When a "Select" indicator 1204 is selected for a particular question, for example, question 1202, the recorded actions for the student response to that question are displayed in the recorded actions preview window 1205. Typically, an administrator would review the recorded actions and have access to this display screen. Access to this display screen from an administrator interface is shown in FIG. 15.

In the example shown in FIG. 12, one can observe the student's response to the question presented in FIG. 11. Specifically, question 1202 contains the text shown in FIG. 11. The "Correct" indicator 1203 indicates that the student answered (or responded) to the question (task) correctly. When the "Select" indicator 1204 is selected, the actions that were typed by the student in response to question 1202 are displayed in action preview window 1205. The preview window 1205 shows that the student's actions were to select a single cell (incorrectly) first followed by a correct selection of cell members B10 through the range of F10. The student then selected the Format menu and eventually changed the tab to display the correct (Font) property sheet, whereupon the student correctly selected the color "White" for the previously selected range of cells. Thus, one can see that the correct answer was achieved by changing the text on line 10 to white; however, not all of the actions performed by the student were necessary to achieve that answer, and, in fact the student made several mistakes. Thus, when the simulation engine calculates an efficiency rating (see, for example, step 1006 in FIG. 10) although the answer might be correct, the efficiency would be lower than optimal.

FIG. 13 is an example display screen of recorded actions stored by an example simulation engine for a incorrectly answered question. One can observe that the task shown in question 1302 of display screen 1300 was to "Center columns B and C." The "Wrong" indicator 1303 indicates that the student responded to this question incorrectly. Thus, when the administrator presses the "Select" indicator 1304, the set of student actions performed in response to this task are shown in the recorded actions preview window 1305. One can observe that the actions of the student were to select a cell, then select a range, then to select another cell and another range, finally the correct column ranges were selected. Thereafter, the student selected the correct menu and menu item to "center justify," however the range of the cells were incorrect, rendering the entire response displayed in window 1305 incorrect.

Figure 14:
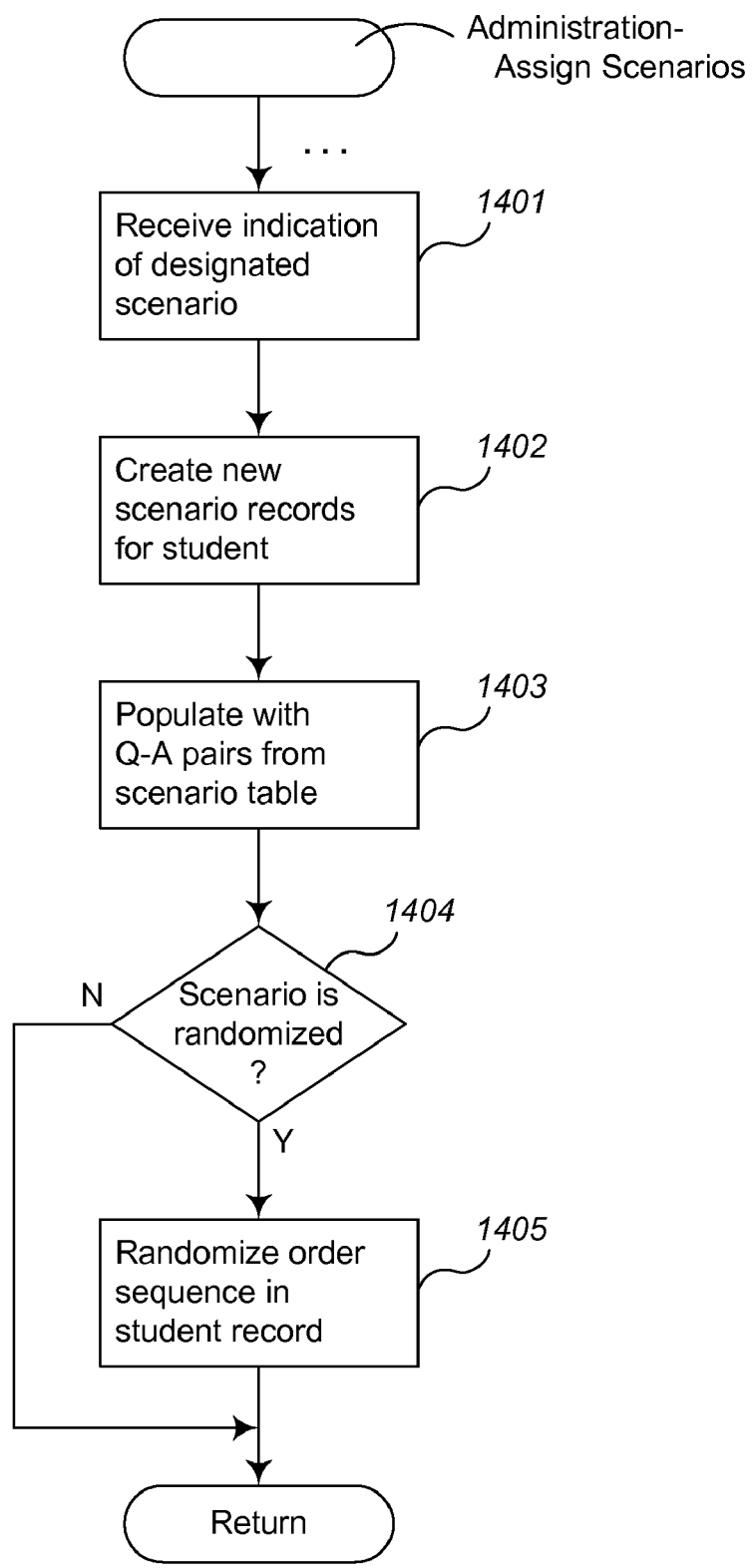
FIG. 14 is an example flow diagram of an Assign Scenario routine of an administration interface of an example Skills-Based Simulation and Measurement System.

As described earlier, in addition to running scenarios, a Skills-Based Simulation and Measurement System enables administrators to manage user roles and assign scenarios to students. FIG. 14 is an example flow diagram of an Assign Scenario routine of an administration interface of an example Skills-Based Simulation and Measurement System. This routine corresponds to step 609 in FIG. 6, and allows an administrator to assign a scenario to a designated student. In step 1401, the administration system receives an indication of the designated scenario from an administrator. In step 1402, the administration system creates new records in the data repository that correspond to the designated scenario for the designated student. The designated student was selected by the administrator prior to invoking this routine, for example, in the overall process described in FIG. 6, step 605. In steps 1403-1405, the administration system updates tables in the server's data repositories to associate the designated scenario with the designated student. The precise data records that need to be created and update are dependent upon the implementation of the data repository. One data repository organization is described further with reference to FIG. 26. In one embodiment, in step 1403, the system populates a newly created scenario record with references to question/answer pairs that correspond to the scenario as defined in tables that describe what questions and matching answers are associated with which scenarios. For example, in one embodiment, each scenario is associated in a data repository table with all of the question/answer pairs that correspond to that scenario. When a new scenario is assigned to a particular student, a reference to each of these pairs is created so that particular student information concerning that test and those question-answer pairs can be stored on a per-user basis. Since each question can have attributes for a scenario that are specific to the student, (for example, the order of questions presented) a copy of the question-answer pair or a reference to the question from a question information record is allocated in a table that corresponds to that particular scenario for that particular student. In step 1404, the administration system determines whether that particular scenario is a randomized scenario, meaning the questions are presented in random order, and, if so, continues in step 1405, else returns. In step 1405, the system randomizes the sequencing order of the question/answer pairs for that particular scenario record for that student. A simulation engine presents that questions in the sequence they are defined in the scenario record for that student. The Assign Scenario routine then returns back to the administration interface of the SBSMS.

FIG. 15 is an example display screen of an administration interface of an example Skills-Based Simulation and Measurement System. Display screen 1500 shows a list of users 1501 which can be configured by an administrator. When a current user of the system, such as user 1510, is selected, then the current user information is pre-filled in the user properties 1502. Each user has an associated user ID, a password, a name, and account expiration date, and a role, such as student, administrator, publisher, or author. These properties are reflected in the fields of user properties 1502. A user's property values may be changed by an administrator and the system updated accordingly by selecting the "Add/Update" button 1503. Once a user has been selected, tests (or other scenarios) can be associated with that user by selecting the "Tests" button 1504. When the "Tests" button 1504 is selected, a list of the tests currently assigned to that user (as student) is shown in current test list 1505. To add a new test, the administrator selects a test from a drop-down available test list 1506 and presses the "Add" button 1507.

The administration interface can also be used to determine and observe the details of scenario results and the recorded actions stored for each answered question. Specifically, current test list 1505 shows the Data associated with each test (scenario). For each test, the list 1505 shows the date the test was assigned 1520, the date the test was started if it has been taken 1521, the date the test was finished 1522 if finished, and any results for the test. For example, the number of questions answered out of the total number of questions is shown in field 1523, the percentage of the questions answered in field 1524, and the total seconds to complete the test in field 1525. If, the SBSMS maintains an overall efficiency score for the entire test, then this can be shown in the current test list 1505 as well. Alternatively, if an efficiency score or any other kind of measurement of the skill of the student in responding to a question is limited to the question, then the score may only be shown on the "details" data sheets for the particular question. An administrator can remove a scenario from the current test list 1505 by selecting the "Remove" indicator 1526; can reset a scenario so that it will clear any prior results by selecting the "Reset" indicator 1527; and can view the recorded actions for each question of a scenario by selecting the "Details" indicator 1528. For example, an administrator can navigate to the display screens described with reference to FIGS. 12 and 13, which illustrated a series of recorded actions for a correctly answered question and incorrectly answered question respectively, by selecting the "Details" indicator 1528 for the Excel Skills Analysis test.

Figure 16:
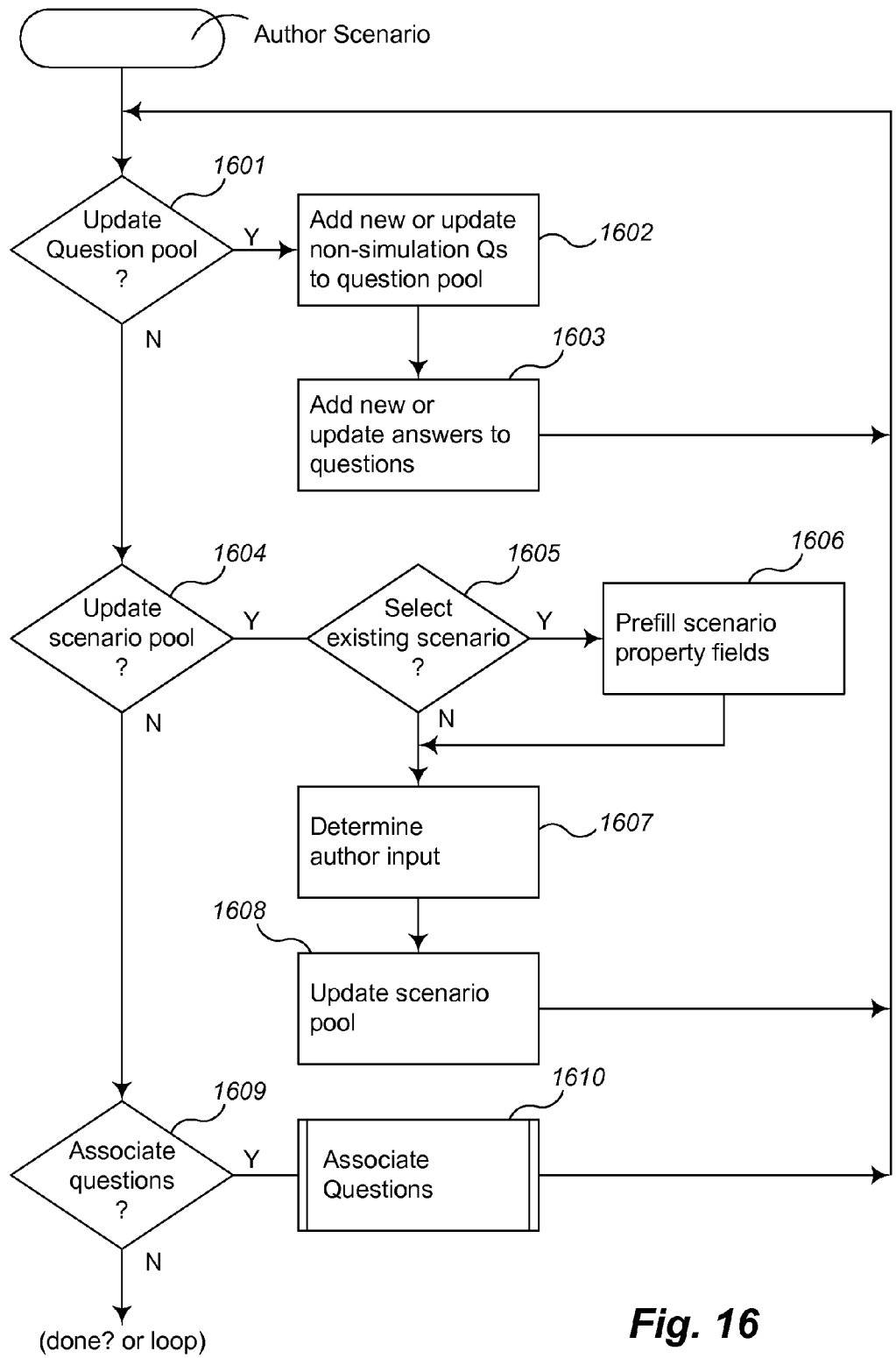
FIG. 16 is an example flow diagram an Author Scenario routine of an authoring interface of an example Skills-Based Simulation and Measurement System.

In addition to running scenarios and administering scenarios, a Skills-Based Simulation and Measurement System enables authors to create new scenarios from existing questions, to create new non-simulation questions, and to modify the properties associated with a particular scenario. FIG. 16 is an example flow diagram an Author Scenario routine of an authoring interface of an example Skills-Based Simulation and Measurement System. As described earlier, a user as an author may generate a new test or training scenario using either existing simulation questions or by using existing non-simulation questions or by adding new non-simulation questions. (In a current embodiment, in order to create new simulation questions, a user must publish the questions as a publisher using tools provided by the Skills-Based Simulation and Measurement System.) In summary, in steps 1601-1603, the author adds new or changes existing non-simulation questions; in steps 1604-1608 changes attributes of a particular scenario; and in steps 1609-1610, associates existing or newly created non-simulation questions with a designated scenario.

Specifically, in step 1601, the Author Scenario routine determines whether the author has requested an update to a "pool" of available questions and, if so, continues in step 1602, else continues in step 1604. In step 1602, the routine, depending upon the author's selections, adds a new non-simulation question to the pool or updates an existing non-simulation question with new property values. In step 1603, the routine allows an author to add answers for a newly created non-simulation question or to update a set of existing answers to an existing non-simulation question. For example, the author can add some number of possible answers to a new multiple-choice question, or can add an additional possible answer to an associated set of answers to an existing multiple choice question. The routine then allows an author to continue modifying the pool of questions or perform another authoring activity (shown as returning to the beginning of the loop in step 1601).

In step 1604, the Author Scenario routine determines whether the author has indicated a desire to add a new scenario or to update an existing scenario in the "pool" of available scenarios, and, if so, continues in step 1605, else continues in step 1609. In step 1605, if the author has selected an existing scenario to modify, then the routine continues in step 1606, otherwise continues in step 1607. In step 1606, the routine pre-fills the property fields that specify information on a scenario. In step 1607, the routine determines the input from the author that specifies a new scenario or modifies the existing values of existing scenario property fields. In step 1608, the routine updates the pool of available scenarios to include the new/updated scenario pool. In embodiments where the scenario information is stored on a data repository associated with the server, then the appropriate information in the data repository is updated accordingly as well. The routine then allows an author to continue modifying the pool of scenarios or perform another authoring activity (shown as returning to the beginning of the loop in step 1601).

In step 1609, the Author Scenario routine determines whether the author has indicated a desire to associate questions with a designated test, and, if so, continues in step 1610 to invoke a routine to associate questions with the scenario. Otherwise, the routine allows an author to continue to associate questions with a different scenario or to perform another authoring activity (shown as returning to the beginning of the loop in step 1601).

Figure 17:
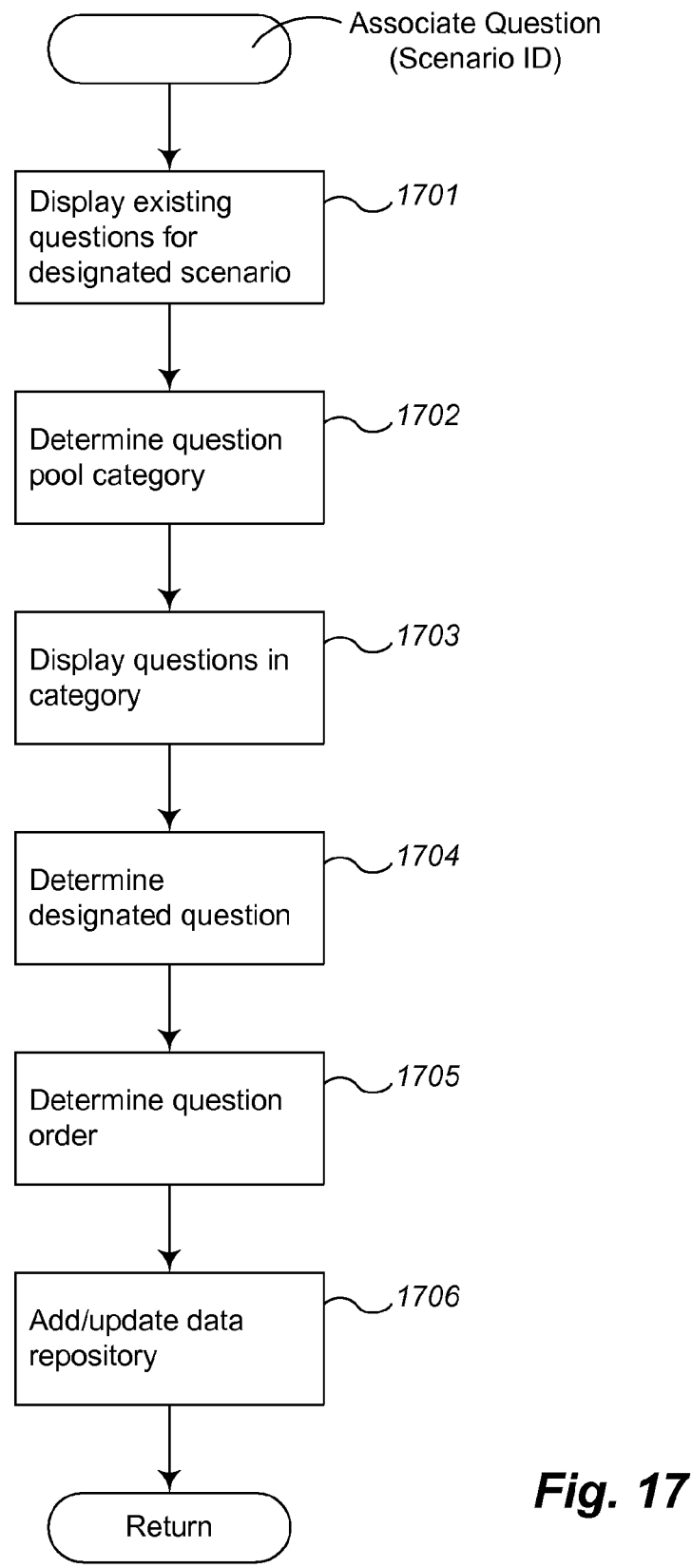
FIG. 17 is an example flow diagram of an Associate Question routine of an authoring interface of an example Skills-Based Simulation and Measurement System.

FIG. 17 is an example flow diagram of an Associate Question routine of an authoring interface of an example Skills-Based Simulation and Measurement System. The routine determines an existing question to associate with a designated scenario. In step 1701, the routine displays the existing questions that have already been associated with the designated scenario. In step 1702, the routine determines a category for filtering questions that are to be newly added to the scenario. Presenting questions by category is optional and is meant to aid in the process of quickly locating desired questions. In step 1703, the routine displays questions from the available question pool that match that selected category. This display can include simulation questions and non-simulation questions. One skilled in the art will recognize that a sophisticated search engine could be integrated into this step if deemed beneficial, for example, where the pool of questions is large. In step 1704, the routine determines, typically from author input, a designated question to add to the scenario. In step 1705, the routine determines a sequence order for that question, typically from author input. In step 1706, the routine creates a new data repository record associated with the designated scenario for the new question-answer pair or updates an existing record, and then returns. One skilled in the art will recognize that the illustrated steps can be repeated as necessary to add questions to a designated scenario.

Figure 18:
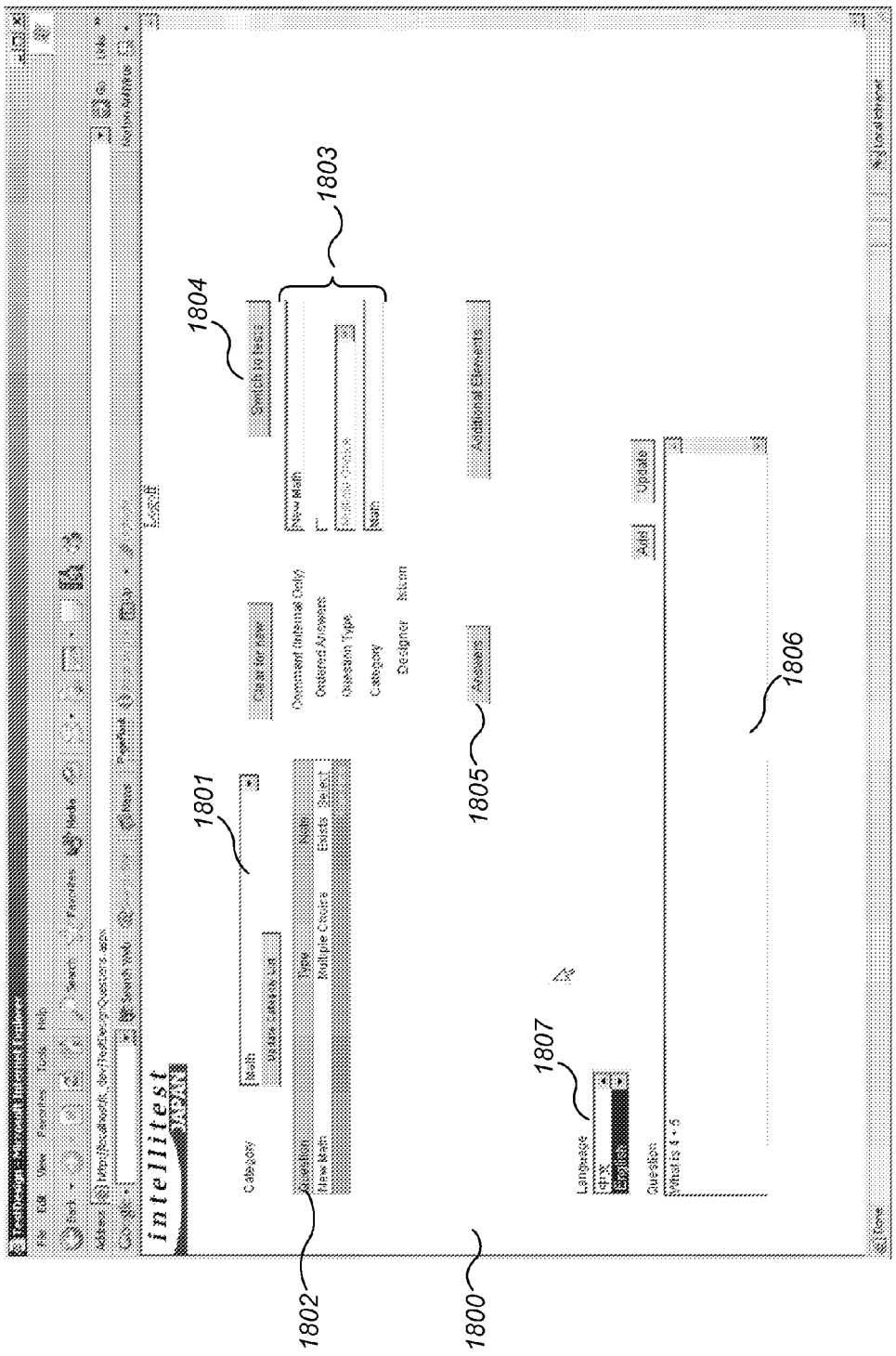
FIGS. 18-21 are example display screens of an authoring interface of an example Skills-Based Simulation and Measurement System.

FIGS. 18-21 are example display screens of an authoring interface of an example Skills-Based Simulation and Measurement System. FIG. 18 is an example display screen of the authoring interface for modifying a pool of available questions. In display screen 1800, the interface shows for a particular question category displayed in question category field 1801 a list of questions 1802 from the question pool that match that category. Note that new categories may also be added to the system, and that, as described earlier, an advanced searching engine may be incorporated wherever appropriate. When an existing question is selected from the list of questions 1802, then the data associated with that question is shown in the question property fields 1803. For an existing question, these fields are pre-filled with information from the data repository. So for example, a question by the internal reference name of "New Math" is shown as a multiple choice type question in a category of "Math" questions where the answers are not ordered any particular way. The existing text, graphics, or audio associated with the selected question is presented in question contents input field 1806. So, for example, the content for the question labeled "New Math" is the text "What is 4+5." As described earlier, both questions and answers can exist in multiple languages for the same question or answer. Thus, if the author selects a different language in language indicator field 1807, then an additional version of the question can be input in the designated language in question contents input field 1806. The author can navigate to the interface for selecting answers for a particular question through the selection of "Answers" button 1805, or can switch to the interface for adding or modifying a scenario (test) by selecting "Switch to Tests" button 1804.

Figure 19:
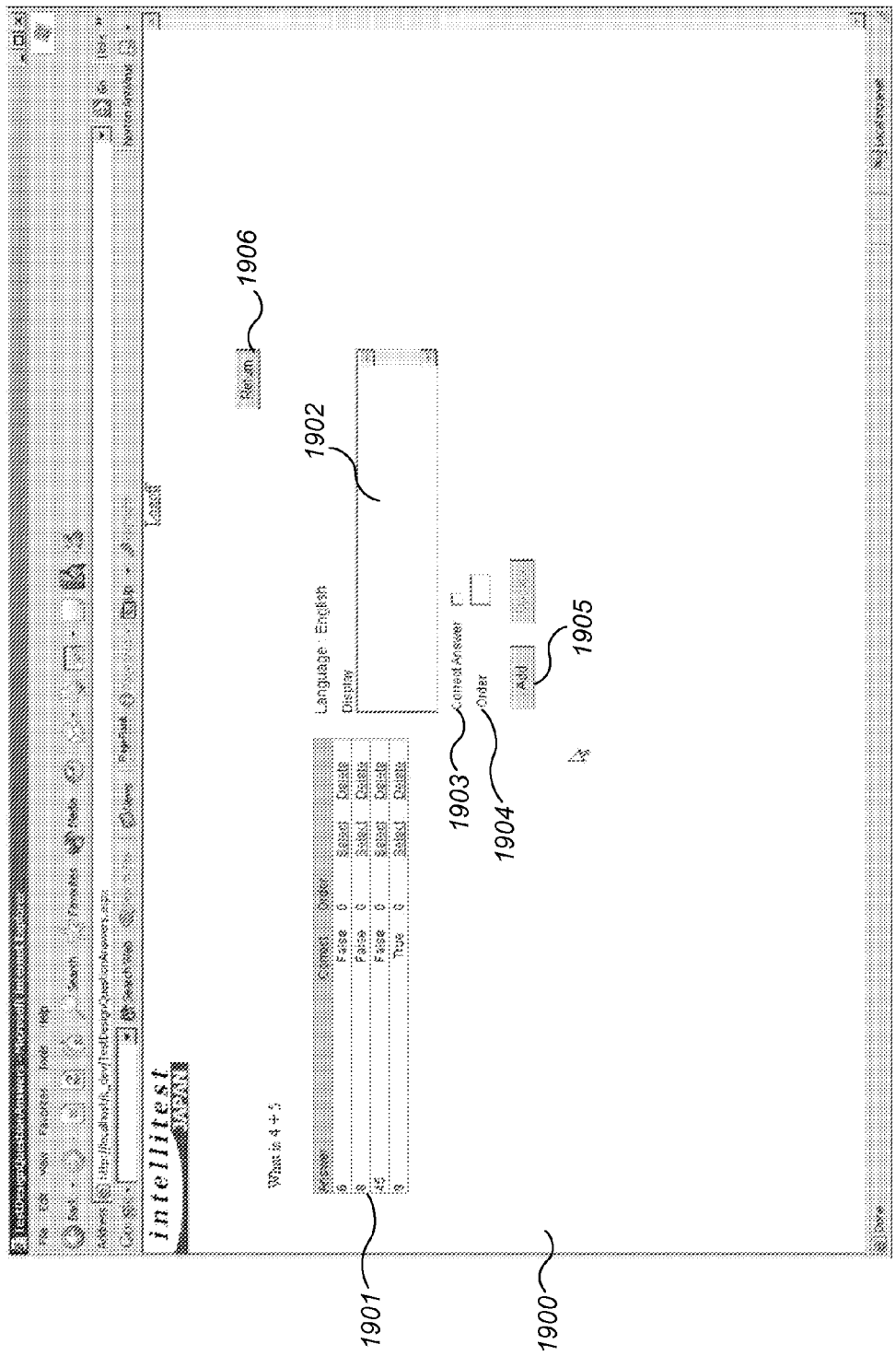

FIG. 19 is an example display screen of the interface for adding one or more answers to a designated non-simulation question. The number of answers depends upon the type of question. The question to which the answers are associated is the question that was designated in FIG. 18. In display screen 1900, the authoring interface shows, for an existing question, the answer or set of answers associated with that question in answer display list 1901. A particular answer can be selected for modification or deleted. When a particular answer is selected for modification, the answer is displayed in answer content input field 1902. The author can then modify the content displayed in field 1902 as appropriate. Other attributes of the answer can be modified as appropriate to the question type. For example, for a multiple choice question type, there will be multiple answers, only one of which is a correct answer. The correct answer is indicated in correct answer field 1903. It is also possible for the author to specify an order that a particular answer should be displayed in order field 1904. Thus for example, the author can order the answers in a multiple choice answer to a multiple choice question. Once the author is finished modifying answers or adding new answers, then the answer information is updated by selected the "Add" button 1905. The authoring interface updates any data repository information accordingly. Once the author is completed modifying answers or adding a new answer to a question, then the author can return to the question modification interface by pressing "Return" button 1906.

Figure 20:
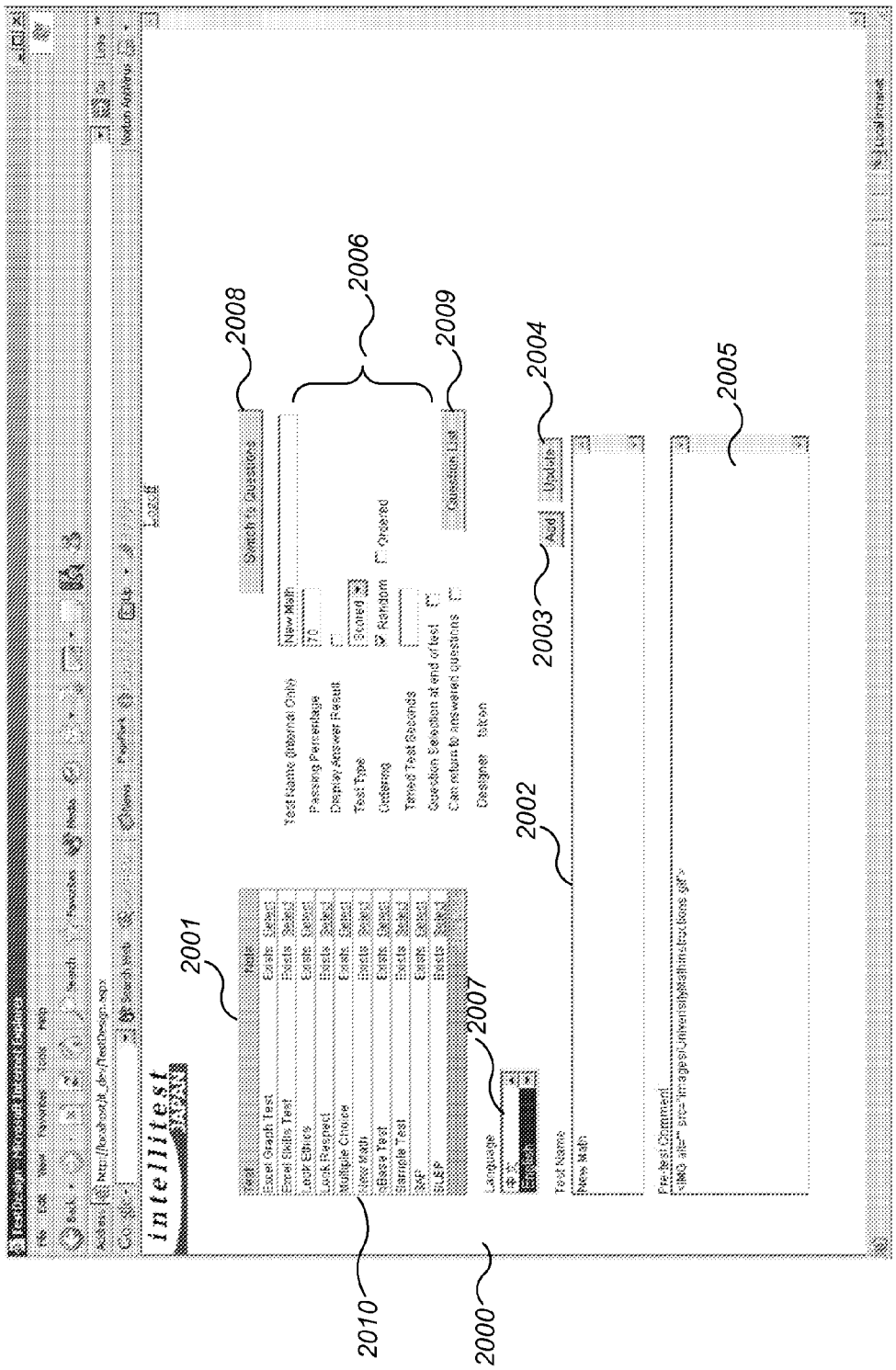

FIG. 20 is an example display screen of the authoring interface for modifying scenarios. Although described with reference to a test, the interface is similar for training scenarios. In display screen 2000, the authoring interface displays a list of the current tests in test display list 2001. Upon selection of a particular test, for example, text 2010, the interface displays the values of current parameters of the test in test properties field 2006 and the test name and comments in fields 2002 and 2005, respectively. Properties such as what percentage of correct answers constitutes a passing score, the number of seconds allocated to a timed test, and the type of test are displayed in the test properties field 2006. The author can indicate that the correct answer should be displayed to the student (before continuing with the next question or at some other specified time) by toggling the "Display Answer Result" property. Also, the author can indicate whether the test includes questions in random sequence or in an ordered sequence through the "Ordering" property. In addition, the author can decide whether to let a student go back and select questions after finishing the test to go back and answer them by toggling the "Question Selection at end of test" property. For example, if a student has skipped a question, then this property allows the student to go back and answer the skipped question. Also, an author can decide whether to let a student return to questions the student has already answered and change the answers by toggling the "Can return to answered questions" property. If the test is a new test, and not an existing test, then the author can specify a new test name in test name field 2002 and comments that are displayed in the introductory screen for the test in comment field 2005. Once the test information is complete, the author can select "Add" button 2003 to add a new test to the system or "Update" button 2004 to update the properties for an existing test. The author can then return to modifying the questions in the question pool by selecting button 2008, or can associate questions with this particular test by selecting the "Question List" button 2009.

Figure 21:
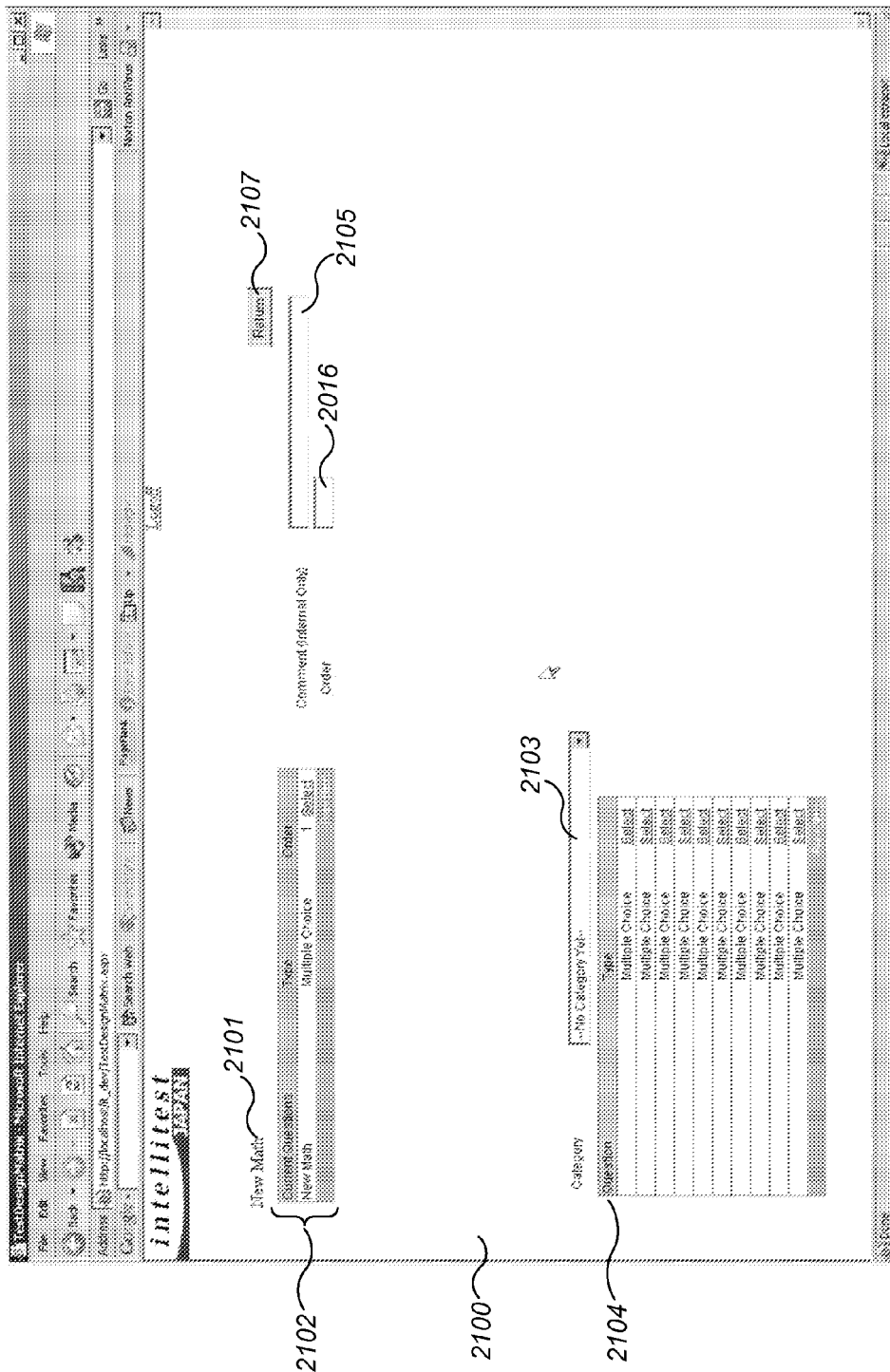

FIG. 21 is an example display screen of the authoring interface for associating a question with a designated test. In FIG. 21, display screen 2100 currently shows the list of current questions 2102 associated with the designated test 2101. The ordering of the questions for a particular test can be changed using this interface by selecting a question and then designating the order for that question in the test order field 2106. Additionally, a comment (i.e., the internal name of the question that is assigned) can be indicated in comment input field 2105. To add a new question to the test, the author selects a question category in category field 2103. The authoring interface then displays the current list of questions 2104 from the question pool (including simulation and non-simulation questions) that match that category. As mentioned earlier, advanced searching capabilities can be incorporated as appropriate. When a user selects one of these questions, both the order and an internal name for the question can be entered as described. Once questions have been associated with the designated test, then the author can select the "Return" button 2107 to return to the beginning of the authoring interface.

Figure 22:
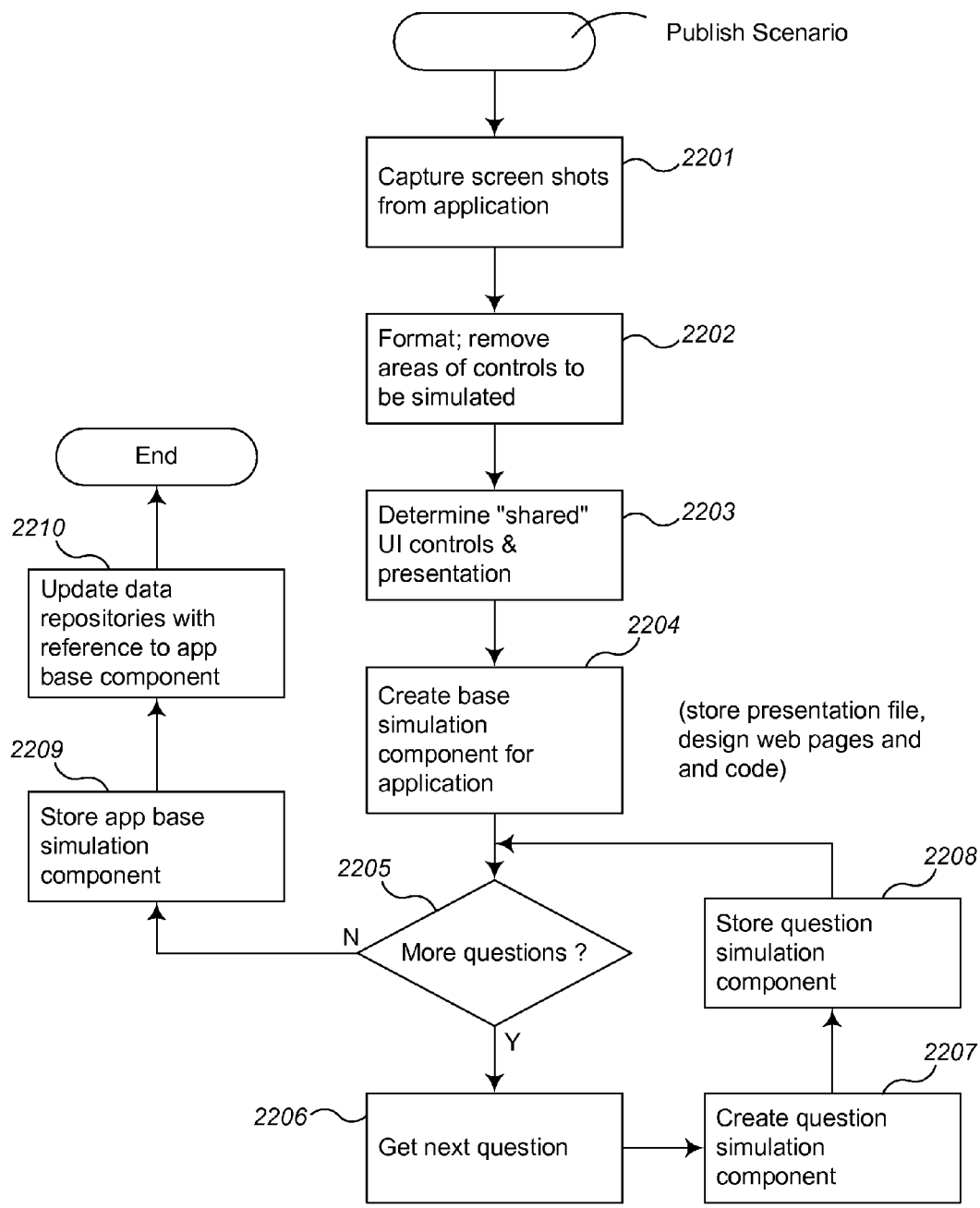
FIG. 22 is an example flow diagram a Publish Scenario process of an publishing interface of an example Skills-Based Simulation and Measurement System.

In addition to running, administering, and authoring scenarios, a Skills-Based Simulation and Measurement System enables publishers to create new or modify existing simulation scenarios and simulation questions using tools provided by the SBSMS. FIG. 22 is an example flow diagram a Publish Scenario process of an publishing interface of an example Skills-Based Simulation and Measurement System. In step 2201, the publisher, after reviewing a desired scenario for using an application, captures various screenshots (screen bitmaps) from the application. In step 2202, the publisher formats the various screenshots, for example, in a GIF format, so that the screenshot can be edited and incorporated into a simulation engine, for example in web pages if that is the communication mechanism being used between a client and server. In addition, the publisher removes the areas from the screenshots where the publisher desires to add simulated equivalents of the application's user interface controls, for example, menus, buttons, etc. In step 2203, the publisher determines, from looking at the screenshots for the various questions or tasks to be performed, what parts of the application presentation are shared between all (or some portion) of the questions and what application user interface controls are common and/or have common behavior. For example, in an Excel spreadsheet application simulation such as the simulation shown in FIGS. 3A-3G, the row, column, and header information of the spreadsheet is shared between all of the questions. Using this information, in step 2204, the publisher creates a base simulation component for the parts of the application that are shared, i.e., do not vary from question to question.

For example, in an embodiment that uses web pages, step 2204 requires that the publisher create various presentation forms (web pages) that contain the simulated user interface controls and write the code (the event handlers) that get invoked for each control that is "selected" (that causes an event) on the client web page. Various tools exist for aiding in this process, including web design tools, for example, Microsoft's Visual Studio .NET. In addition, many of the tools that are not specific to any particular application, such as the presentation and code for building menus, dialog boxes, etc. targeted for a particular graphical user interface environment, can be made available as part of a toolkit of components that reside as part of the SBSMS server environment.

In steps 2205-2208, the publisher performs a series of steps to generate simulations for each question that is to be part of the scenario. Specifically, in step 2205, the publisher determines whether there exists more questions to process, and, if so, continues in step 2206, otherwise continues in step 2209. In step 2206, the publisher considers the next question to be processed, and in step 2207 creates a question simulation component based upon that question. The process for creating a question simulation component is very similar to the process for creating the application base simulation components in step 2204; however, the process is performed only for the part of the application environment that corresponds directly to the question or task to be performed. In one embodiment, only the area of the display screen affected by the question (and the corresponding event handling code) is "replaced" on the client-side simulation web page. Included in the design and implementation of each question simulation component is a routine that can be invoked to verify the correctness of an answer to the question and a routine for scoring an answer to the question. In step 2208, the question simulation component is stored as part of the server environment tools, and the publisher begins the process again with the next question in step 2205.

In step 2209, after the set of questions to be simulated has been processed, the publisher stores the generated application base simulation component in the server environment tools. In step 2210, the publisher updates any data repositories with references to the application base component and with references to any question simulation components as necessary (e.g., to make the scenario and questions available to be assigned), thereby completing the publishing process.

Figure 23:
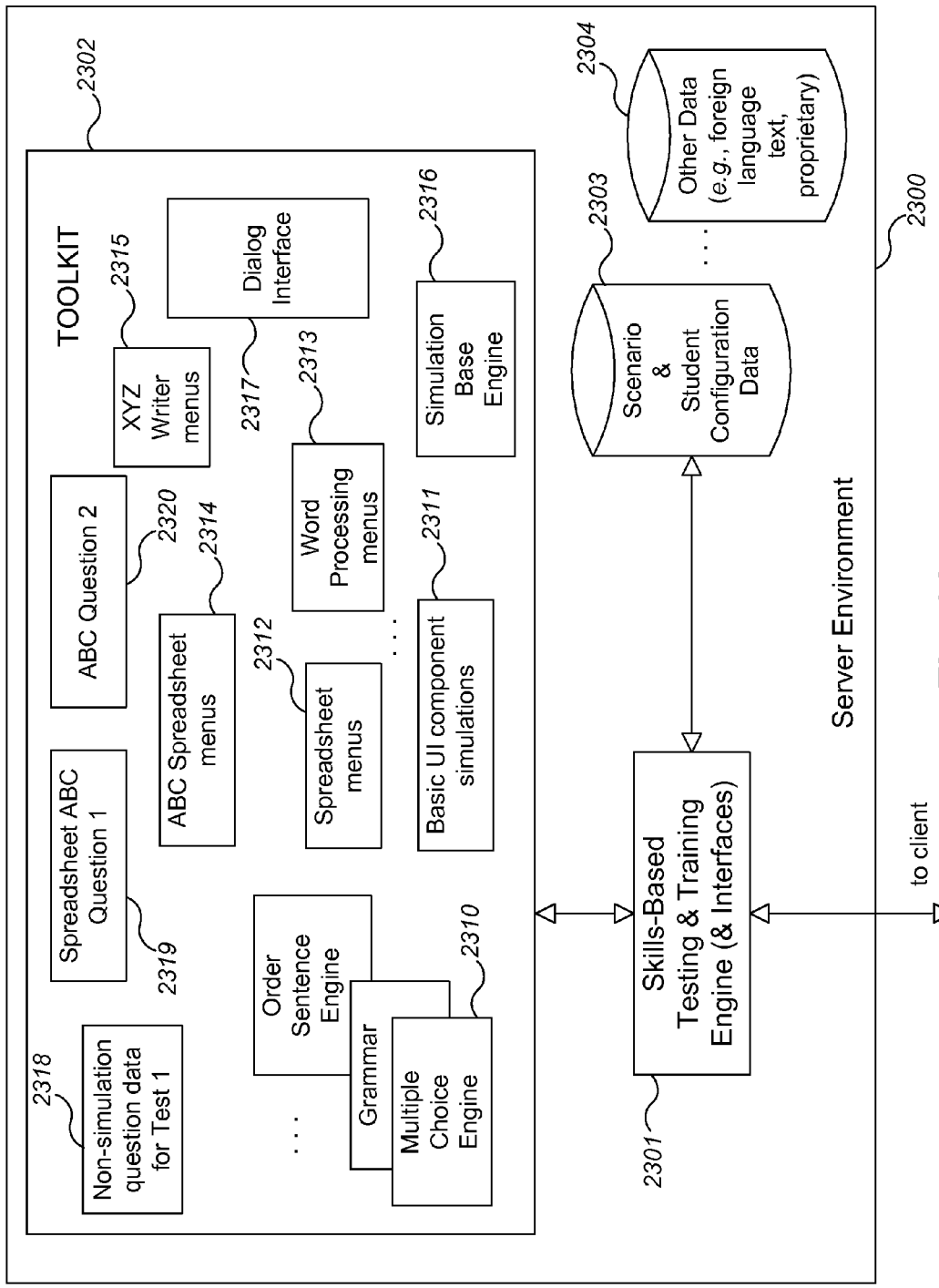
FIG. 23 is an example block diagram of a server environment for an example Skills-Based Simulation and Measurement System that includes example components built by a Publish Scenario process.

FIG. 23 is an example block diagram of a server environment for an example Skills-Based Simulation and Measurement System that includes example components built by a Publish Scenario process. The server environment 2300 comprises, amongst other things, a skills-based testing and training engine 2301 and appropriate interfaces for communicating with a client system; one or more data repositories, such as scenario and student configuration data 2303 and other data 2304; and a set of components 2302 that comprise a server toolkit. The skills-based testing and training engine 2301 provides interfaces and code for interacting with a client to run the skills-based measurement environment and client-side simulation engines as described with reference to FIGS. 7-9. The data repositories contain the information necessary to determine what questions (and answers) make up a particular scenario, including indications of the server components that are used to implement a scenario, and a student's history with respect to tests. Example records for a scenario and student configuration data are shown with respect to FIG. 26. The components that comprise toolkit 2302 are used to implement the client-side simulation engine and comprise the server-side components of the simulation engines. The components of toolkit 2302 are also used by publishers to create new simulation scenarios and simulation questions, as well as new types of non-simulation questions.

For example, the toolkit 2302 contains a series of engines for non-simulation questions 2310 such as a multiple choice engine, a grammar engine, a story grammar engine, and a sentence ordering engine. When these engines are downloaded to a client system, data from the various questions, for example, the non-simulation question data 2318 for a particular test is used to populate the web pages for a particular non-simulation engine.

For simulations, the toolkit 2302 comprises a simulation base engine 2316, which is downloaded to the client initially to support all simulated interfaces. In addition, basic user interface component simulations 2311 and other kinds of user interface components, such as dialog interfaces 2317, are available for use by publishers and others to build application base simulation engines and simulation question components. As described with reference to FIG. 22, when a publisher simulates an application, the publisher first determines a series of shared presentation and interfaces across the questions of a simulation scenario. The "ABC Spreadsheet Menus" component 2314 and the "XYZ Writer Menus" component 2315 are examples of such shared presentation components. (The "ABC Spreadsheet Menus" component 2314 presumably works across all the questions for the ABC scenario.) The "Spreadsheet ABC Question1" component 2319 and the "ABC Question2" component 2320 contain the data and code supporting the simulation of the question 1 and question 2 of the ABC spreadsheet application, respectively.

Other components, such as the "Spreadsheet Menus" component 2312 and the "Word Processing Menus" component 2313 may be provided by the toolkit for general menu support. One skilled in the art will recognize that many other components and combinations of functionality and code may be created in reusable modules that a publisher could use to create or implement a simulation or non-simulation question. In addition, the use of separate components allows upgrades to be made to a particular component to "update" a test to reflect, for example, a revised application, without having to re-release the entire SBSMS.

Figure 24:
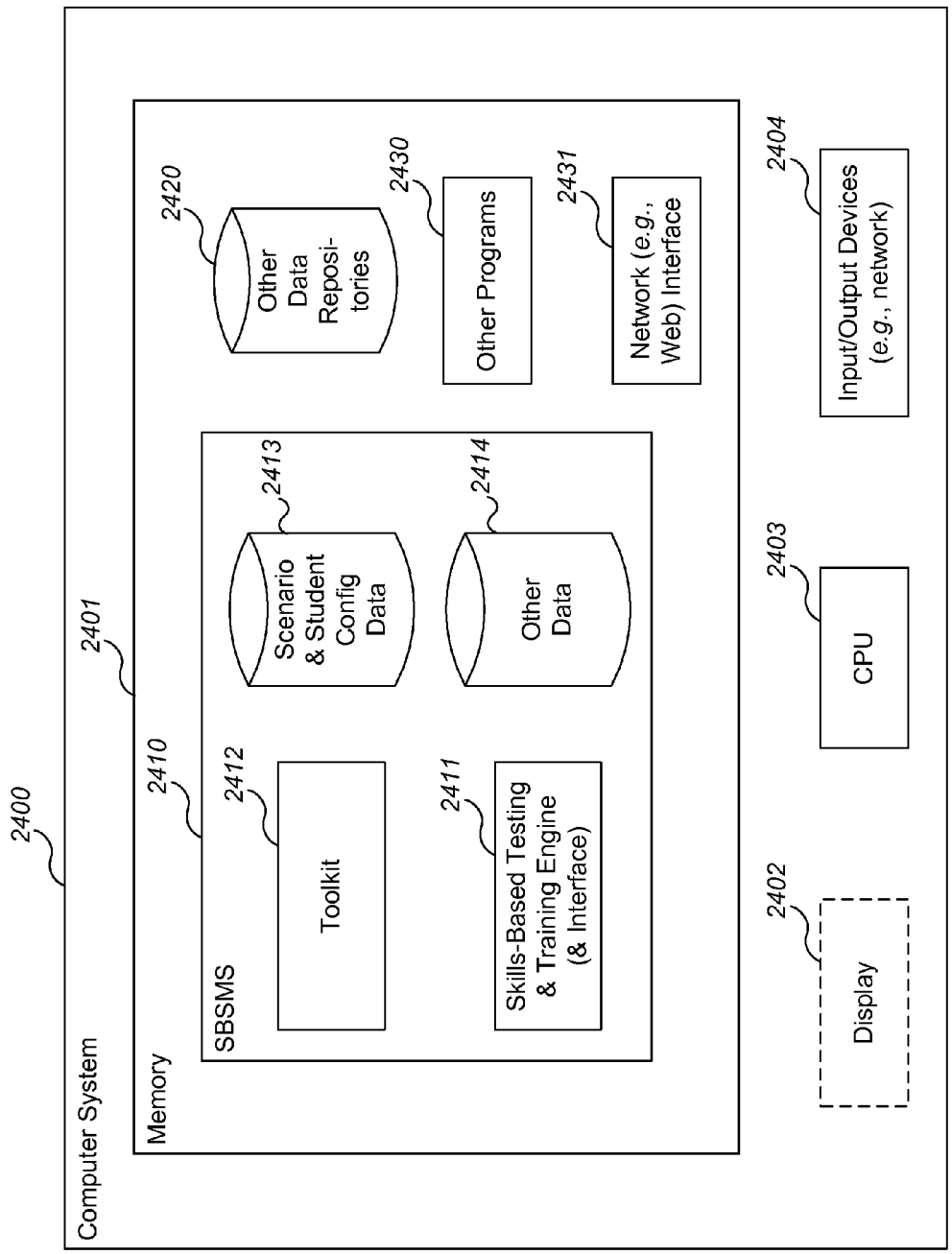
FIG. 24 is an example block diagram of a general purpose computer system for practicing embodiments of a server portion of a Skills-Based Simulation and Measurement System.

FIG. 24 is an example block diagram of a general purpose computer system for practicing embodiments of a server portion of a Skills-Based Simulation and Measurement System. The general purpose computer system 2400 may comprise one or more server and/or client computing systems and may span distributed locations. In addition, each block shown may represent one or more such blocks as appropriate to a specific embodiment or may be combined with other blocks. Moreover, the various blocks of the server portion of the Skills-Based Simulation and Measurement System 2410 may physically reside on one or more machines, which use standard interprocess communication mechanisms to communicate with each other.

In the embodiment shown, computer system 2400 comprises a computer memory ("memory") 2401, an optional display 2402, a Central Processing Unit ("CPU") 2403, and Input/Output devices 2404. The Skills-Based Simulation and Measurement System ("SBSMS"). 2410 is shown residing in memory 2401. The components of the Skills-Based Simulation and Measurement System 2410 preferably execute on CPU 2403 and manage the generation and use of simulation and non-simulation scenario components, as described in previous figures. Other programs 2430 and potentially other data repositories 2420 also reside in the memory 2401, and preferably execute on one or more CPUs 2403. In addition, for a network-based implementation, a network interface 2431 such as web interfaces also reside in the memory 2401 and execute on one or more CPUs 2403. In a typical embodiment, the SBSMS 2410 includes a skills-based testing and training engine and interface 2411, one or more toolkits 2412, a scenario and student configuration data repository 2413 and, potentially, other data 2414.

In an example embodiment, components of the SBSMS 2410 are implemented using standard programming techniques and standard web-based technology such as HTML servers, such as Microsoft IIS; web-based engines, such as an ASP.NET or equivalent; java programming tools and environment support; and database technology. One skilled in the art will recognize that the code supporting the simulation components are conveniently implemented as using object-oriented, distributed, web-based technology. However, any of the SBSMS components 2411-2412 may be implemented using more monolithic programming techniques as well. In addition, programming interfaces to the data stored as part of the SBSMS can be available by standard means such as through C, C++, C#, and Java API and through scripting languages such as XML, or through web servers supporting such interfaces. The data repository 2413 is preferably implemented for scalability reasons as a database system rather than as a text file, however any method for storing such information may be used.

One skilled in the art will recognize that the SBSMS 2410 may be implemented in a distributed environment that is comprised of multiple, even heterogeneous, computer systems and networks. For example, in one embodiment, the skills-based testing and training engine 2411, the toolkit components 2412, and the scenario and student configuration data repository 2413 are all located in physically different computer systems. In another embodiment, various components of the toolkit 2411 are hosted each on a separate server machine and may be remotely located from the scenario definition tables which are stored in the scenario and student configuration data repository 2413.

Figure 25:
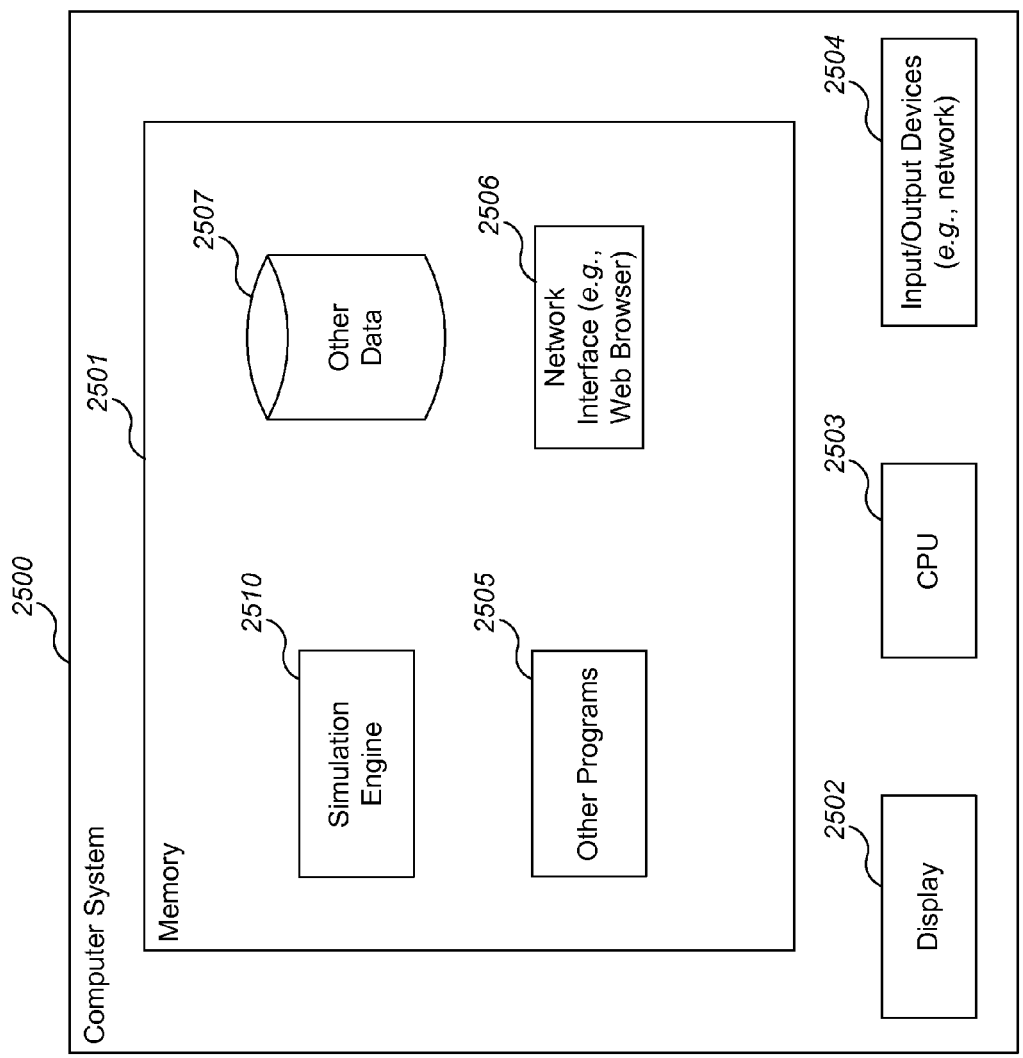
FIG. 25 is an example block diagram of a general purpose computer system for practicing embodiments of a client portion of a Skills-Based Simulation and Measurement System.

FIG. 25 is an example block diagram of a general purpose computer system for practicing embodiments of a client portion of a Skills-Based Simulation and Measurement System. The general purpose computer system 2500 may comprise one or more server and/or client computing systems and may span distributed locations as described in detail with reference to FIG. 24. In FIG. 25, computer system 2500 comprises a computer memory ("memory") 2501, a display 2502, a Central Processing Unit ("CPU") 2503, and Input/Output devices 2504. A client-side imulation engine 2510 is shown residing in memory 2501. Other programs 2505, a network interface (e.g., a web browser) 25063, and other data repositories 2507 also reside in the memory 2501, and preferably execute on one or more CPUs 2503. The simulation engine 2510 interacts with the server environment depicted in FIG. 24 to achieve the functions of an SBSMS. One skilled in the art will recognize that the client portion of the SBSMS may reside on the same physical computer system as the server portion, or in some combination thereof. As described earlier, the implementation of the simulation engine 2510 is governed by the server portion.

Generally, different configurations and locations of programs and data are contemplated for use with techniques of an SBSMS. In example embodiments, these components may execute concurrently and asynchronously; thus the components may communicate using well-known message passing techniques. One skilled in the art will recognize that equivalent synchronous embodiments are also supported by an SBSMS implementation. Also, other steps could be implemented for each routine, and in different orders, and in different routines, yet still achieve the functions of the SBSMS.

As described with reference to FIGS. 1-23, a Skills-Based Simulation and Measurement System provides the ability to generate simulated application environments that include simulation and non-simulation questions for testing and training; publish new simulation scenarios and simulation questions; author scenarios using an existing data repository of questions; administer scenarios to students, and run tests and training scenarios. These capabilities are supported by interfaces and code that communicate information through data stored in a data repository that represents all of the information regarding scenarios and users of the SBSMS.

Figure 26:
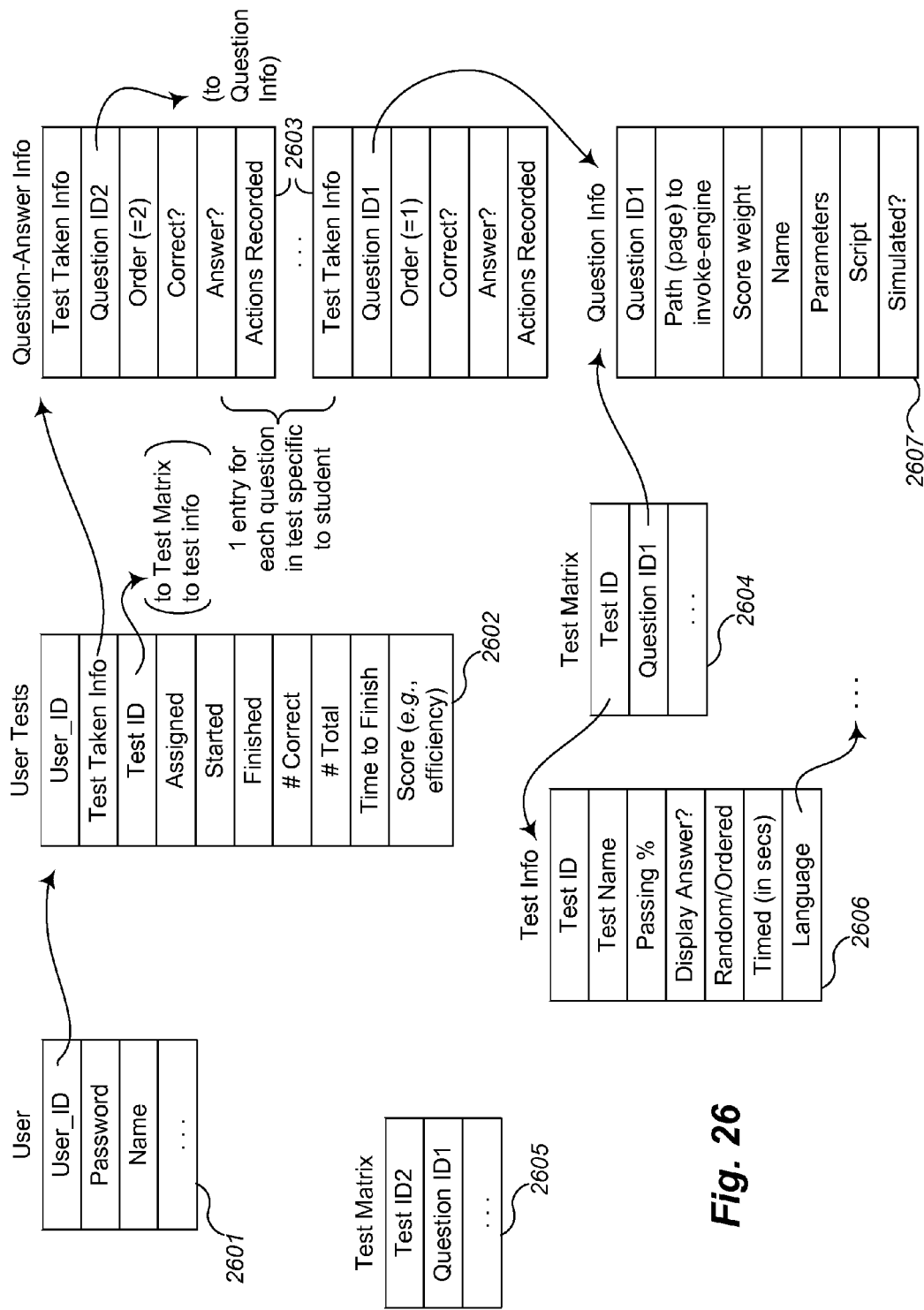
FIG. 26 is an example block diagram of records in example scenario and student configuration data repository tables of an example Skills-Based Simulation and Measurement System.

FIG. 26 is an example block diagram of records in example scenario and student configuration data repository tables of an example Skills-Based Simulation and Measurement System. The records illustrated provide an overview of the information needed to support scenario configurations on a per-student basis as well as the tasks or questions that make up a particular scenario. The records in FIG. 26 are oriented towards the testing environment, however, one skilled in the art will recognize that similar information is equally applicable to training scenarios. These records are created and modified by the various interfaces of the SBSMS and by running scenarios.

Specifically, the tables in the example data repository are organized such that scenario data is accessible from two different points of view: from the students point of view and from the scenarios point of view. For each student (user), a user record 2601 is created to represent that student with a unique user_ID. Then, for each test assigned to the student, a separate user test record 2602 is created, which contains current information regarding the "state" of a particular test. For example, information such as the date the test was assigned, when it was started and finished, and data indicating the results and scoring is kept in this record. A unique test_ID is also stored in this record, which is used to locate information regarding the structure of the test from the scenario's perspective—what question-answer pairs "belong" to the test, the properties of the test, etc. For each user test record 2602, a separate question-answer info record 2603 is created for each question-answer pair that is associated with the student's test having that test_ID. In the embodiment shown, although the actual question and correct answer are not stored in these tables (they are accessible from the scenario point of view), all of the information regarding a particular question-answer pair for that student for that test is stored in a question-answer info record 2603. Thus, the order of the question, as well as whether the question was answered, and, if so, the correctness of the answer and the recorded actions are stored in record 2603. These are the attributes of a question-answer pair for that scenario that are student specific.

To obtain non-student specific information regarding a scenario or a question-answer pair, the data repository is accessed from the scenario point of view. Specifically, there is a test matrix record 2604 and 2605 created for each (unique) test_ID. A test matrix record 2604 joins the property information on a test (scenario) with the property information on the questions that comprise a test. For example, each test matrix record 2604 and 2605 indicates a test info record 2606 and one or more question info records 2607. Two different test matrix records, such as records 2604 and 2605 with different test_IDs, may refer to the same question info record 2607, indicating that two different tests contain the same question. The tests may present the question with different properties however. For example, the passing grade on the tests may be different or one test may be timed and the other not timed. Each question info record 2607 indicates whether the question is a simulation question or a non-simulation question and the path (e.g., web page) to invoke to find the "engine" appropriate for that question. Thus, for example, if the question is a simulation question, then the page will refer to the base simulation component described earlier. Each non-simulation question is also associated with an answer (not shown). One skilled in the art will also recognize that there are other records created for each test, such as the language specific records. If a test is available in multiple languages, then the translations for the question-answer pairs will be available in other records.

As described from a functional perspective in FIGS. 1-23, the client portion and server portion of an SBSMS communicate to implement a skills-based simulation and measurement environment. In one embodiment, the SBSMS is implemented using Microsoft's Active Server Pages (ASP) .NET architecture. Microsoft's .NET and ASP.NET architecture are described in more detail in Platt, David S., "Introducing Microsoft.NET," Microsoft Press, 2002, which is incorporated herein by reference in its entirety. One skilled in the art will recognize that the SBSMS can be equivalently implemented in other web page based architectures, using other tools, and other languages, without affecting the techniques and functionality described herein.

The ASP.NET architecture using web-based tools provides a means for generating the simulated user interface controls of an application and the "code behind" them (the event handling code) using standardized techniques. In order to understand how the code flow of a scenario is implemented by the SBSMS, it is helpful to review the web page and code flow supported by a standard ASP.NET environment.

Figure 27:
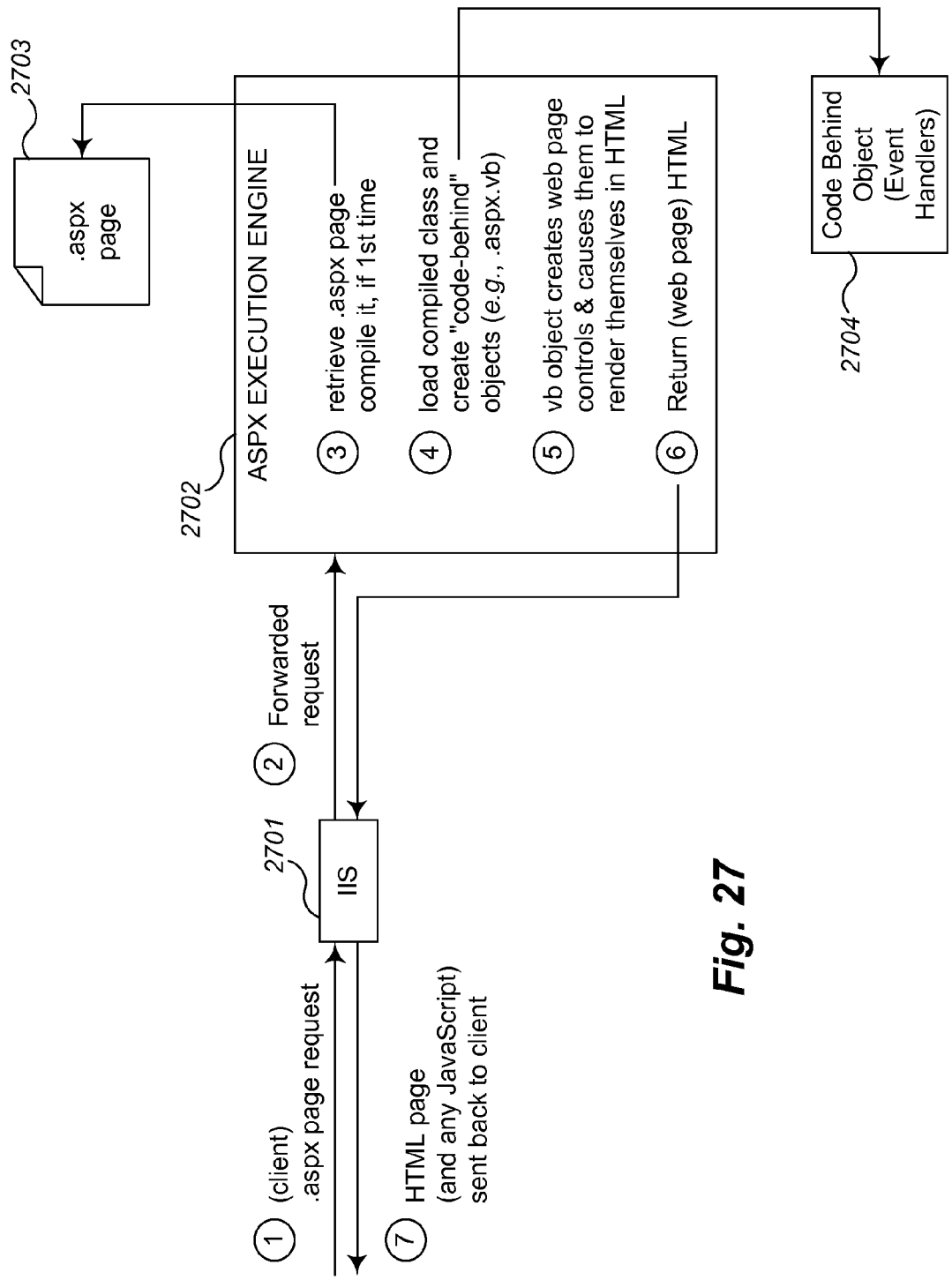
FIG. 27 is an example block diagram of the processing and code flow between client and server systems using a Microsoft ASP.NET engine to generate and handle web pages.

FIG. 27 is an example block diagram of the processing and code flow between client and server systems using a Microsoft Active Server Pages (ASP.NET) engine to generate and handle web pages. This diagram is similar to one provided in the reference book cited above. In FIG. 27, the IIS 2701 (Microsoft's Internet Information Service) processes HTTP (Hypertext Protocol) requests for HTML (Hypertext Markup Language) based web pages. The IIS 2701, along with an ASPX Execution Engine 2702 reside on the server, accept client requests for web pages, and generate and return requested pages. In the process, the ASPX 2702 generates server side pages and the "code behind" them necessary to implement the objects and events. Specifically, the client requests a particular ".aspx" page using a standard url specification (e.g., http://demo.base.aspx). The IIS 2701 forwards the page request to the ASPX engine 2702. Engine 2702 locates and retrieves the requested ".aspx" page, compiles it (if loaded for the first time), and creates a server-side ".aspx" page 2703. The engine 2702 then loads any compiled classes and creates any code behind objects, for example code behind object 2704 that implements the event handling referred to in the ".aspx" page (e.g., ". . . aspx.vb" or ".aspx.c," . . . ). The created code behind object, when instantiated, creates the web page controls (the user interface) and causes them to render themselves into HTML. The rendered HTML is then returned to the IIS as a web page, which is then returned back to the client to fulfill the original request. This basic mechanism underlies a current implementation of the SBSMS; however is in no means necessary for its implementation or function. One skilled in the art will recognize that other models of client-server and web-based communications exist and can be used in networks that are different than the Internet.

Figure 28A:
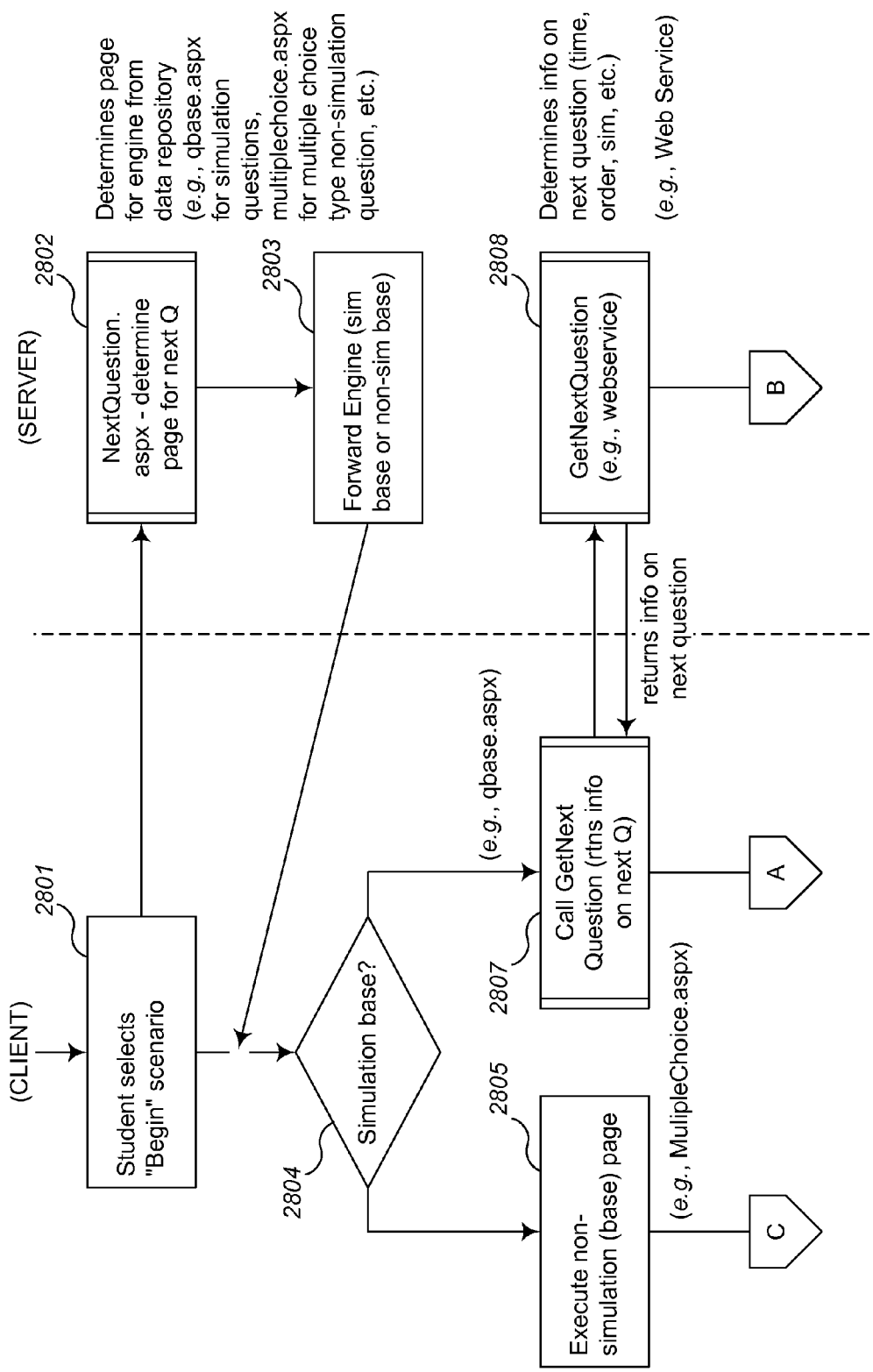
FIGS. 28A-28C illustrate an example flow of the web page and code flow between a client portion and a server portion of an example Skills-Based Simulation and Measurement System to implement a scenario.
Figure 28B:
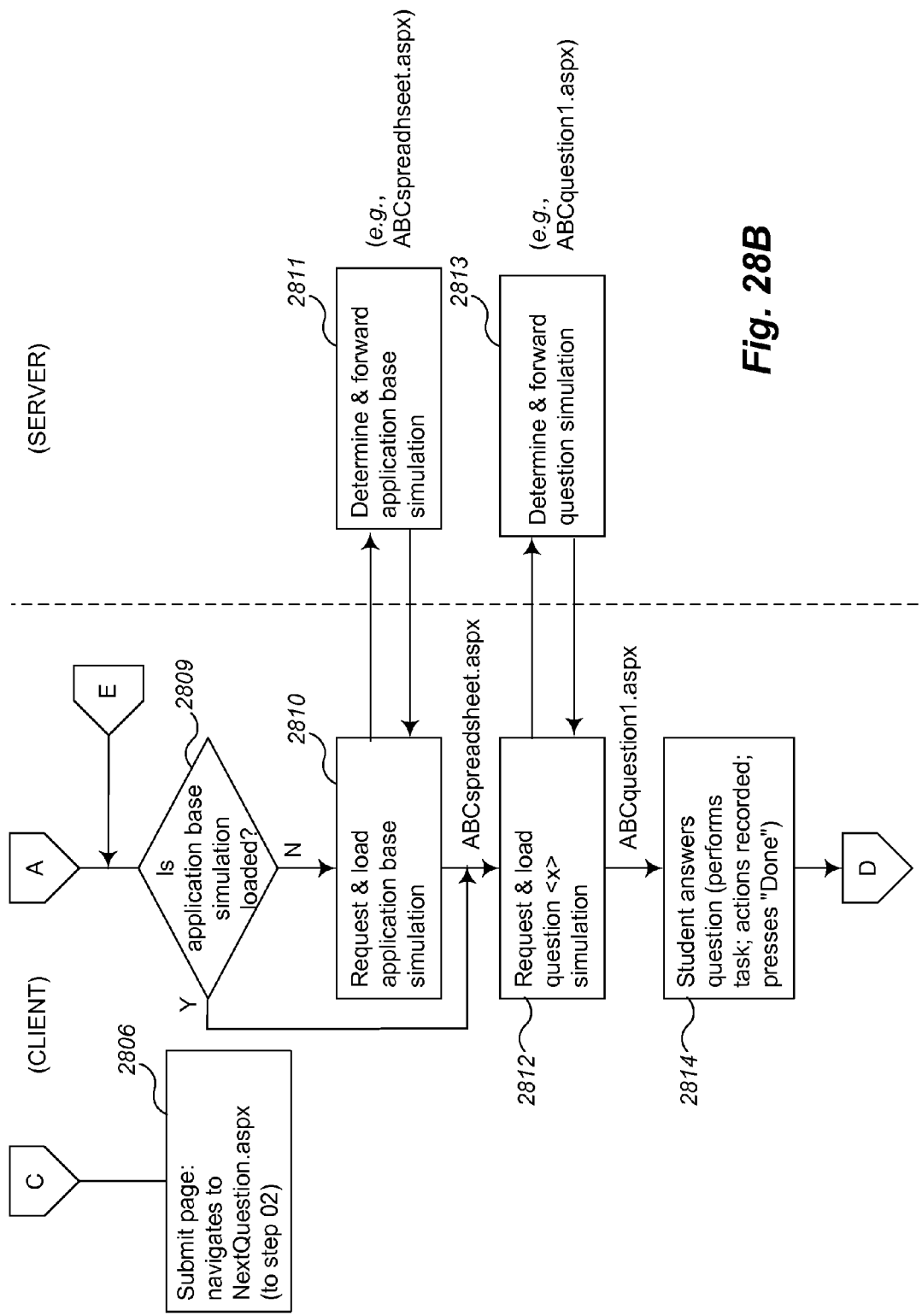
Figure 28C:
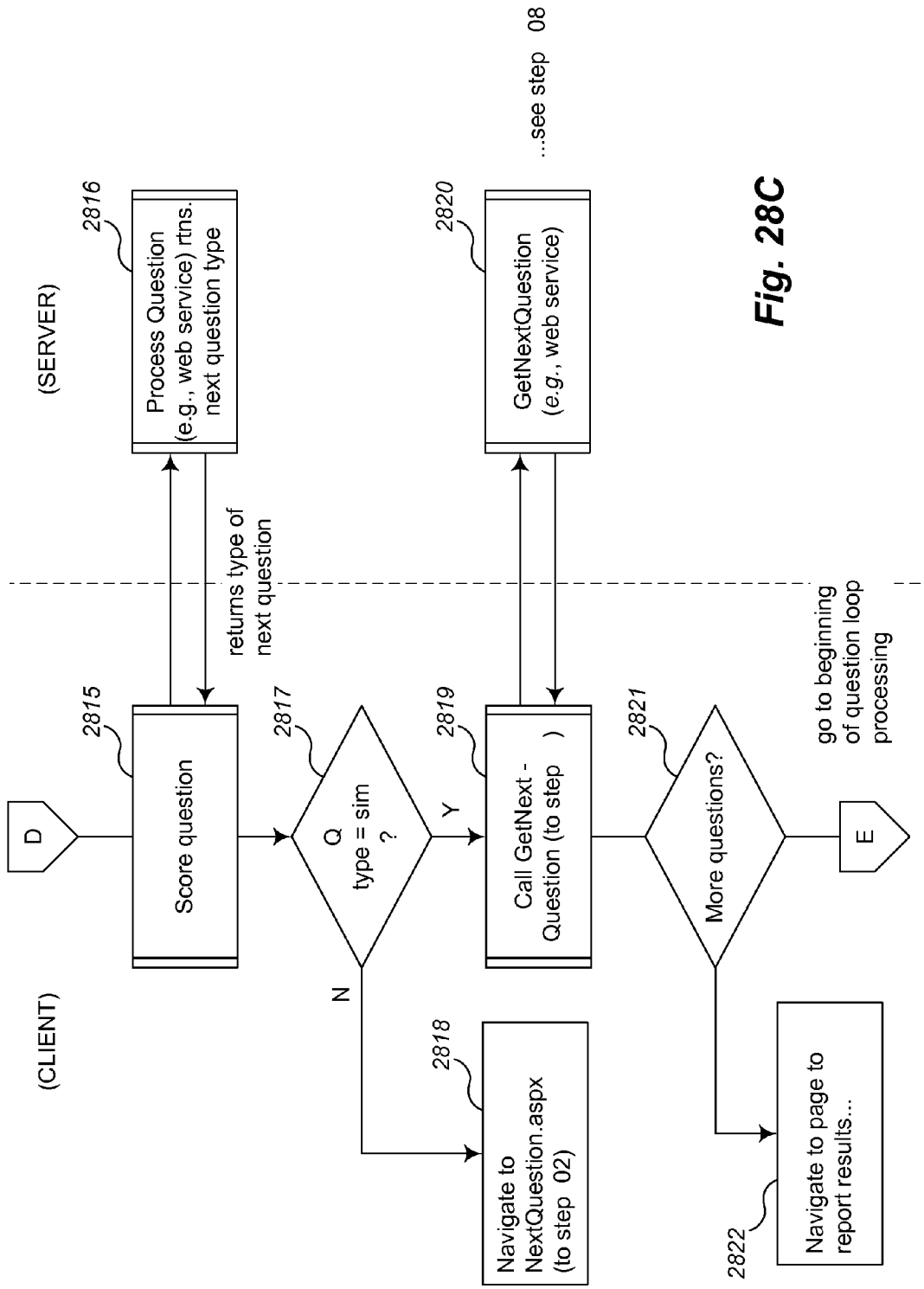

FIGS. 28A-28C illustrate an example flow of the web page and code flow between a client portion and a server portion of an example Skills-Based Simulation and Measurement System to implement a scenario. In step 2801, on a client portion of the SBSMS, a student selects a "Begin" button to initiate a scenario, such as in FIG. 3A. This action is posted to the server portion of the SBSMS, which directs the action to a page (e.g., "NextQuestion.aspx") to determine in step 2802 the location of the base engine for a simulation question, or the location of the non-simulation engine for a non-simulation question. This information, as was shown in FIG. 26, can be determined from a table in the data repository (e.g., question-info record 2607). For simulation questions, the base engine is referred to as "qbase.aspx;" for non-simulation questions, the engine is question type specific, for example "multiplechoice.aspx." Once determined, then in step 2803, the engine (an ".aspx" page) is forwarded back to the client portion. The client portion, in step 2804 determines whether a simulation base (for a simulation question) was returned, and, if so, continues the flow in step 2807, otherwise executes the non-simulation engine page in step 2805.

In the non-simulation engine case, once the student finishes the (one or more) questions, the page is submitted in step 2806 back to the server portion. This causes the server portion to navigate back to step 2802, to determine the engine for the next question. This step is provided because a scenario might load one or more engines for different subsets of non-simulation questions in a scenario or might switch from a non-simulation question to a simulation question. All such combinations are contemplated.

In the simulation base engine case, in step 2807, the engine calls a web service (could be implemented otherwise) called "GetNextQuestion" on the server portion. In step 2808, the web service GetNextQuestion determines properties regarding the next question and returns them to the client portion. Values of these properties are used to determine whether the correct components have been downloaded and what components to load. Specifically, in step 2809, the client portion determines whether the application base simulation is already downloaded, and, if so, continues in step 2812, else continues in step 2810. In step 2810, the client portion requests the page that corresponds to the application base simulation (formulated from a name returned by GetNextQuestion as a property value). In step 2811, the server portion loads and locates the requested application base simulation page and renders it appropriately to be returned to the client portion, which then loads it as part of step 2810. In step 2812, the client portion requests the page that corresponds to the next question simulation (formulated from a name returned by GetNextQuestion as a property value). In step 2813, the server portion loads and locates the requested question simulation page and renders it appropriately to be returned to the client portion, which then loads it as part of step 2812. At this point, the client-side simulation engine is loaded and running. In one embodiment, the downloading of the question simulation page only requires the specific areas of the page that are changed in the question to be reloaded, thus speeding up the downloading process. (One way to accomplish this is to store on the client the HTML for the page that corresponds to the application base simulation, receive the HTML for the question simulation and "add" it to the HTML for the application base simulation, and then render the combined HTML.) In step 2814, the student performs actions to respond to the question, the actions are record, and eventually the student presses the "Done" button to indicate completion of the response. As described with reference to FIG. 10, in step 2815 the client portion scores the response to the question and forwards the scoring information and recorded questions to a web service "ProcessQuestion" on the server portion. (See step 1008 in FIG. 10.) In step 2816, the ProcessQuestion web service records the information in the data repository appropriately and returns the type of the next question in the scenario to the client portion. This information is available from the data repository tables. In step 2817, the client portion determines whether the next question is a simulation question, and, if so, continues in step 2819, otherwise continues in step 2818. In step 2819, the client portion re-invokes the web service GetNextQuestion. The server portion in step 2820 determines information on the next question (see step 2808) and returns the information to the client portion. In step 2821, the client portion determines whether that was the last question, and if there are more questions, goes back to the beginning of the question processing loop (for simulation questions) in step 2809, otherwise navigates to a page in step 2822 to report the results of the scenario. If in step 2817, the client portion determines that the next question is a non-simulation question, then the client portion navigates back to step 2802 to determine the engine for the next question. Thus, at each point, a question can either be a simulation question or a non-simulation question and are handled appropriately by loading the correct web page.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/382,402, entitled "SYSTEM FOR ONLINE SKILLS TESTING OF USERS," filed May 24, 2002, are incorporated herein by reference, in their entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for performing skills-based measurement scenarios discussed herein are applicable to other architectures other than a client-server architecture. For example, techniques such as those described herein can be embedded into a hardware device, such as a copier, to supplant a text based on-line manual or can be places in a separate system for training for activity with the hardware device. One skilled in the art will also recognize that the methods and systems discussed herein are applicable to differing network protocols, communication media (optical, wireless, cable, etc.) and devices, such as wireless handsets, electronic organizers, personal digital assistants, portable email machines, game machines, pagers, navigation devices such as GPS receivers, etc.

The invention claimed is:

1. A method in a computer system for providing skills-based interactions with an application by simulating user interface behaviors of the application, comprising:
providing a plurality of simulated interface components that each simulate an associated behavior of the application without executing the application;
indicating a question to be answered;
receiving a response to the indicated question as a plurality of actions performed by invoking one or more of the plurality of the simulated interface components; and
automatically scoring the received response.

2. The method of claim 1 wherein the interactions are part of a testing environment.

3. The method of claim 1 wherein the interactions are part of a training environment.

4. The method of claim 1 wherein the indicated question specifies a desired result of interacting with the application.

5. The method of claim 1 wherein the plurality of actions performed are recorded.

6. The method of claim 5 wherein the automatic scoring evaluates the recorded actions against at least one target action to determine whether the recorded actions constitute a correct response.

7. The method of claim 5 wherein the automatic scoring evaluates the recorded actions to determine an efficiency rating as a measure of skill.

8. The method of claim 5 wherein the recorded actions are stored in a data repository.

9. The method of claim 1 wherein the application is at least one of a software application, a training scenario, a technical application, and a user interface for an apparatus.

10. The method of claim 1 wherein the skills-based interactions are provided without the use of plug-in software code, without executing an instance of the application, and without sharing an executing instance of the application, while the interactions are being performed.

11. The method of claim 1, the computer system having a client system and a server system, and wherein the simulated aspects are forwarded from the server system to the client system.

12. The method of claim 1 wherein the interactions are performed by a client browser system.

13. The method of claim 12 wherein the client browser system is an Internet browser.

14. The method of claim 1 wherein input text and output text can be indicated in another language.

15. A computer-readable memory medium containing instructions for controlling a computer processor to provide skills-based interactions with an application by simulating user interface behaviors of the application, by:
providing a plurality of simulated interface components that each simulate an associated behavior of the application without executing the application;
indicating a question to be answered;
receiving a response to the indicated question as a plurality of actions performed by invoking one or more of the plurality of the simulated interface components; and
automatically scoring the received response.

16. The computer-readable memory medium of claim 15 wherein the interactions are part of a testing environment.

17. The computer-readable memory medium of claim 15 wherein the interactions are part of a training environment.

18. The computer-readable memory medium of claim 15 wherein the indicated question specifies a desired result of interacting with the application.

19. The computer-readable memory medium of claim 15 wherein the plurality of actions performed are recorded.

20. The computer-readable memory medium of claim 19 wherein the automatic scoring evaluates the recorded actions against at least one target action to determine whether the recorded actions constitute a correct response.

21. The computer-readable memory medium of claim 19 wherein the automatic scoring evaluates the recorded actions to determine an efficiency rating as a measure of skill.

22. The computer-readable memory medium of claim 15 wherein the application is at least one of a software application, a training scenario, a technical application, and a user interface for an apparatus.

23. The computer-readable memory medium of claim 15 wherein the skills-based interactions are provided without the use of plug-in software code, without executing an instance of the application, and without sharing an executing instance of the application, while the interactions are being performed.

24. The computer-readable memory medium of claim 15 wherein input text and output text can be indicated in another language.

25. A simulation engine, comprising:
a question presentation component that is structured to indicate a question to be answered;
a plurality of simulated interface components that each simulate an associated behavior of an application in response to selection of the simulated component, without executing the application, and that are structured to,
receive an indication that a simulated component has been selected;
simulate the associated behavior of the application; and
record an action associated with the selection; and
a response indicator that, when selected indicates that the recorded actions constitute a response to the question; and
a scoring component that receives the indication of the response and automatically associates a measurement of skill with the recorded actions.

26. The simulation engine of claim 25 as part of a testing environment.

27. The simulation engine of claim 25 as part of a training environment.

28. The simulation engine of claim 25 wherein the scoring component evaluates the recorded actions against at least one target action to determine whether the recorded actions constitute a correct response.

29. The simulation engine of claim 25 wherein the scoring component evaluates the recorded actions to determine an efficiency rating as a measure of skill.

30. The simulation engine of claim 25 wherein the recorded actions are stored in a data repository.

31. The simulation engine of claim 25 wherein the application is at least one of a software application, a training scenario, a technical application, and a user interface for an apparatus.

32. The simulation engine of claim 25 operating without the use of plug-in software code, without executing an instance of the application, and without sharing an executing instance of the application, while the actions are being performed.

33. The simulation engine of claim 25, having a client portion and a server portion, and wherein the simulated aspects are forwarded from the server portion to the client portion.

34. The simulation engine of claim 25 performed by a client browser system.

35. The simulation engine of claim 34 wherein the client browser system is an Internet browser.

36. The simulation engine of claim 25 wherein input text and output text can be indicated in another language.

37. A skills-based testing environment for testing skills of an operator relative to an application program, comprising:
a simulation engine having a plurality of simulated interface components each configured to simulate an associated behavior of the application without executing the application and that is configured to:
display a test directive to obtain a result;
receive an indication of a response to the displayed directive, the response indicating an invocation of one or more behaviors simulated by the plurality of simulated interface components; and
automatically score the indicated response.

38. The testing environment of claim 37 wherein the simulation engine operates without executing a software plug-in of the application functionality.

39. The testing environment of claim 37 wherein the simulation environment operates without executing the application during a test and without communicating with an executing instance of the application during the test.

40. The testing environment of claim 37 wherein the score designates a measurement of at least one of efficiency, correctness, time, and an action rating.

41. The testing environment of claim 37 wherein the application is at least one of a software application, a technical application, an educational scenario.

42. The testing environment of claim 37 wherein the test directive is displayed in one of a plurality of languages.

43. A computer based method in a skills-based testing environment for testing skills of an operator relative to an application, comprising:
presenting a plurality of simulated interface components that each simulate an associated behavior of the application without executing the application;
displaying a test directive to obtain a result;
receiving an indication of a response to the displayed directive, the response indicating an invocation of one or more of the plurality of the simulated interface components; and
automatically scoring the indicated response.

44. The method of claim 43 performed without executing a software plug-in of the application functionality.

45. The method of claim 43 performed without executing the application during a test and without communicating with an executing instance of the application during the test.

46. The method of claim 43 wherein the scoring designates a measurement of at least one of efficiency, correctness, time, and an action rating.

47. The method of claim 43 wherein the application is at least one of a software application, a technical application, an educational scenario.

48. The method of claim 43 wherein the test directive is displayed in one of a plurality of languages.

49. A computer-readable memory medium containing instructions that, when executed, control a computer processor to test skills of an operator relative to an application, by performing a method comprising:
presenting a plurality of simulated interface components that each simulate an associated behavior of the application without executing the application;
displaying a test directive to obtain a result;
receiving an indication of a response to the displayed directive, the response indicating an invocation of one or more of the plurality of the simulated interface components; and
automatically scoring the indicated response.

50. The computer-readable memory medium of claim 49 wherein the instructions operate without executing a software plug-in of the application functionality.

51. The computer-readable memory medium of claim 49 wherein the instructions operate without executing the application during a test and without communicating with an executing instance of the application during the test.

52. The computer-readable memory medium of claim 49 wherein the scoring designates a measurement of at least one of efficiency, correctness, time, and an action rating.

53. The computer-readable memory medium of claim 49 wherein the application is at least one of a software application, a technical application, an educational scenario.

54. The computer-readable memory medium of claim 49 wherein the test directive is displayed in one of a plurality of languages.

55. A training environment for training an operator in skills relating to an application program, the environment configured to simulate behaviors of the application, comprising:
a plurality of simulated interface components that each simulate an associated behavior of the application without executing the application;
a training scenario that displays an instruction to interact with the application; and
a response tracking mechanism that is configured to, when executed:
receive an indication of a response to the displayed instruction, the response indicating an invocation of one or more behaviors simulated by the plurality of the simulated interface components; and
automatically score the indicated response to give an indication of skill.

56. The training environment of claim 55 operating without executing a software plug-in of the application functionality.

57. The training environment of claim 55 operating without executing the application during a test and without communicating with an executing instance of the application during the test.

58. The training environment of claim 55 wherein the score designates a measurement of at least one of efficiency, correctness, time, and an action rating.

59. The training environment of claim 55 wherein the application is at least one of a software application, a technical application, an educational scenario.

60. The training environment of claim 55 wherein the instruction can be displayed in one of a plurality of languages.

61. A method in skills-based training environment for training an operator in skills relative to an application, comprising:

presenting a plurality of interface components that each simulate an associated behavior of the application without executing the application;

displaying an instruction to interact with the application;

receiving an indication of a response to the displayed instruction, the response indicating an invocation of one or more of the plurality of the simulated interface components; and automatically scoring the indicated response.

62. The method of claim 61 operating without executing a software plug-in of the application functionality.

63. The method of claim 61 operating without executing the application during a test and without communicating with an executing instance of the application during the test.

64. The method of claim 61 wherein the scoring designates a measurement of at least one of efficiency, correctness, time, and an action rating.

65. The method of claim 61 wherein the application is at least one of a software application, a technical application, an educational scenario.

66. The method of claim 61 wherein the instruction can be displayed in one of a plurality of languages.

67. A computer-readable memory medium containing instructions that, when executed, control a computer processor to train an operator in skills relative to an application, by performing a method comprising:

presenting a plurality of interface components that each simulate an associated behavior of the application without executing the application;

displaying an instruction to interact with the application;

receiving an indication of a response to the displayed instruction, the response indicating an invocation of one or more of the plurality of the simulated interface components; and automatically scoring the indicated response.

68. The computer-readable memory medium of claim 67 wherein the instructions operate without executing a software plug-in of the application functionality.

69. The computer-readable memory medium of claim 67 wherein the instructions operate without executing the application during a test and without communicating with an executing instance of the application during the test.

70. The computer-readable memory medium of claim 67 wherein the scoring designates a measurement of at least one of efficiency, correctness, time, and an action rating.

71. The computer-readable memory medium of claim 67 wherein the application is at least one of a software application, a technical application, an educational scenario.

72. The computer-readable memory medium of claim 67 wherein the instruction can be displayed in one of a plurality of languages.

73. A method in a server computer system for providing a skills-based measurement environment, comprising:

forwarding a simulation engine to a client system, the simulation engine having a plurality of interface components that each simulate an associated behavior of an application without executing the application and having a plurality of questions to be answered, each question having a corresponding answer stored in the server computer system;

receiving an indication of a response to a question, the response indicating an invocation of one or more of the plurality of the simulated interface components; and automatically determining correctness of the indicated response and an efficiency rating that measures the skill used to generate the response.

74. The method of claim 73, each question having a corresponding answer stored in the server computer system, wherein the correctness of the indicated response is determined by comparing the indicated response to the stored answer.

75. The method of claim 73, the response having an associated set of recorded actions, wherein the efficiency rating is determined by comparing the recorded actions of the response against a target number of recorded actions.

76. The method of claim 73 wherein the simulation engine is forwarded to the client system as a plurality of components.

77. The method of claim 73, the components including a base simulation component that includes code used to control flow of a simulation, a simulation overview component that includes code for simulating shared aspects of the application for a plurality of questions, and a question simulation component that provides code specific to a question.

78. The method of claim 73 wherein the measurement environment is used to provide a testing scenario.

79. The method of claim 73 wherein the measurement environment is used to provide a training scenario.

80. The method of claim 73 wherein input to and output from the simulation engine can be indicated in one of a plurality of languages.

81. A computer-readable memory medium containing instructions that, when executed, control a computer processor to provide a skills-based measurement environment, by performing a method comprising:

forwarding a simulation engine to a client system, the simulation engine having a plurality of interface components that each simulate an associated behavior of an application without executing the application and having a plurality of questions to be answered, each question having a corresponding answer stored in the server computer system;

receiving an indication of a response to a question, the response indicating an invocation of one or more of the plurality of the simulated interface components; and automatically determining correctness of the indicated response and an efficiency rating that measures the skill used to generate the response.

82. The computer-readable memory medium of claim 81, each question having a corresponding answer stored in the server computer system, wherein the correctness of the indicated response is determined by comparing the indicated response to the stored answer.

83. The computer-readable memory medium of claim 81, the response having an associated set of recorded actions, wherein the efficiency rating is determined by comparing the recorded actions of the response against a target number of recorded actions.

84. The computer-readable memory medium of claim 81 wherein the simulation engine is forwarded to the client system as a plurality of components.

85. The computer-readable memory medium of claim 81 wherein the measurement environment is used to provide one of a testing scenario and a training scenario.

86. The computer-readable memory medium of claim 81 wherein input to and output from the simulation engine can be indicated in one of a plurality of languages.

87. A computer system for providing a skills-based measurement environment, comprising:
 a simulation engine that is forwarded to a client system, the engine having a plurality of interface components that simulate an associated behavior of an application without executing the application and having a plurality of questions to be answered, each question having a corresponding answer stored in the server computer system; and
 a response tracking mechanism that is configured to, when executed:
  receive an indication of a response to a question, the response indicating an invocation of one or more of the plurality of the simulated interface components; and
  automatically determine correctness of the indicated response and an efficiency rating that measures the skill used to generate the response.

88. The system of claim 87, each question having a corresponding answer stored in the server computer system, wherein the correctness of the indicated response is determined by comparing the indicated response to the stored answer.

89. The system of claim 87, the response having an associated set of recorded actions, wherein the efficiency rating is determined by comparing the recorded actions of the response against a target number of recorded actions.

90. The system of claim 87 wherein the measurement environment is used to provide one of a testing scenario and a training scenario.

91. The system of claim 87 wherein input to and output from the simulation engine can be indicated in one of a plurality of languages.

92. A method in a computer system for providing a skills-based application simulation engine, comprising:
 generating and storing a base simulation environment that provides an interface for selection of an application;
 generating and storing an application base simulation component that provides interface components that each simulate an associated behavior of the application without executing the application for a plurality of questions;
 for each of the plurality of questions, generating and storing a question simulation component that provides a determination of whether a response to the question is correct and any question specific interface components that are needed to simulate behaviors of the application for the purpose of the question; and
 causing the stored base simulation environment, application base simulation component, and the plurality of question simulation components to be executed such that skills-based measurement of use of the application to perform a plurality of tasks defined by the questions is provided.

93. The method of claim 92 performed using a client-server architecture.

94. The method of claim 93 wherein the client-server architecture includes an engine that generates and provides web pages that include at least some of the generated and stored components.

95. The method of claim 93 performed over the Internet.

96. The method of claim 93 wherein the generating and storing of the components is performed on a server system and the execution of the components is performed on a client system.

97. The method of claim 92, further comprising:
 receiving a plurality of indications of application behaviors simulated by the simulation engine interface components; and
 measuring effectiveness of the indicated application behaviors in performing the plurality of tasks.

98. The method of claim 92 wherein the measurements are determined on a per question basis.

99. The method of claim 92 wherein the measurements are determined on an application simulation basis.

100. The method of claim 92, the skills-based measurement further comprising:
 recording a set of actions invoked in response to a question; and
 determining an efficiency measure of the recorded actions relative to a target set of actions.

101. A computer-readable memory medium containing instructions that, when executed, control a computer processor to simulate interactions with a plurality of application programs and to measure skill used in the interactions, by performing a method comprising:
 a base simulation environment having instructions that provide an interface for selection of an application;
 an application base simulation component that provides interface components each having instructions to simulate an associated behavior of the application without executing the application for a plurality of questions; and
 a plurality of question simulation components, each component having instructions that provide a determination of whether a response to a question is correct, a measure of skill used to perform the response, and any question specific interface components that are needed to simulate behaviors of the application for the purpose of answering the question.

102. The computer-readable memory medium of claim 101 wherein the base simulation environment and components are configured according to a client-server architecture having an engine that generates and provides web pages that include at least some of the components.

103. The computer-readable memory medium of claim 101 wherein the base simulation environment and components are configured to perform over the Internet.

104. The computer-readable memory medium of claim 101 wherein the question simulation components also provides instructions to:
 receive a plurality of indications of application behaviors simulated by the interface components; and
 measuring effectiveness of the indicated application behaviors in response to the plurality of questions.

105. The computer-readable memory medium of claim 104 wherein the measurements are determined on a per question basis.

106. The computer-readable memory medium of claim 104 wherein the measurements are determined on an application simulation basis.

107. The computer-readable memory medium of claim 101, further comprising instructions that cause the computer processor to record a set of actions invoked in response to a question; and
 determine an efficiency measure of the recorded actions relative to a target set of actions.

108. A computer system comprising:
  a base simulation environment that is configured to, when executed, provide an interface for selection of an application;
  an application base simulation component that is configured to, when executed, provide interface components that each simulate an associated behavior of the application without executing the application for a plurality of questions; and
  a plurality of question simulation components, each component configured to, when executed, provide a determination of whether a response to a question is correct, a measure of skill used to perform the response, and any question specific interface components that are needed to simulate behaviors of the application for the purpose of answering the question.

109. The system of claim 108 wherein the base simulation environment and components are configured according to a client-server architecture having an engine that generates and provides web pages that include at least some of the components.

110. The system of claim 108 wherein the base simulation environment and components are configured to perform over the Internet.

111. The system of claim 108 wherein the question simulation components are also configured to, when executed:
  receive a plurality of indications of application behaviors simulated by the interface components; and
  measuring effectiveness of the indicated application behaviors in response to the plurality of questions.

112. The system of claim 111 wherein the measurements are determined on a per question basis.

113. The system of claim 111 wherein the measurements are determined on an application simulation basis.

114. The system of claim 108, further comprising:
  recording mechanism that is configured to, when executed:
    record a set of actions invoked in response to a question; and
    determine an efficiency measure of the recorded actions relative to a target set of actions.

115. A computer-readable memory medium containing a plurality of software components having code and data structures that, when executed, control a computer simulation environment to simulate interactions with an application such that a measure of skill in using the application can be determined, by performing a method comprising:
  a plurality of base level simulation components that provide application interaction behavior that is application independent;
  a plurality of application level simulation components that each simulate an associated behavior of the application without executing the application and application presentation that is shared between a plurality of questions associated with the application; and
  a plurality of question level simulation components, each component being specific to a question associated with the application and measuring a series of interactions invoked in response to the question to determine skill associated with answering the question.

116. The memory medium of claim 115 wherein the components are built to operate with a client-server architecture having an engine that generates and provides web pages that include at least some of the components.

117. The memory medium of claim 115 wherein a plurality of the components are downloaded to a client computer system to be executed thereon.

118. A method in a computer system having the memory medium of claim 115, comprising:
  retrieving a set of the base level simulation components from the memory medium;
  retrieving from the memory medium a set of the application level simulation components that each simulate an associated behavior of an application without executing the application;
  retrieving a set of the question level simulation components from the memory medium; and
  executing the retrieved sets of components to present the plurality of questions associated with the question level simulation components, receive an indication of a set of response actions to each question, and determine an efficiency measurement of the indicated response actions for each question.

119. The method of claim 118 wherein the executing the retrieved components is performed without launching the application.

120. The method of claim 118 wherein the executing the retrieved components is performed without launching a software code plug-in module of the application.

121. The method of claim 118 wherein the executing the retrieved components is used to test skills in using the application.

122. The method of claim 118 wherein the executing the retrieved components is used to train an operator to use the application.

123. The method of claim 118 wherein the efficiency measurement is determined by comparing the indicated response actions for each question against target actions for each question.

124. The method of claim 118 wherein an overall efficiency measurement is determined for the plurality of questions.

125. A simulation engine in a computer system having the memory medium of claim 115, comprising:
  a set of base level simulation components retrieved from the memory medium;
  a set of the application level simulation components that simulate application behaviors without executing the application and that are retrieved from the memory medium; and
  a set of the question level simulation components retrieved from the memory medium that are configured to, when executed:
    present the plurality of questions associated with the question level simulation components;
    receive an indication of a set of response actions to each question; and
    determine an efficiency measurement of the indicated response actions for each question.

126. The engine of claim 125 wherein the retrieved components are executed without launching the application.

127. The engine of claim 125 wherein the retrieved components are executed without launching a software code plug-in module of the application.

128. The engine of claim 125 wherein the retrieved components are executed to test skills in using the application.

129. The engine of claim 125 wherein the retrieved components are executed to train an operator to use the application.

130. The engine of claim 125 wherein the efficiency measurement is determined by comparing the indicated response actions for each question against target actions for each question.

131. A method in a computer system for authoring a skills-based measurement scenario, comprising:
receiving an indication of a set of questions from a plurality of questions stored in a data repository, the set of questions including simulation questions each having an associated set of desired actions that comprise an answer to the simulation question, the desired actions performed by invoking one or more interface components that simulate associated behaviors of an application without executing the application;
receiving a designation of a scenario from a plurality of scenarios stored in a data repository; and
associating the indicated set of questions with a designated scenario to create a skills-based measurement scenario that, when executed on the computer system, receives a response to a question of the set of questions as a set of operator actions and automatically measures the response in comparison to the set of desired actions associated with the question.

132. The method of claim 131 wherein the measurement measures correctness of the response as a measure of skill.

133. The method of claim 131 wherein the measurement measures efficiency of the response as a measure of skill.

134. The method of claim 131 wherein the scenario is a test in a testing environment.

135. The method of claim 131 wherein the scenario is presented for training purposes.

136. The method of claim 131 wherein the indicated set of questions further comprises non-simulation questions each having an associated set of desired actions that comprise an answer to the non-simulation question.

137. The method of claim 136 wherein the automatic measurement is performed for a plurality of responses, and wherein the measurement of the responses measures responses to simulation questions and non-simulation questions.

138. The method of claim 131 wherein the plurality of questions contain text in a plurality of languages.

139. The method of claim 131 wherein the created scenario contains questions in a plurality of languages.

140. The method of claim 131, further comprising modifying the plurality of questions stored in the data repository.

141. The method of claim 140 wherein modifying is at least one of adding, deleting, and updating.

142. The method of claim 131, further comprising modifying the plurality of scenarios stored in the data repository.

143. The method of claim 142 wherein modifying is at least one of adding, deleting, and updating.

144. A computer-readable memory medium containing instructions that, when executed, control a computer processor to author a skills based measurement scenario by performing a method comprising:
receiving an indication of a set of questions from a plurality of questions stored in a data repository, the set of questions including simulation questions each having an associated set of desired actions that comprise an answer to the simulation question, the desired actions performed by invoking one or more interface components that simulate associated behaviors of an application without executing the application;
receiving a designation of a scenario from a plurality of scenarios stored in a data repository; and
associating the indicated set of questions with a designated scenario to create a skills-based measurement scenario that, when executed on the computer system, receives a response to a question of the set of questions as a set of operator actions and automatically measures the response in comparison to the set of desired actions associated with the question.

145. The memory medium of claim 144 wherein the measurement measures correctness of the response as a measure of skill.

146. The memory medium of claim 144 wherein the measurement measures efficiency of the response as a measure of skill.

147. The memory medium of claim 144 wherein the scenario is a test in a testing environment.

148. The memory medium of claim 144 wherein the scenario is presented for training purposes.

149. The memory medium of claim 144 wherein the indicated set of questions further comprises non-simulation questions each having an associated set of desired actions that comprise an answer to the non-simulation question.

150. The memory medium of claim 149 wherein the automatic measurement is performed for a plurality of responses, and wherein the measurement of the responses measures responses to simulation questions and non-simulation questions.

151. The memory medium of claim 144 wherein the plurality of questions contain text in a plurality of languages.

152. The memory medium of claim 144 wherein the created scenario contains questions in a plurality of languages.

153. The memory medium of claim 144, further comprising instructions that control a computer processor by modifying the plurality of questions stored in the data repository.

154. The memory medium of claim 153 wherein modifying is at least one of adding, deleting, and updating.

155. The memory medium of claim 144, further comprising instructions that control a computer processor by modifying the plurality of scenarios stored in the data repository.

156. The memory medium of claim 155 wherein modifying is at least one of adding, deleting, and updating.

157. A skills-based measurement scenario authoring tool, comprising:
question designator that is configured to, when executed, receive an indication of a set of questions from a plurality of questions stored in a data repository, the set of question including simulation questions each having an associated set of desired actions that comprise an answer to the simulation question, the desired actions performed by invoking one or more interface components that simulate associated behaviors of an application without executing the application;
scenario designator that is configured to, when executed, receive a designation of a scenario from a plurality of scenarios stored in a data repository; and
a match mechanism that is configured to, when executed, associate the indicated set of questions with a designated scenario to create the skills-based measurement scenario, such that, when the scenario is executed, the scenario receives a response to a question of the set of questions as a set of operator actions and automatically measures the response in comparison to the set of desired actions associated with the question.

158. The tool of claim 157 wherein the measurement measures correctness of the response as a measure of skill.

159. The tool of claim 157 wherein the measurement measures efficiency of the response as a measure of skill.

160. The tool of claim 157 wherein the scenario is a test in a testing environment.

161. The tool of claim 157 wherein the scenario is presented for training purposes.

162. The tool of claim 157 wherein the indicated set of questions further comprises non-simulation questions each having an associated set of desired actions that comprise an answer to the non-simulation question.

163. The tool of claim 162 wherein the automatic measurement is performed for a plurality of responses, and wherein the measurement of the responses measures responses to simulation questions and non-simulation questions.

164. The tool of claim 157 wherein the plurality of questions contain text in a plurality of languages.

165. The tool of claim 157 wherein the created scenario contains questions in a plurality of languages.

166. The tool of claim 157, further comprising:
a question modifier that is configured to, when executed, modify the plurality of questions stored in the data repository.

167. The tool of claim 166 wherein modification is at least one of adding, deleting, and updating.

168. The tool of claim 157, further comprising:
a scenario modifier that is configured to, when executed, modify the plurality of scenarios stored in the data repository.

169. The tool of claim 168 wherein modification is at least one of adding, deleting, and updating.

170. A method in a computer system for scoring a measurement of skill in using an application, comprising:
receiving a response to a question that directs performance of a task related to the application, the response indicating a set of actions performed by invoking one or more of a plurality of simulated interface components that simulate associated behaviors of an application without executing the application; and
automatically scoring the response by comparing the indicated set of actions to a target set of actions to determine the measurement of skill.

171. The method of claim 170 wherein the scoring indicates a measure of efficiency.

172. The method of claim 171 wherein efficiency is measured by dividing the number of actions in the target set of actions by the number of actions in the indicated set of actions and multiplying the result by 100.

173. The method of claim 171 wherein the scoring additionally indicates a measure of correctness.

174. The method of claim 170 wherein the scoring indicates a measure of at least one of optimal actions, efficiency, correctness, and time.

175. The method of claim 170, further comprising:
receiving a response to a non-simulation question that does not require invoking any of the plurality of simulated interface components;
automatically determining a score for the response to the non-simulation question; and
automatically determining an overall score for use of the application by combining the score of the response to the non-simulation question with the score of the response to the question.

176. The method of claim 175 wherein the overall score is determined by determining a correctness measure of the response to the non-simulation question and determining a correctness measure of the response indicating the set of actions and combining both correctness measures into a single result.

177. The method of claim 170, further comprising:
receiving a second response to a second question that directs performance of a second task related to the application, the second response indicating a second set of actions performed by interacting with simulated aspects of the application;
automatically scoring the second response by comparing the indicated second set of actions to a second target set of actions to determine a measure of skill; and
automatically determining an overall score for use of the application by combining the score of the response and the score of the second response.

178. The method of claim 177 wherein the overall score is a measure of average efficiency.

179. The method of claim 177 wherein the overall score is a measure of at least one of optimal actions, efficiency, correctness, and time.

180. The method of claim 170 wherein the method is performed without launching the application and without executing a plug-in module of the application.

181. The method of claim 170 performed as part of a testing system.

182. The method of claim 170 performed as part of a training system.

183. The method of claim 170 wherein the question can be presented in a plurality of languages.

184. A computer-readable memory medium containing instructions that, when executed, control a computer processor to score a measurement of skill in using an application, by performing a method comprising:
receiving a response to a question that directs performance of a task related to the application, the response indicating a set of actions performed by invoking one or more of a plurality of simulated interface components that simulate associated behaviors of an application without executing the application; and
automatically scoring the response by comparing the indicated set of actions to a target set of actions to determine the measurement of skill.

185. The memory medium of claim 184 wherein the scoring indicates a measure of efficiency.

186. The memory medium of claim 185 wherein efficiency is measured by dividing the number of actions in the target set of actions by the number of actions in the indicated set of actions and multiplying the result by 100.

187. The memory medium of claim 185 wherein the scoring additionally indicates a measure of correctness.

188. The memory medium of claim 184 wherein the scoring indicates a measure of at least one of optimal actions, efficiency, correctness, and time.

189. The memory medium of claim 184, further comprising instructions that control the computer processor by:
receiving a response to a non-simulation question that does not require invoking any of the plurality of simulated interface components;
automatically determining a score for the response to the non-simulation question; and
automatically determining an overall score for use of the application by combining the score of the response to the non-simulation question with the score of the response to the question.

190. The memory medium of claim 189 wherein the overall score is determined by determining a correctness measure of the response to the non-simulation question and determining a correctness measure of the response indicating the set of actions and combining both correctness measures into a single result.

191. The memory medium of claim 184, further comprising instructions that control the computer processor by:
receiving a second response to a second question that directs performance of a second task related to the application, the second response indicating a second set of actions performed by interacting with simulated aspects of the application;
automatically scoring the second response by comparing the indicated second set of actions to a second target set of actions to determine a measure of skill; and
automatically determining an overall score for use of the application by combining the score of the response and the score of the second response.

192. The memory medium of claim 191 wherein the overall score is a measure of average efficiency.

193. The memory medium of claim 191 wherein the overall score is a measure of at least one of optimal actions, efficiency, correctness, and time.

194. The memory medium of claim 184 wherein the instructions are executed without launching the application and without executing a plug-in module of the application.

195. The memory medium of claim 184 wherein the instructions are executed as part of a testing system.

196. The memory medium of claim 184 wherein the instructions are executed as part of a training system.

197. The memory medium of claim 184 wherein the question can be presented in a plurality of languages.

198. A computer-based scoring system for measuring skill in using an application, comprising:
an input interface that is configured to, when executed, receive a response to a question that directs performance of a task related to the application, the response indicating a set of actions performed by invoking one or more of a plurality of simulated interface components that simulate associated behaviors of an application without executing the application; and
a scoring module that is configured to, when executed, automatically score the response by comparing the indicated set of actions to a target set of actions to determine a measure of skill.

199. The system of claim 198 wherein the scoring indicates a measure of efficiency.

200. The system of claim 199 wherein efficiency is measured by dividing the number of actions in the target set of actions by the number of actions in the indicated set of actions and multiplying the result by 100.

201. The system of claim 199 wherein the scoring additionally indicates a measure of correctness.

202. The system of claim 198 wherein the scoring indicates a measure of at least one of optimal actions, efficiency, correctness, and time.

203. The system of claim 198, further comprising:
an input interface that is configured to, when executed, receive a response to a non-simulation question that does not invoke any of the plurality of simulated interface components; and
wherein the scoring module is further configured to, when executed,
automatically determine a score for the response to the non-simulation question; and
automatically determine an overall score for use of the application by combining the score of the response to the non-simulation question with the score of the response to the question.

204. The system of claim 203 wherein the overall score is determined by determining a correctness measure of the response to the non-simulation question and determining a correctness measure of the response indicating the set of actions and combining both correctness measures into a single result.

205. The system of claim 203 wherein the overall score is a measure of average efficiency.

206. The system of claim 203 wherein the overall score is a measure of at least one of optimal actions, efficiency, correctness, and time.

207. The system of claim 198 executed without launching the application and without executing a plug-in module of the application.

208. The system of claim 198 executed as part of a testing system.

209. The system of claim 198 executed as part of a training system.

210. The system of claim 198 wherein the question can be presented in a plurality of languages.

* * * * *